US012635665B2

(12) United States Patent
Zuppke et al.

(10) Patent No.: US 12,635,665 B2
(45) Date of Patent: May 26, 2026

(54) AUTOMATIC FEEDING ASSEMBLY

(71) Applicant: Automated Pet Care Products, LLC, Auburn Hills, MI (US)

(72) Inventors: Jacob Zuppke, Bloomfield Hills, MI (US); Brad Baxter, Bloomfield Hills, MI (US); Daniel Ronge, Munich (DE); Mark Zeh, Munich (DE); Jason Weihman, Troy, MI (US); Garrison Hefter, Clawson, MI (US); Jason Smith, West Bloomfield, MI (US)

(73) Assignee: AUTOMATED PET CARE PRODUCTS, LLC, Auburn Hills, MI (US)

( * ) Notice: Subject to any disclaimer, the term of this patent is extended or adjusted under 35 U.S.C. 154(b) by 0 days.

(21) Appl. No.: 18/865,448

(22) PCT Filed: May 15, 2023

(86) PCT No.: PCT/US2023/066997
§ 371 (c)(1),
(2) Date: Nov. 13, 2024

(87) PCT Pub. No.: WO2023/220751
PCT Pub. Date: Nov. 16, 2023

(65) Prior Publication Data
US 2025/0318499 A1 Oct. 16, 2025

Related U.S. Application Data

(60) Provisional application No. 63/341,962, filed on May 13, 2022.

(51) Int. Cl.
*A01K 5/01* (2006.01)
*A01K 5/02* (2006.01)

(52) U.S. Cl.
CPC .......... *A01K 5/0114* (2013.01); *A01K 5/0291* (2013.01)

(58) Field of Classification Search
CPC .... A01K 5/0114; A01K 5/0121; A01K 5/075; A01K 5/0291; A01K 5/01; A01K 5/02
See application file for complete search history.

(56) References Cited

U.S. PATENT DOCUMENTS 3,537,624 A * 11/1970 Hartman ................. A01K 5/02
119/51.11
4,520,567 A 6/1985 Crawford
(Continued)

FOREIGN PATENT DOCUMENTS

CN 210214763 U 3/2020
CN 117530198 A * 2/2024 ............... A01K 5/02
(Continued)

OTHER PUBLICATIONS

Collapsible Travel Bowls, Chewy.com, FRISCO Silicone Collapsible Travel Bowl with Carabiner, Teal, Small: 1.5 cup—Chewy.com, last accessed Nov. 11, 2024.
(Continued)

*Primary Examiner* — Ebony E Evans
(74) *Attorney, Agent, or Firm* — The Dobrusin Law Firm, P.C.; Daniela M. Thompson-Walters

(57) ABSTRACT

A feeding, container, system and methods configured to automatically present food to an animal for consumption. A feeding assembly (1) including: a) a container storage subassembly (12) configured to store one or more containers (16) of the food therein; b) a container handling subassembly (42) and/or a transport subassembly (40) configured to retrieve and/or receive from the container storage subassembly and transfer to a feeding area (32); c) a container opening subassembly (46) configured to open the container while being transferred to the feeding area from the container (Continued)

storage subassembly; d) optionally, a waste collection sub-assembly (14) configured to receive the one or more containers after being presented at the feeding area. The feeding assembly may provide a container opening subassembly (46) configured to peel a lid away (54) from a container (16) prior to presenting the container in a feeding area.

30 Claims, 26 Drawing Sheets

(56) References Cited

U.S. PATENT DOCUMENTS

| | | | |
|---|---|---|---|
| D326,039 | S | 5/1992 | Viemeister |
| 5,666,735 | A | 9/1997 | Kosten et al. |
| 6,279,236 | B1 | 8/2001 | Brady et al. |
| 6,298,563 | B1 | 10/2001 | Yeadon |
| 6,516,524 | B1 | 2/2003 | Brady |
| D520,826 | S | 5/2006 | Parlowski |
| D634,543 | S | 3/2011 | Caldwell et al. |
| 8,079,152 | B2 | 12/2011 | Garman et al. |
| 8,800,488 | B2 | 8/2014 | Stone |
| 9,061,796 | B2 | 6/2015 | Caldwell et al. |
| D748,960 | S | 2/2016 | Schuler et al. |
| 9,877,462 | B2 | 1/2018 | Taneja |
| 10,517,267 | B2 | 12/2019 | Gordon et al. |
| 10,739,797 | B2 | 8/2020 | Keegan et al. |
| 11,325,760 | B2 | 5/2022 | Alderson et al. |
| 2002/0119221 | A1 | 8/2002 | Matsukura et al. |
| 2004/0089583 | A1 | 5/2004 | Coleman |
| 2006/0085991 | A1 | 4/2006 | Parlowski |
| 2010/0320206 | A1 | 12/2010 | Caldwell |
| 2015/0053138 | A1 | 2/2015 | Ramsey et al. |
| 2017/0202178 | A1 | 7/2017 | Gordon |
| 2019/0029221 | A1 | 1/2019 | Anderton et al. |

FOREIGN PATENT DOCUMENTS

| | | | |
|---|---|---|---|
| EP | 2047742 | A2 | 4/2009 |
| FR | 3111766 | A1 | 12/2021 |
| WO | 2017/202739 | A1 | 11/2017 |

OTHER PUBLICATIONS

Hamilton Beach Smooth Touch Electric Automatic Can Opener, Amazon.com: Hamilton Beach Smooth Touch Electric Automatic Can Opener with Easy Push Down Lever, Eliminates Sharp Edges, Opens All Standard-Size and Pop-Top Cans. Extra Tall, Black and Chrome (76606AG) : Home & Kitchen, last accessed Nov. 11, 2024.

Fancy Feast® Petites Ocean Whitefish & Tuna Entrée Paté Wet Cat Food, Purina®, https://www.purina.com/cats/shop/fancy-feast-petites-fish-tuna-pate-wet-cat-food, Accessed Feb. 15, 2024.

Meow Mix® Tenders in Sauce With Real Tuna & Whole Shrimp, https://www.meowmix.com/cat-food/wet/tenders-in-sauce/tenders-in-sauce-with-real-tuna-whole-shrimp, Accessed Feb. 15, 2024.

Fancy Feast® Purely Natural White Meat Chicken & Flaked Tuna Wet Cat Food in a Delicate Broth, Purina®, https://www.purina.com/cats/shop/fancy-feast-purely-natural-chicken-tuna-broth-wet-cat-food, Accessed Feb. 15, 2024.

Rachel Ray® Nutrish® Chicken & Shrimp Pawttenesca® Cat Food, https://www.nutrish.com/cat-food/chicken-and-shrimp-pawttenesca, Accessed Feb. 15, 2024.

Sheba® Perfect Portions™ Premium Paté Savory Chicken Entrée, https://www.sheba.com/products/wet/sheba-perfect-portions-premium-pate-savory-chicken-entree, Accessed Feb. 15, 2024.

Blue Buffalo™ Blue Tastefuls™ Savory Singles, https://bluebuffalo.com/wet-cat-food/tastefuls/chicken-cuts-in-gravy-savory-singles/, Accessed Feb. 15, 2024.

Friskies® Lil' Soups With Sockeye Salmon in a Velvety Chicken Broth Cat Food Complement, Purina®, https://www.purina.com/cats/shop/friskies-lil-soups-sockeye-salmon-in-chicken-broth-wet-cat-food, Accessed Feb. 15, 2024.

Nutro Turkey Recipe Paté, https://www.nutro.com/products/wet/turkey-recipe-pate, Accessed Feb. 15, 2024.

Inaba Twins Tuna & Chicken Recipe, https://inabafoods.com/products/tuna-chicken-recipe-twins/, Accessed Feb. 15, 2024.

Instinct® Cat Food Minced Real Salmon Recipe, https://instinctpetfood.com/products/original-minced-cups-salmon-wet-cat-food/, Accessed Feb. 15, 2024.

Natural Balance L.I.D. Limited Ingredient Diets Chicken & Pumpkin Formula Shreds Grain-Free Wet Cat Food, https://www.chewy.com/natural-balance-lid-limited/dp/123232?utm_source=google-product&utm_medium=cpc&utm_content=Natural, Accessed Feb. 15, 2024.

FreeStyle™ Cat & Kitten Chicken, Duck & Pumpkin Stew, Nulo, https://nulo.com/for-cats/products/freestyle-cat-kitten-chicken-duck-pumpkin-stew, Accessed Feb. 15, 2024.

PureBites® Mixer Treat, https://shop.purebites.com/products/chicken-mixer-cat, Accessed Feb. 15, 2024.

Park Street Deli Classic or Spicy Guacamole Mini Cups, Aldi, https://www.aldi.us/products/deli/dips-hummus/detail/ps/p/psd-classic-or-spicy-guacamole-mini-cups/, Accessed Feb. 15, 2024.

Smucker's Natural Breakfast Syrup, 1 oz Plastic Portion Control Cup, 100 Count Case, https://www.smuckerawayfromhome.com/brands/smuckers/product/smucker-1-ounce-natural-breakfast-syrup-plastic-100-count, Accessed Feb. 15, 2024.

Jif Peanut Butter, 0.75 oz., 200/Carton (SMU08051) sold by Staples, https://www.staples.com/jif-peanut-butter-0-75-oz-200-carton-smu08051/product_2449135l?cid=PS:GS:SBD:PLA:FdBrk&gad_source=1&gclid=Cjw, Accessed Feb. 15, 2024.

Dickinson's® Variety Pack by Tribeca Curations sold by Amazon®, https://www.amazon.com/Dickinsons-Tribeca-Curations-Marmalade-Preserves/dp/B0BBKSTSNZ/ref=asc_df_B0BBK5TSNZ/?tag=hyprod-20&linkCod, Accessed Feb. 15, 2024.

Friskies® Purina® Gravy Wet Cat Food, Glaz'd & Infuz'd with Gravy Glaz'd Tuna sold by Amazon®, https://www.amazon.com/Purina-Friskies-Glazd-Infuzd-Gravy/dp/B09P8VNZXH?th=1, Accessed Feb. 15, 2024.

International Search Report and Written Opinion, mailed Jan. 24, 2024, Application No. PCT/US2023/066998.

IPRP, completed Aug. 23, 2024, Application No. PCT/US2023/066998.

International Search Report and Written Opinion, , mailed Sep. 18, 2023, Application No. PCT/US2023/066997.

IPRP, completed Sep. 18, 2024, Application No. PCT/US2023/06697.

* cited by examiner

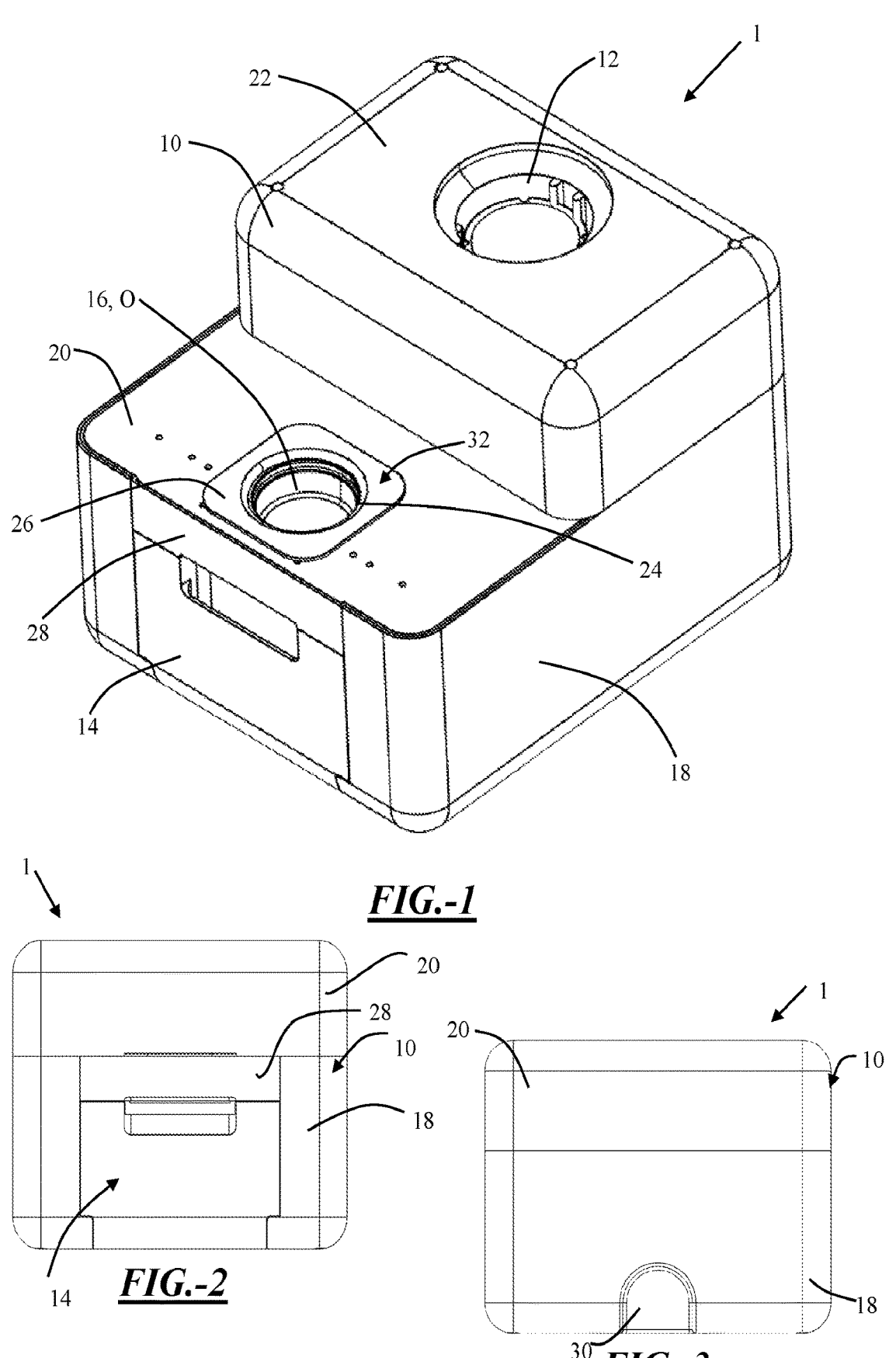
_FIG.-1_
_FIG.-2_
_FIG.-3_

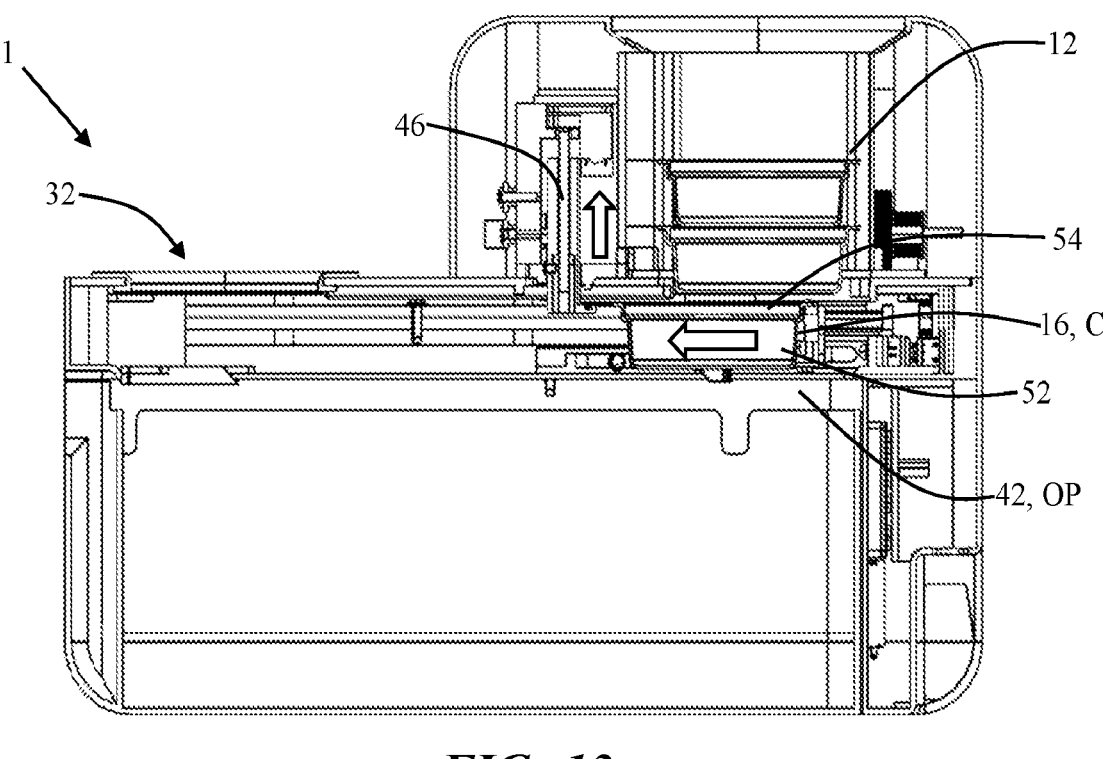
_FIG.-13_
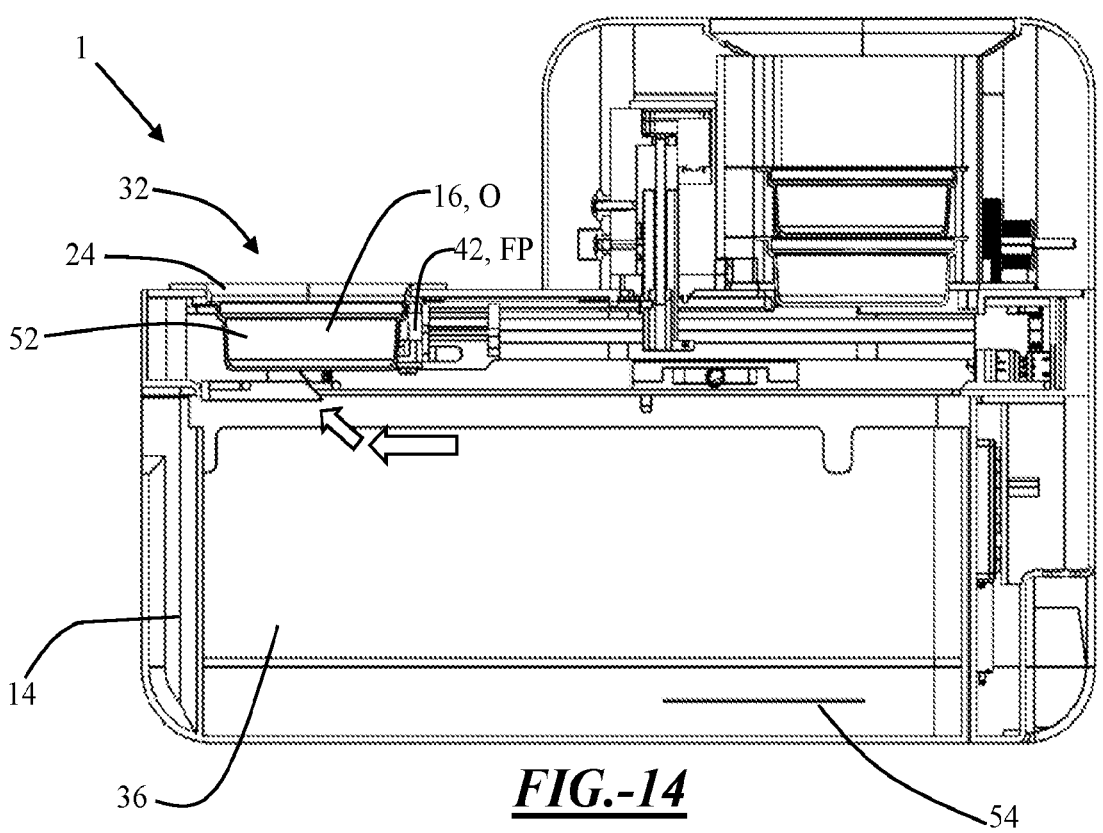
_FIG.-14_

42, 114

116

110

110          16

108

1

28

110

110

18

42, FP

116

16, O          110

800, 830

FEED WET FOOD press "wet food"
button wet food timer
via app cat interaction (?)

831

832

833 wet food is
presented

834 cat eats

835 cat leaves

836 remaining wet food
is weighed and
retracted immediately

837 remaining wet food
is weighed and
retracted after
x minutes

838

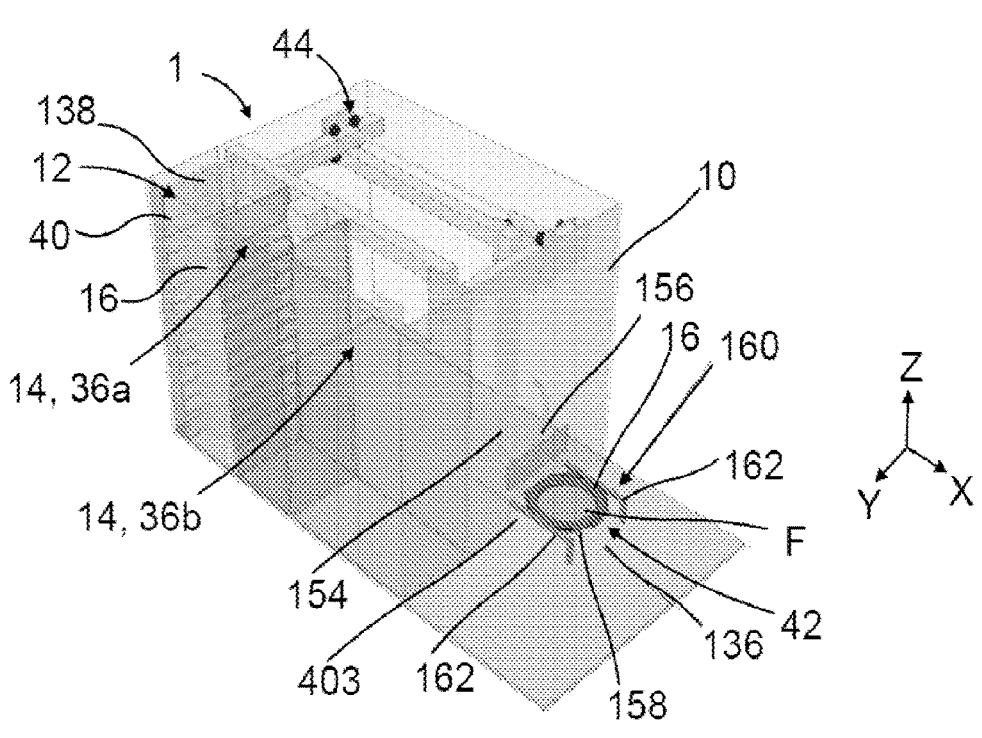
*FIG.-41*
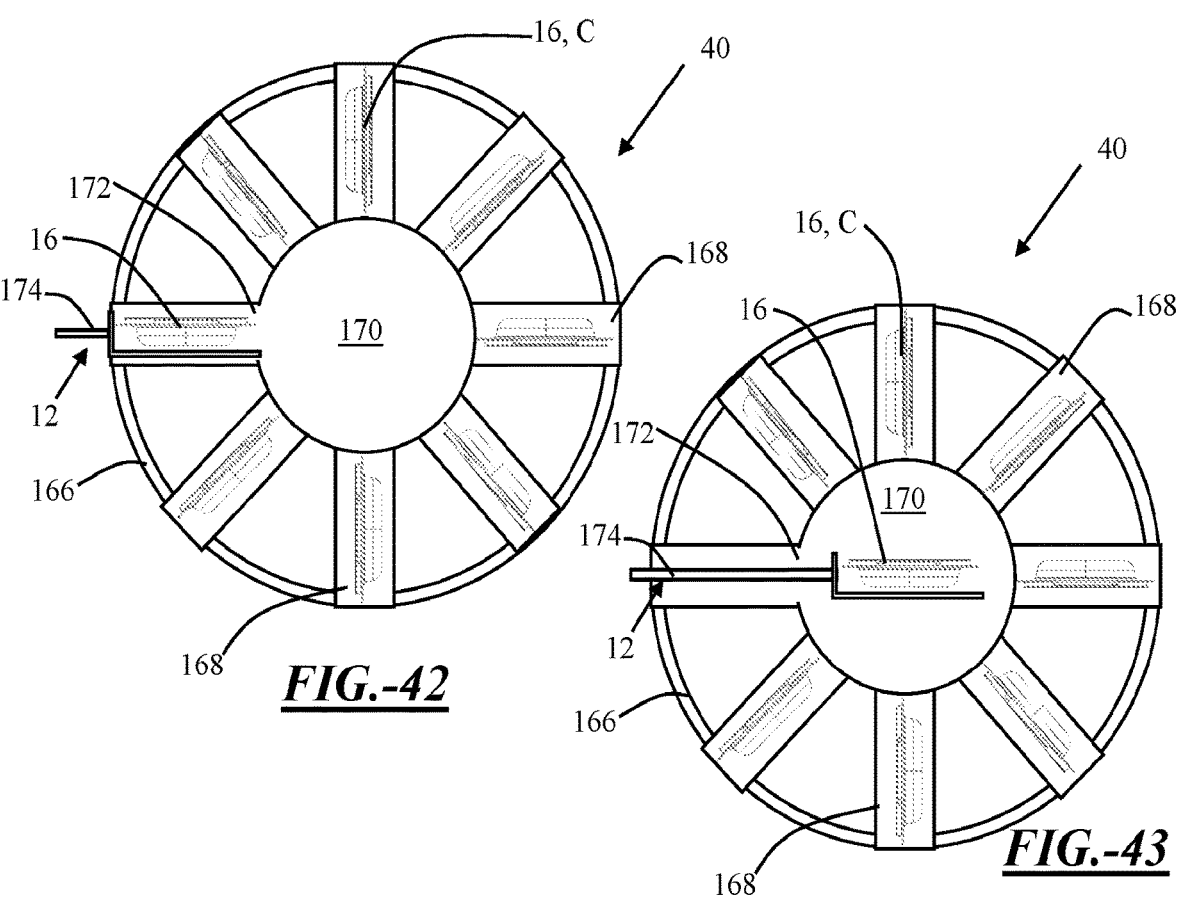
*FIG.-42*
*FIG.-43*

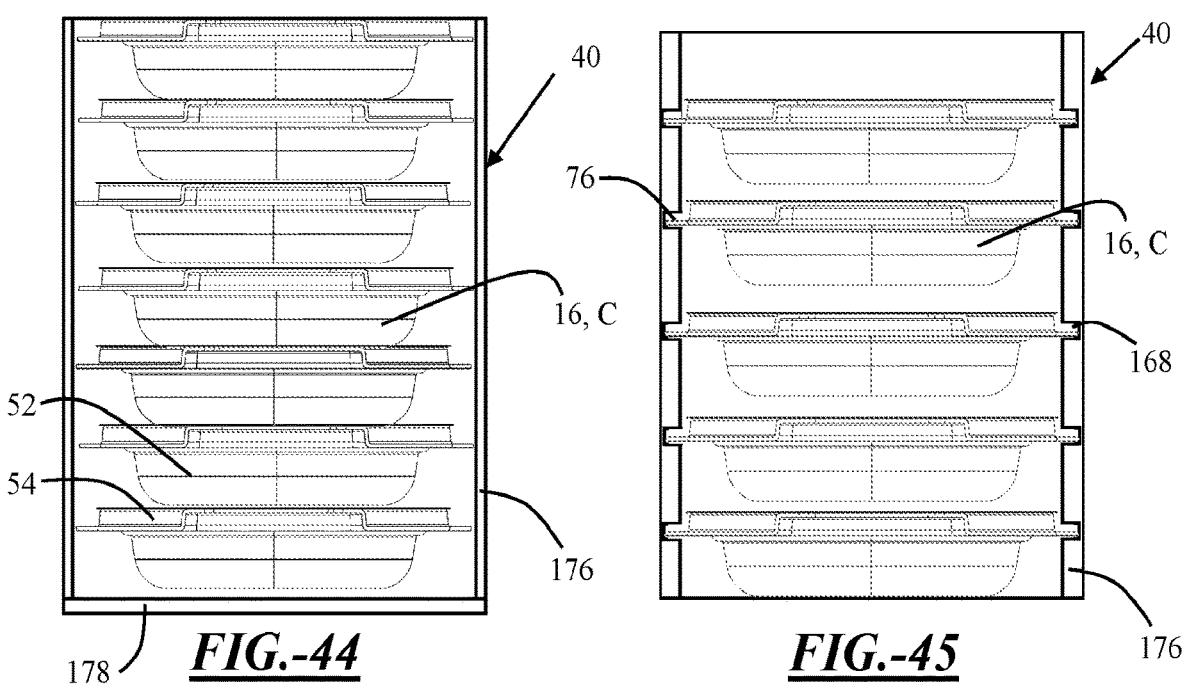
FIG.-44
FIG.-45
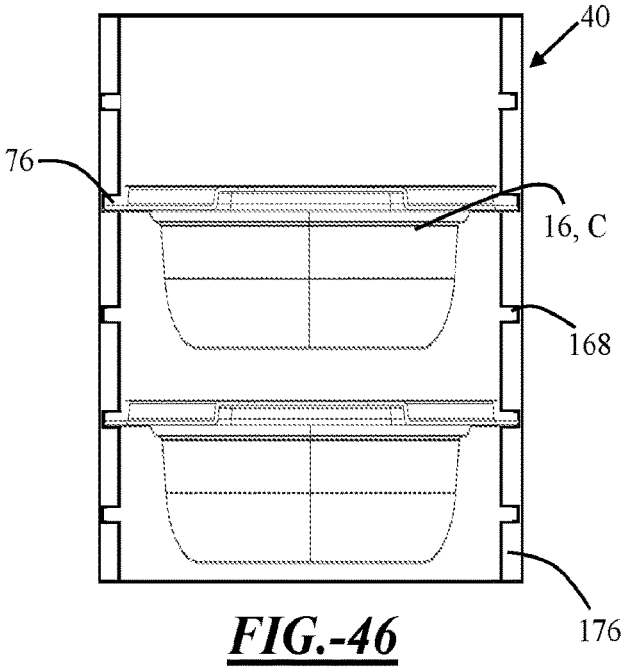
FIG.-46

AUTOMATIC FEEDING ASSEMBLY

CROSS-REFERENCE TO RELATED APPLICATIONS

This application claims priority from U.S. Provisional Application Nos. 63/341,962, filed on May 13, 2022, and which is incorporated herein by reference in its entirety for all purposes.

FIELD

The present disclosure relates to systems and methods for autonomously providing food to animals. The present disclosure may find use in presenting a container of food, such as wet food and/or dry food, to an animal. The present disclosure may find use in automatically removing a lid or other covering from food before automatically presenting a container to an animal for consumption.

BACKGROUND

Many households include one or more pets, such as a cat or a dog. Among pets, cats are unique animals who form a strong social bond with humans, but at the same time, like to maintain their independence. A major concern with cats is timely feeding of the cats and providing them with a heathy mixture of wet food and dry food to maintain their health. Cats tend to be creatures of habit and prefer set feeding times and rituals. Cats may not prefer eating from certain shapes or types of feeding containers, such as, for example, bowls formed from gelatinous materials, and may have trouble removing food from containers having sharp corners. Moreover, cats can be messy eaters and many cats take their foods out of their bowl and drop it on the ground for eating. Thus, there is a need for systems and methods to allow for timely, reliable, and healthy feeding of a cat, even when a caregiver of the cat is not available to prepare and present food to the cat, to maintain the physical and mental health of cats.

In the market today, there are automated feeders for dry foods. But these automated feeders usually hold the dry food in mass in a hopper, then segregate and dispense limited quantities into a serving area. These automated feeders are not compatible with wet food. The wet food is not suitable for being stored in mass within a hopper, both due to food consistency (e.g., sticking to side walls) and bacterial growth. The dispensing mechanisms are also not suitable for wet food. Thus, what is needed is a feeding assembly and system compatible with wet food.

In the market today, there are also some automated feeders compatible with wet food. These automated feeders typically require a user to manually remove wet food from packaging and then dispose the food into segregated serving areas. The feeder has a lid which closes and opens to provide access to the food stored therein. The lid or the base are sometimes designed as a carousel such that rotation causes one segregated serving area to be accessible while sealing the remaining segregated serving areas and then rotating to provide access to a subsequent segregated serving area. These automated feeders present the problems that the user (e.g., pet owner) still needs to prepare the food, the food is not sealed against spoilage, and components of the feeding assembly require frequent washing.

Typically, wet food is stored and purchased in single-use containers. The single-user containers include metal cans, plastic pouches, and plastic containers. Pet owners need to remove the food from the container and place the wet food into a serving dish. The wet food may only be left out a certain amount of time to prevent spoilage. Additionally, the pet owner then needs to wash the serving dish and throw food containers away. This can be a tedious process, but also presents challenges for pet owners when away from home (e.g., vacation, work). Thus, what is needed is a feeding assembly compatible with wet food containers. What is needed is a feeding assembly which removes food available for consumption prior to spoilage. What is needed is a means of avoiding or reducing cleaning of serving ware. What is further needed is a container compatible with a feeding assembly for automated opening and displaying for consumption.

SUMMARY

The present teachings relate to a feeding assembly configured to automatically present a food to an animal for consumption, the feeding assembly including: a) a container storage subassembly configured to store one or more containers of the food therein; b) a container handling subassembly and/or a transport subassembly configured to retrieve and/or receive a container from the container storage subassembly and transfer to a feeding area; c) a container opening subassembly configured to open the container prior to being presented to the animal; d) optionally, a waste collection subassembly configured to receive the one or more containers after being presented at the feeding area.

The present teachings relate to feeding assembly configured to automatically present a food to an animal for consumption, the feeding assembly including: a) a container storage subassembly configured to store a plurality of containers of the food therein; b) a container handling subassembly configured to retrieve and/or receive a container from the container storage subassembly; c) a container transport subassembly configured to move the container handling subassembly in one or linear directions from a loading position at a container storage subassembly to a feeding position at feeding area; d) a container opening subassembly configured to open the container while being transferred to the feeding area from the container storage subassembly, wherein the container opening subassembly is configured to engage with a lid and applying a peeling force to remove the lid from the container; e) a waste collection subassembly configured to receive the one or more containers after being presented at the feeding area.

The present teachings relate to a feeding assembly configured to automatically present a food to an animal for consumption, the feeding assembly including: a) a container storage subassembly configured to storing a plurality of containers of the food therein; b) a container handling subassembly and/or a transport subassembly configured to retrieve and/or receive a container from the container storage subassembly and transfer to a feeding area; c) a container opening subassembly having a pair of jaws and/or a hook configured to engage with (e.g., grasp, pinch, hook) a lid of the container, wherein the container opening subassembly together with the container handling subassembly and/or the container transport subassembly, are configured to apply a peeling force to a lid of the container to remove the lid and open the container by moving the container handling subassembly relative to the container opening subassembly, moving the container opening subassembly relative to the container handling subassembly, or moving both relative to one another; and d) optionally, a waste collection subassembly configured to receive the one or more containers after being presented at the feeding area.

The present teachings relate to a feeding assembly configured to automatically present a food to an animal for consumption, the feeding assembly including: a) a container storage subassembly having: i) a hopper configured to store a plurality of containers of the food therein; ii) a restraint mechanism configured to retain the plurality of containers in the hopper and selectively release a container from the plurality of containers; b) a container handling subassembly configured to retrieve and/or receive a container from the container storage subassembly; c) a container transport subassembly configured to move the container handling subassembly in one or linear directions from a loading position at a container storage subassembly to a feeding position at feeding area, wherein the container transport subassembly includes one or more drive units which together with the container handling subassembly convert rotation to linear motion; d) a container opening subassembly having a pair of jaws and/or a hook configured to engage with (e.g., grasp, pinch, hook) a lid of the container, wherein the container opening subassembly together with the container handling subassembly and/or the container transport subassembly, are configured to apply a peeling force to a lid of the container to remove the lid and open the container by moving the container handling subassembly relative to the container opening subassembly, moving the container opening subassembly relative to the container handling subassembly, or moving both relative to one another; and e) a waste collection subassembly configured to receive the one or more containers after being presented at the feeding area.

The present teachings relate to a container including: a) a container base defining a food cavity configured to retain food therein, wherein the container base includes: one or more flanges which include and/or form one or more keying features configured to provide for one or more orientations of the container; and b) a lid removably affixed to the container base, wherein the lid is configured for being engaged by a container opening structure (e.g., subassembly) for peeling the lid from the container, wherein the lid includes one of the following: i) a handling portion which includes a bottom surface of the lid which is exposed from the one or more flanges and/or one or more rims of the container base; ii) the handling portion which extends beyond the container base such that a bottom of the lid is exposed (e.g., from the one or more flanges) and includes a reinforcement structure affixed thereto; or iii) the handling portion which extends away from the container base together with a reinforcing feature of the one or more flanges which is affixed thereto, and is configured for being engaged by a container opening structure (e.g., subassembly) for peeling the lid from the container base.

The present teachings relate to a system wherein a feeding assembly includes one or more communication modules and is configured to be connected to a network. The system may use the feeding assembly according to the teachings herein.

The present teachings relate to a method for automatically presenting a food to an animal for consumption by a feeding assembly, the method comprising: a) a container handling subassembly automatically receiving and/or retrieving a container of the food from a container storage subassembly; b) the container handling subassembly automatically moving the container to a feeding area and presenting the container for consumption; and c) the container handling subassembly automatically moving the container to a waste collection subassembly and releasing the container into the waste collection subassembly.

The present teachings may provide for an automatic feeding assembly. The automatic feeding assembly may be beneficial in storing containers of food and automatically dispensing food for consumption by an animal. The containers of food may be suitable for wet food and/or dry food. The feeding assembly may be compatible with containers of wet food. The feeding assembly may provide an assembly and method for storing, opening, and displaying containers of wet food to an animal for consumption therefrom. This may avoid wet food being in contact with components of the feeding assembly, a user needing to prepare wet food in serving compartments, or both. The feeding assembly may provide automatic waste collection thus eliminating clean up after each individual serving.

BRIEF DESCRIPTION OF DRAWINGS

FIG. 1 is a perspective view of a feeding assembly.

FIG. 2 is a front view of a feeding assembly.

FIG. 3 is a rear view of a feeding assembly.

FIG. 13 illustrates a cross-section of a feeding assembly with a container handling subassembly in an opening position.

FIG. 14 illustrates a cross-section of a feeding assembly with a container handling subassembly in a feeding position.

FIG. 41 is a perspective view of a feeding assembly.

FIG. 42 is a plan view of a container magazine.

FIG. 43 is a plan view of a container magazine.

FIG. 44 is a front view of a container magazine.

FIG. 45 is a front view of a container magazine.

FIG. 46 is a front view of a container magazine.

DETAILED DESCRIPTION

Figures 4, 5, 6, 7:
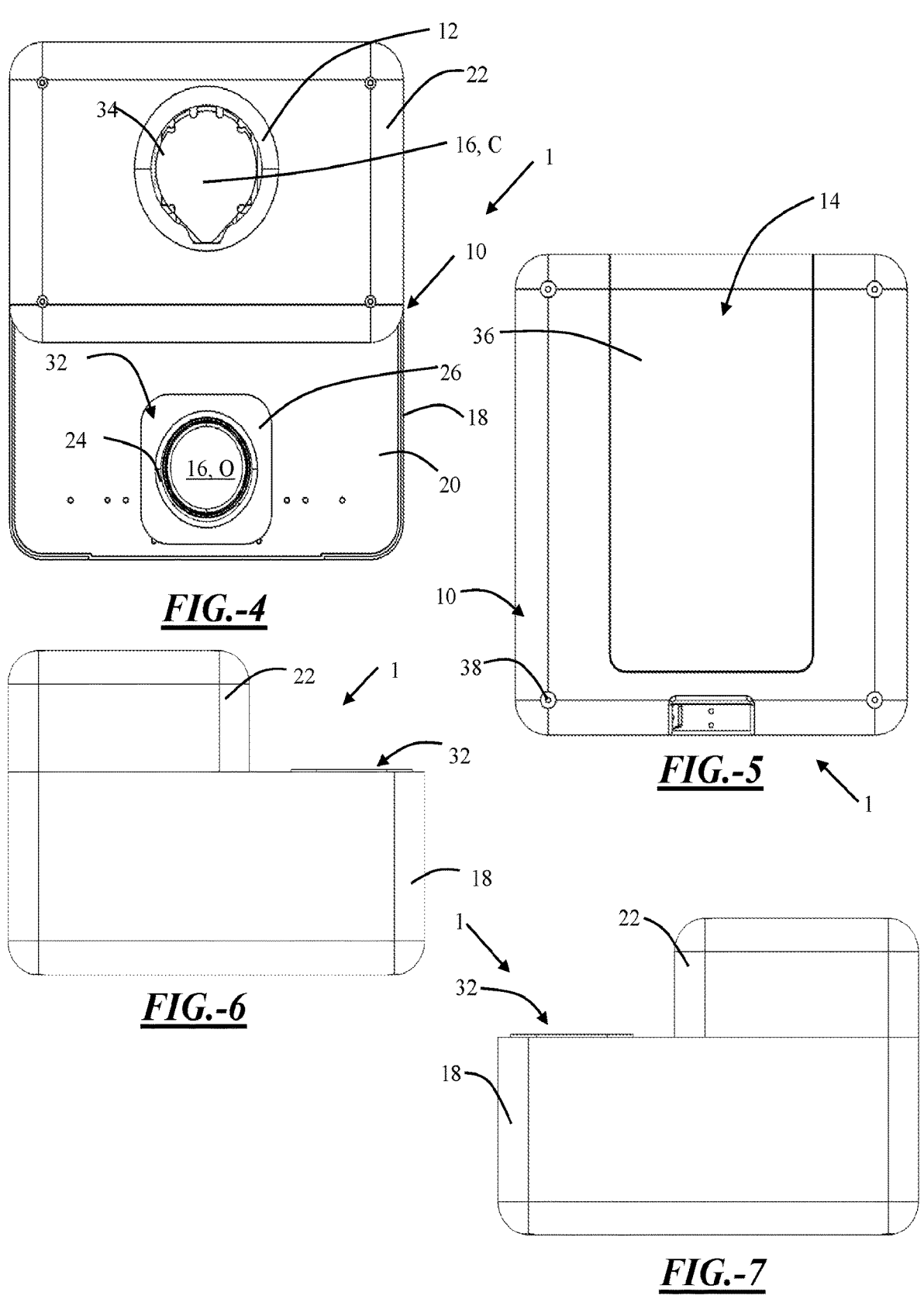
FIG. 4 is a top view of a feeding assembly.
FIG. 5 is a bottom view of a feeding assembly.
FIG. 6 is a left side view of a feeding assembly.
FIG. 7 is a right side view of a feeding assembly.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Feeding Assembly

The feeding assembly may be any device that includes and dispenses food for consumption by an animal. Food may include any type of food suitable for consumption by an animal. Food may include wet food, dry food, or both. Wet food may include ground and/or shredded protein (e.g., meat), vegetables, grains, fruits, and/or the like served in or mixed with a liquid. A liquid may refer to water, broth, gravy, or other liquid. Dry food may refer to food substantially free of liquid, may be in the form of granular material, or both.

Food may be presented in a container, transferred to a container, or both. The feeding assembly may be configured to receive at least one container. The feeding assembly may receive and store a plurality of containers. The feeding assembly may be configured to have one or more containers located therein individually, as a set, within a container magazine, the like, or any combination thereof.

The feeding assembly may be useful in presenting food in a container, removing food from a container, or both. The feeding assembly may be useful in retrieving or otherwise accessing a container of food stored therein and providing the contents of the container to be accessible by an animal. The animal may be any domestic animal. A domestic animal may include a dog, cat, pig, rabbit, hamster, guinea pig, ferret, the like, or any combination thereof. In a typical pet-owning household, the domestic animal may include one or more cats, dogs, or both.

The feeding assembly may be referred to as an automatic feeding assembly.

The feeding assembly may include: a) a container storage subassembly configured to store one or more containers of the food therein; b) a container handling subassembly and/or a transport subassembly configured to retrieve and/or receive a container from the container storage subassembly and transfer to a feeding area; c) a container opening subassembly configured to open the container while being transferred to the feeding area from the container storage subassembly; d) optionally, a waste collection subassembly configured to receive the one or more containers after being presented at the feeding area.

The feeding assembly may include one or more of the following features: a housing, container storage subassembly, container handing subassembly, transport subassembly, container opening subassembly, container holding subassembly, disposal subassembly, waste collection subassembly, feeding area, the like, or a combination thereof.

The feeding assembly may include a housing. A housing may function to house and/or support various components of the feeding assembly, provide an aesthetically pleasing appearance to the feeding assembly, or both. A housing may include one or more bases, mid-supports, support plates, top covers, the like, or any combination thereof. A housing may provide for or define a feeding area.

A housing may be formed from any suitable material. Suitable materials may be easily cleaned, be suitable for contact with food, or both. Suitable materials may include plastics, polymers, metals (e.g., aluminum), alloys, any other suitable material or a combination thereof.

The housing may define an internal volume within which at least some of the subassemblies and components of the feeding assembly may be disposed. The housing may be divided into various sections with each section housing one or more of the subassemblies of the assembly. The housing may include or be coupled to housing receptacles included in the container storage subassembly and one or more waste collection subassemblies.

A housing may support and/or a container storage subassembly, container handing subassembly, transport subassembly, container opening subassembly, container holding subassembly, disposal subassembly, waste collection subassembly, the like, or a combination thereof.

A housing may include one or more bases. A base may function to support other housing components, provide a surface which rests on a supporting surface, house a waste collection subassembly, or a combination thereof. A base may have any shape, size, and/or configuration to provide part of or the overall footprint (e.g., length and width). A base may have a three-dimensional shape which is substantially or partially a cuboid, cube, U or C-shaped trough, sphere, annular cylinder, spherical ring, cylinder, prism, cone, the like, or any combination thereof. A cuboid or cube shape may provide for balanced support of the overall housing and components being supported by the housing. A base may include one or more support structures, resting supports, cavities, and/or the like. A base may be formed as a one-piece, integral component or be an assembly.

A base may include one or more support structures. One or more support structures may function to have one or more other components resting thereon. One or more support structures may be located within the base, as one or more edges of the base, or both. One or more support structures may be located within a component cavity of a base. One or more support structures may retain a mid-support, support plate, or both thereon. A mid-support and/or support plate may be mounted opposite a bottom surface of a base.

A base may include one or more resting supports. One or more resting supports may or may not be configured to adapt to uneven surfaces. One or more resting supports may include one or more feet, ridges, and/or the like. The one or more resting supports may be adjustable so that the device may rest level on a resting surface. The one or more resting supports may be located at a bottom surface of a base. The one or more resting supports may include a plurality of resting supports. The resting supports may be distributed about or close to a peripheral edge of the bottom surface.

A base may include one or more cavities. The one or more cavities may extend partially or completely through the base. The cavities may include a waste cavity, power cavity, component cavity, the like, or a combination thereof.

A base may include a waste cavity. A waste cavity may be a cavity configured to retain one or more waste collection subassemblies therein. A waste cavity may extend partially or completely through the base. A waste cavity may commence at the front, rear, or both, of the base. A waste cavity may be configured as a drawer cavity. A drawer cavity may be suitable for cooperating with one or more waste collection subassemblies configured as a drawer. A waste cavity may include one or more rails. One or more rails may be part of or affixed to the base. One or more rails may cooperate with one or more grooves of a waste collection subassembly.

A base may include a component cavity. A component cavity may function to retain one or more components (e.g., electrical components) of a feeding assembly. A component cavity may be formed from an upper surface of a base. In other words, the opening to the cavity is at an upper facing surface of the base. The component cavity may be all or a portion of the volume of the base. One or more drive units, adapters for power sources, controllers, communication modules, and/or the like may be located within the component cavity.

A base may include a power cavity. A power cavity may function to house or support one or more electrical components, allow the base to sit flush on a support surface, or both. A power cavity may be formed as an indentation or opening. A power cavity may be located away from sight. A power cavity may be located at a rear of the base. A power cavity may be located opposite an entrance into a waste cavity.

A housing may include one or more mid-supports. A mid-support may function to support a transport subassembly, container subassembly, support plate, one or more sensing devices, one or more drive units, one or more sensing devices, and/or the like. A mid-support may rest upon one or more support structures of a base. A mid-support may rest upon and/or be affixed to a base, be located above a waste cavity, be located above a waste collection subassembly, or a combination thereof. A mid-support may be located below a top cover, below a support plate, below a container storage subassembly, below a container opening subassembly, or any combination thereof. A mid-support may be below and/or adjacent to a transport subassembly, container handling subassembly, or both. A mid-support may be located between a base and a top cover, between a base and support plate, or both.

A mid-support may have any size, shape, and/or configuration for being supported by a base, supporting a plurality of components of the feeding assembly, or both. A mid-support may have a two-dimensional cross-section reciprocal with a two-dimensional cross-section of a base. A mid-support may have a cross-section shape which is substantially rectangular, square, circular, ovular, the like, or a combination thereof. A mid-support may be substantially planar, non-planar, or both. A mid-support may be substantially planar with non-planar structure. A mid support may include one or more channels, waste openings, cradles, mounting openings, the like, or any combination thereof.

One or more cradles may function to support one or more rotating components. The one or more cradles may face upward, away from the base, toward a transport subassembly, or any combination thereof. The one or more cradles may have a shape reciprocal with and/or which cooperates with one or more drive shafts, rotary shafts, support shafts, and/or the like. The one or more cradles may have a U-shape, C-shape, concave shape, and/or the like.

One or more waste openings and/or channels may form an opening through the mid-support. The waste opening and/or channel may provide access to one or more waste collection subassemblies, may allow clearance for one or more container handling subassemblies to move to and from a loading position to a feeding position, or both.

One or more mount openings may allow for one or more components of the feeding assembly to be mounted to the mid-support. One or more mount openings may cooperate with one or more fasteners or other mounting structures.

A mid-support may have affixed thereto a transport subassembly, a support plate, one or more sensing devices, a container handling subassembly, a lifting wedge, the like, or any combination thereof.

A housing may include one or more support plates. A support plate may function to conceal one or more components of a feeding assembly, provide a feeding area, support a top cover, support a container storage subassembly, support a container opening subassembly, support one or more sensing devices, the like, or a combination thereof. A support plate may be distanced from one or more mid-supports to create a gap suitable for housing one or more components. The components within the gap may be one or more components supported by the mid-plate. A support plate may rest upon and/or be affixed to a base, mid-support, or both. A support plate may be located below a top cover, below a container storage assembly, below a container opening subassembly, or a combination thereof. A support plate may be located above a base, waste cavity, waste collection subassembly, mid-support, transport subassembly container handling subassembly, or a combination thereof.

A support plate may have any size, shape, and/or configuration for being supported by a base and/or mid-support, supporting a plurality of components of the feeding assembly, providing a feeding area, or a combination thereof. A support plate may have a two-dimensional cross-section reciprocal with a two-dimensional cross-section of a base, mid-support, or both. A support plate may have a cross-section shape which is substantially rectangular, square, circular, ovular, the like, or a combination thereof. A support plate may be substantially planar, non-planar, or both. A support plate may include one or more openings. One or more openings may include one or more container display openings, hopper openings, or both.

A support plate may include a container display opening. A container display opening may function to allow a container to be accessible from outside of a housing, allow an animal to consume food from a container, or both. A container display opening may be biased toward the front of a feeding assembly. A container display opening may have a cross-sectional shape substantially similar to or dissimilar to a cross-sectional shape of a container. A cross-sectional shape may be the cross-section parallel with an upper facing surface of a support plate, perpendicular to a vertical axis, or both.

A support plate may include a hopper opening. A hopper opening may allow one or more containers stored within a container storage assembly to be disposed therefrom, one or more containers to pass from one side of the support plate to an opposing side of the support plate, or both. A hopper opening may be larger than a cross-sectional area of a container. This size may facilitate easy movement of a container therethrough. The hopper opening may be aligned with an opening (e.g., outlet) of a container storage subassembly.

A housing may include one or more top covers. A top cover may function to conceal one or more components of a feeding assembly. A top cover may cooperate with a base, support plate, or both to provide a feeding area. A top cover may be an uppermost portion of a housing. A top cover may be located above, be affixed to, and/or rest upon a support plate, mid-support, base, the like, or a combination thereof. A top cover may house a container storage subassembly, a container opening subassembly, one or more sensing devices, one or more other electrical components, or any combination thereof. A top over may be biased toward the rear of the feeding assembly, may allow for a front portion of a support plate and/or base to be exposed, or any combination thereof.

A top cover may have any size, shape, and/or configuration for concealing one or more components, providing for a feeding area, or both. A top cover may have a three-dimensional shape which is substantially or partially a cuboid, cube, sphere, annular cylinder, spherical ring, cylinder, prism, cone, the like, or any combination thereof. A top cover may have a length or width shorter than that of the base, mid-support, and/or support plate. A top cover may be located rearward or adjacent to a container display opening of the support plate. A top cover may include one or more openings.

A top cover may include one or more container refill openings. A container refill opening may allow for access into a container storage subassembly, refilling the feeding assembly with one or more containers, insertion of one or more container magazines, or any combination thereof. A container refill opening may be aligned with an inlet opening of a hopper. A container refill opening may be located at the top surface, side surface, or both of a top cover. A container opening may have a shape reciprocal with or different from a cross-sectional shape of a container. A container opening may be a size larger than that of a cross-section of a container, container magazine, or both.

A housing may provide for a feeding area. A feeding area may be a portion of a housing which presents a container and/or food to an animal such that it is accessible by the animal for consumption. A feeding area may be located at any level of the housing. A feeding area may be provided at the base, mid-support, support plate, top cover, or a combination thereof. A feeding area may be provided adjacent to (e.g., in front of) a base, mid-support, support plate, top cover, or any combination thereof. A feeding area may be defined by a container display opening.

A feeding area may be at a height comfortable for an animal to consume food. The height of a feeding area may refer to the height at which a top surface of a container is presented at relative to the ground. The height of a feeding area may be at an animal's foot, knee, and/or shoulder level. A feeding area may provide for an elevated feeding height. An elevated feeding height may be at an animal's knee and/or shoulder level. A feeding height may be about 0.5" or greater, about 1" or greater, about 2" or greater, or even about 3" or greater. A feeding height may be about 7" or less, about 6" or less, or even about 5" or less. An elevated feeding height may be about 3" to about 6". The feeding height may also refer to the height of a base, a distance from a bottom of a base to a top of a support plate, or both.

A feeding area may include a guard. A guard may be located about a container display opening. A guard may be affixed to a housing portion in which a container display opening is located. A guard may cover any gaps between a housing surface and a container when the container is being presented to an animal for consumption.

The housing may include a cover. The cover may function to selectively cover a container display opening, prevent access into an interior of the feeding assembly, prevent access to used food from entering the housing, prevent access to a container, allow access to a container, or both. The container display opening may be selectively covered by a cover configured to prevent the animal from reaching into the interior of the housing. The cover may be configured as a door and/or wiper. Exemplary doors may include retracting doors, hinged doors, or both. Exemplary wipers may include a soft flexible flap or silicone brush. The cover may extend partially into the opening. When a container base is drawn back into the housing after presentation to the animal, any food that may extend above the upper surface of the container base can be obstructed from entering the housing by the door and/or the wiper.

The housing may include a movable and/or removable lid. A removable lid may function to selectively cover a container storage subassembly, container refill opening, one or more waste collection subassemblies, or any combination thereof. The lid may be moved between a closed configuration and an open configuration. In the open configuration, at least a portion of the internal volume may be accessible. The internal volume may include a container storage subassembly, one or more waste collection subassemblies, or both. A lid may be located over one or more refill openings. It is also envisioned that the top cover may function as a removable lid. It is also envisioned that a drawer front of a waste receptacle may function as a lid.

The feeding assembly may include a container storage subassembly. A container storage assembly may function to have one or a plurality of containers temporarily disposed and stored therein. Disposed may mean stacked vertically, horizontal, radially, mounted to, the like, or any combination thereof. A container storage subassembly may provide for a single stack or a plurality of stacks of containers. A container storage assembly may provide for a single circular array of a plurality of containers or a plurality of circular arrays.

A container storage subassembly may cooperate with one or more other components of the feeding assembly to have one or more containers selectively removed. A container storage assembly may cooperate with one or more transport subassemblies, container handling subassemblies, or both to dispense a container. Upon removal, food in a container may be made accessible to an animal. A container storage subassembly may be removably located within the feeding assembly or semi-permanently/permanently affixed to the feeding assembly. A removable container storage subassembly may be referred to as a container magazine. A container storage assembly may allow for automated retrieval of one or more containers stored therein by one or more other components of the feeder assembly. A container storage assembly may cooperate with a transport subassembly, lid removal subassembly, container handling subassembly, one or more sensing devices, or any combination thereof.

Containers in a container storage subassembly may have containers organized therein by first in, first out; by expiration date, by brand; by flavor; by size; the like; or any combination thereof.

A container storage assembly may be located anywhere suitable for cooperating with a transport subassembly, lid removal subassembly, container handling subassembly, one or more sensing devices, or a combination thereof. A container storage subassembly may be located generally opposite a feeding area, by a loading position, toward a rear of the feeding assembly, or a combination thereof.

A container storage assembly may include one or more hoppers, container magazines, restraint mechanisms, the like, or a combination thereof.

A container storage assembly may include one or more hoppers. One or more hoppers may be configured to store a plurality of containers therein. The containers may be stacked or otherwise aligned in a column. A hopper may receive the containers directly or receive a container magazine holding a plurality of containers. One or more hoppers may include 1 or more, 2 or more, or even 3 or more hoppers.

A hopper may have any size, shape, and/or configuration to cooperate with, store, and/or dispense one or more containers, container magazines, or both; cooperate with a restrain mechanism; cooperate with a container handling subassembly; or any combination thereof. A hopper may have a three-dimensional shape which is generally cylindrical, cuboid, cubed, the like, or a combination thereof. A hopper may have a two-dimensional, cross-section shape reciprocal with (e.g., complementary), dissimilar to, or both a cross-section of a container and/or container magazine. A cross-section shape may refer to a cross-section which intersects a longitudinal axis, vertical axis, or both of the hopper. A hopper may have a cross-section shape which is substantially symmetrical about one axis of symmetry, two axes of symmetry, or even more. A hopper may have a cross-section shape which is asymmetrical. Symmetry may facilitate a container being positioned within a hopper. Having more than one axes of symmetry may support a container having multiple correct orientations within a hopper.

A hopper may function as part of the housing, form part of the housing, and/or be disposed within the housing. A hopper may form a removable portion of the housing. A hopper may be removably inserted into the housing. The housing may include a reciprocal housing portion configured to receive the hopper. A hopper may be located inside a top cover, above a support plate, above a mid-support, above a base, and/or the like. A hopper may be located within a reciprocal housing portion or form a housing portion. A hopper may be located adjacent to one or more waste collection subassemblies, a transport subassembly, or both. A hopper may be accessible or in dispensing communication with one or more container handling subassemblies.

A hopper may include one or more keying features. One or more keying features may function to facilitate correct orientation of a container, container magazine, or both within the hopper. One or more keying features may include one or more projections, indentations, surface contours, and/or the like. One or more keying features may be formed on the inside surface of the hopper. One or more keying features may be located along all or a portion of the length of the hopper. One or more projections may include one or more ribs, tabs, teeth, and/or the like. One or more indentations may include one or more grooves, notches, and/or the like. One or more surface contours may include one or more planar (e.g., flat) surfaces, one or more curved surfaces, a change in radius or degree of curvature, the like, or any combination thereof. One or more keying features may cooperate with one or more keying features, alignment features, engagement features, lid reinforcing features, lid access features, or any combination thereof of a container, container magazine, or both. One or more keying features of a hopper may be reciprocal with one or more keying features of a container.

A hopper may have one or more openings. A hopper may have an inlet opening, outlet opening, identification opening, and/or the like. An inlet opening may function to receive one or more containers, container magazines, or both within the hopper. An outlet opening may function to allow dispensing of one or more containers therefrom. An identification opening may allow for an identification sensor to have access to one or more identifiers located on one or more containers. The inlet opening and outlet opening may be opposite one another (e.g., linear alignment), perpendicular to one another, or both. An inlet opening may be located at an upper end, side wall, or both of a hopper. An inlet opening may be located adjacent to a top cover or other portion of a housing. An inlet opening may be aligned with a container refill opening of a housing. An outlet opening may be located at a lower end, side wall, or both of a hopper. An outlet opening may be configured to align with a container handling subassembly (e.g., to dispense/drop a container), have a container handling subassembly be inserted therethrough (e.g., to grab a container), or both. An identification opening may be located along the side wall of a hopper. An identification opening may be biased toward (e.g., located closer to) the inlet opening or the outlet opening. The identification opening may be configured to be aligned with one or more identifiers located on one or more containers, container magazines, or both.

A hopper may have a height associated with a number of desired containers, servings, days, and/or the like. A hopper may have a height suitable for storing sufficient containers to feed an animal for 1 or more days, 2 or more days, 3 or more days, or even 4 or more days. A hopper may have a height suitable for storing sufficient containers to feed an animal for 10 or less days, 9 or less days, 8 or less days, or even 7 or less days. A hopper may be configured to hold 2 or more containers, 3 or more containers, 6 or more containers, 9 or more containers, or even 12 or more containers. A hopper may be configured to hold 30 or less containers, 24 or less containers, or even 21 or less containers.

A hopper may include one or more cutouts. One or more cutouts may allow a hopper to cooperate with a restraint mechanism. One or more cutouts may be formed in one or more side walls of a hopper. One or more cutouts may be formed toward and/or at the bottom of hopper, along a height of a hopper, or both. Each cutout may be associated with a roller. There may be an equal number of cutouts as rollers. One or more cutouts may include 2 or more cutouts, 3 or more cutouts, or even 4 or more cutouts. One or more cutouts may extend substantially linearly. One or more cutouts may extend perpendicular to a longitudinal axis of the hopper, vertical axis, or both. One or more cutouts may extend parallel to a longitudinal axis of the hopper, vertical axis, or both. One or more cutouts may extend in the same direction as one or more rollers (e.g., parallel longitudinal axes). At least partially disposed within the one or more cutouts may be one or more rollers.

A container storage subassembly may include one or more restraint mechanisms. One or more restraint mechanisms may function to retain one or a plurality of containers within a hopper and/or container magazine; work against gravity; selectively release a container (e.g., when ready to be consumed); or any combination thereof. One or more restraint mechanisms may be located adjacent to, partially disposed in, in proximity to, and/or the like one or more hoppers. One or more restraint mechanisms may include one or more rollers, drive units, gears, pulleys, and/or the like.

A restraint mechanism may include one or more rollers. One or more rollers may engage with one or more containers, retain one or more containers statically in place relative to the hopper, urge one or more containers into being dispensed from hopper, or any combination thereof. One or more rollers may have any size, shape, and/or configuration such as to engage with a flange of a container. The one or more rollers may be partially located within a hopper. The one or more rollers may be partially located within one or more cutouts. The roller may function by supporting the flange of the container (e.g., like a shelf). When a roller is static, the container may remain static within a hopper. Rotation of the roller may then urge a container to be dispensed from the chopper. Rotation of the roller may result in the container moving downward, exiting the hopper, passing through an outlet opening, moving toward a container handling subassembly, or any combination thereof. One or more rollers may be arranged such that the roller is parallel with one or more cutouts. One or more rollers may be parallel, perpendicular, or both relative to a longitudinal axis, vertical axis, or both of a hopper. One or more rollers may include one or more rotary shafts, fins, worm gears, and/or the like. One or more fins may be radially distributed about a rotary shaft. One or more rollers may include one or opposing rotary shafts with fins located at/near the bottom of a hopper. Opposing rotary shafts may be located on opposing sides of a hopper. Opposing rotary shafts may be in rotatable communication via one or more gears, rollers, the container, or a combination thereof. For example, an active roller may receive the torque from the drive unit. The active roller may relay that torque via one or more gears, pulleys, or even via the container to an inactive roller. The inactive roller may be located on the opposing side of the hopper as the active roller. One or more rollers may include one or a plurality of worm gears located along the length of the hopper, within the cutouts, or both. When static, a flange of a container may rest between teeth of the worm gear(s).

The one or more rollers may include one or more gears. The one or more gears may function to receive and/or transfer torque. One or more gears of a roller may be referred to as one or more roller gears, worm gears, or both. One or more roller gears may include one or more spur gears, bevel gears, worm gears, rack and pinion gears, internal gears, herringbone gears, cranks, the like, or any combination thereof. The one or more gears may be in communication with one or more other gears, a drive unit, or both. One or more gears may be in direct and/or indirect rotatable communication with one or more drive units. One or more spur gears or similar may be in driving communication with one or more gears associated with a drive unit.

A restraint mechanism may be mounted onto one or more portions of the housing. A restraint mechanism may be supported by a base, mid-support, support plate, top cover, and/or the like. A restraint mechanism may be supported on the same portion of a housing as a hopper. A restraint mechanism may include one or more bases (e.g., mounts). The one or more bases may statically, moveably (e.g., rotatably) support one or more other components of the restraint mechanism. The base may include one or more cradles for rotatably supporting one or more rollers, rotary shafts, drive shafts, and/or the like.

A container storage assembly may include and/or be configured to removably receive a container magazine. A container magazine may function to store a plurality of containers together as a set, allow for multiple containers to be disposed into the container storage assembly in a single loading step, allow for a plurality of containers to be shipped together and then loaded into the container storage assembly together, provide for easy user access for loading containers, or any combination thereof. A container magazine may function as a cartridge to insert a plurality of containers into the feeding assembly.

A container magazine may cooperate with a hopper, may function as a hopper, or both. A container magazine may be inserted into a hopper. A container magazine may be inserted into a hopper via an inlet opening, outlet opening, or both. A container magazine may be centered or off centered with a hopper. A container magazine may be removable from a hopper. A container magazine may be removed once empty, if different containers (e.g., flavor, size, brand) are desired, or both. An ejection mechanism (e.g., spring) may be available in the hopper to aid in removal from the hopper. A container magazine may be removed via an inlet opening, outlet opening, or both. A restraint mechanism may function as an ejection mechanism. A restrain mechanism may move (e.g., rotate) in an opposing direction to cause translation and/or at least partial ejection of a container magazine.

A container magazine may function as part of the housing, form part of the housing, and/or be disposed within the housing. A container magazine may form a removable portion of the housing. A container magazine may be removably inserted into the housing. The housing may include a reciprocal housing portion configured to receive the container magazine. A container magazine may be located adjacent to one or more waste collection subassemblies, identification sensors, transport subassemblies, the like, or any combination thereof.

A container magazine may have any shape, size, and/or configuration to hold a plurality of containers therein, be compatible with a hopper, or both. A container magazine may have an outer cross-sectional shape reciprocal with an interior cross-sectional shape of a hopper. A container magazine may have a shape and features as described hereinbefore relative to the hopper. A container magazine may include one or more inlet openings, outlet openings, identification openings, and/or the like. A container magazine may include or be free of one or more columns and/or slots.

A container magazine may include one or more vertical side walls. A singular, continuous side wall may provide for a generally corner free cross-sectional shape (e.g., circular, ovular, elliptical). A plurality of vertical side walls may provide for a cross-sectional shape having one or more vertices (e.g., square, rectangular, triangular).

A container magazine may provide a single column or a plurality of columns for container storage. A container magazine may be divided into multiple columns of container storage. Each column may retain one or a plurality of containers. Containers may be stacked such that one container supports an adjacent container, is in physical contact with an adjacent container, is spaced from an adjacent container, the like, or a combination thereof. For example, a lid of one container may support the container base of an adjacent container. For example, containers may be suspended or retained via slots and be in or free of contact with one another. As another example, each container may be disposed within its own dedicated slot or pocket.

A container magazine may define one or more slots. One or more slots may function to receive one or more containers. A slot may be dedicated to receiving one or a plurality of containers. For example, a container magazine may define multiple slots, each of the multiple slots configured to receive a container or a set of containers. A slot may receive all or a portion of a container. A slot may be formed as one or more indentations (e.g., grooves or notches) within an interior of a wall of the container magazine. An interior wall may be a vertical side wall. One or more slots may be continuous about an interior wall or discontinuous. In other words, a single slot may extend completely about an interior circumference and/or perimeter of the vertical wall(s). Discontinuous may mean a slot has a length which is smaller than an interior circumference and/or perimeter of the vertical wall(s). A single slot may retain a single container. A plurality of slots may cooperate together to retain a retainer. For example, two opposing slots may retain opposing sides of a flange of a container. A slot may receive and retain the flange of the container therein. A slot may be formed as one or more pockets. A pocket may receive an entirety of a container therein. The slots may be spaced apart evenly or unevenly along the length and/or diameter of a container magazine. The slots may be spaced apart, such as to accommodate different size containers (e.g., height, volume). For example, a smaller volume container may be stacked within the container magazine such that each slot retains a flange of a container while a larger volume container may be stacked within the container magazine such that every other slot retains a flange of a container.

A container magazine may be configured as a carousel magazine. A carousel magazine may be configured to be loaded with a plurality of containers. A carousel magazine may include a plurality of slots. A plurality of slots may be radially arranged about the center of the carousel magazine. The slots may retain one or a plurality of containers. A carousel magazine may be configured to be rotated about a horizontal or vertical axis or any angle therebetween. The slots may be open toward an exterior of the carousel magazine, toward an arm or other portion of the container storage subassembly, toward an interior of the carousel magazine, toward a central cavity, or any combination thereof.

A carousel magazine may include a circular hub. The circular hub may be configured to rotate about the horizontal or vertical axis or any angle therebetween. The circular hub may support one or more slots. Rotation of the circular hub may provide for rotation of one or more containers located within the one or more slots. Rotation of the circular hub may allow for one or more slots to be aligned with an access window of a central cavity.

A carousel magazine may include a central cavity. A central cavity may provide for a retrieval and/or dispensing location of a container. The central cavity may provide for an access point for one or more container handling subassemblies to retrieve a container. The central cavity may align with one or more container handling subassemblies to allow for dispensing of the container thereto. The central cavity may be coaxial with the circular hub. The central cavity may remain static while the circular hub rotates about the central cavity. The central cavity may include an access window. A slot may be rotated into place such as to align with the access window. A container may be transferred from a slot into the central cavity via the access window.

A container magazine may include one or more removable covers. One or more removable covers may function to retain one or more containers within the magazine, prevent premature dispensing of one or more containers from a container magazine, or both. One or more removable covers may be used during shipping and storage of a container magazine separate from a feeding assembly. One or more removable covers may be adhered to a wall of the container magazine. One or more removable covers may cover an inlet opening, outlet opening, or both. One or more removable covers may be removed or pierced by a user prior to disposing a container magazine into a feeding assembly, by a component of the feeding assembly upon insertion, and/or the like.

A container magazine may include one or more handles. A handle may provide a structure for easily grasping onto the magazine. A handle may facilitate grasping the container magazine for disposing into the container storage assembly, removing the container magazine from the container storage subassembly, or both.

A container magazine may include one or more identifiers. These identifiers may be in addition to or in lieu of one or more identifiers on one or more containers. The identifier of a container magazine may be similar to the one or more identifiers described as suitable for a container.

The feeding assembly may include a container handling subassembly. A container handling subassembly may function to receive a container from a container store subassembly, retain a container during transport to a feeding area, retain a container in a feeding area, retain a container base during removal of a lid, transport a container for disposal after use, or any combination thereof. A container subassembly may be configured to releasably engage one or more containers. A container handling subassembly may be configured to be disposed in or adjacent to a feeding area. A container handling subassembly may be configured to actively retrieve (e.g., grasp) a container, have a container disposed therein, or both. A container handling subassembly may be configured to actively release a container, have a container disposed therefrom, or both. A container handling subassembly may include one or more shuttle assemblies, gripper assemblies, or both. A container handling subassembly may include one or more cradles, holding supports, bearings, through holes, disposal bars, arms, plates, bases, actuators, the like, or any combination thereof.

A container handling subassembly may be coupled to a transport subassembly. A container handling subassembly may be affixed to or part of a transport subassembly. A container handling subassembly may be moved between positions via a transport subassembly.

A container handling subassembly may be moveable to one or more positions within the feeding assembly. The container handling subassembly may be moveable to various positions to interact with one or more containers and/or other subassemblies. One or more positions may include a loading position, opening position, feeding position, disposing position, resting position, the like, or a combination thereof.

In a loading position, a container handling subassembly may cooperate with a container storage subassembly, transport subassembly, or both. In a loading position, a container handling subassembly may be positioned such as to receive and/or retrieve a container from a container storage subassembly. In a loading position, a container handling subassembly may receive a container having a lid attached to a container base (e.g., closed container). In a loading position, a container handling subassembly may be located adjacent to, partially or completely disposed within, or both a container storage subassembly. In a loading position, a container handling subassembly may be located within a channel of the housing. The channel may be a channel formed in a mid-support, support plate, or both. In a loading position, a portion of the container handling subassembly may be aligned with one or more hopper openings of a mid-support, support plate, or both. In a loading position, a portion of a container handling subassembly may be aligned, adjacent to, inserted in, or a combination thereof with an inlet opening, outlet opening, or both of a container storage subassembly. In a loading position, a shuttle assembly may be adjacent to, below, or both a hopper. In a loading position, a shuttle assembly may be aligned with an outlet opening of a hopper. In a loading position, a cradle may be configured such as to receive a container therein. In a loading position, a cradle of a shuttle assembly may be substantially aligned (e.g., centered) with an outlet opening of a hopper. In a loading position, a gripper assembly may be configured to fit through an opening of a hopper or container magazine. In a loading position, a gripper assembly may be inserted into an opening of a hopper or container magazine. In a loading position, a gripper assembly may be configured such as to position a gripper about a container. A loading position may be located toward a rear of a feeding assembly, opposite a feeding area, or both. From a loading position, a container handling subassembly may move to an opening position.

In an opening position, a container handling subassembly may cooperate with a container opening subassembly, transport subassembly, or both. In an opening position, a container handling subassembly may be positioned such as to allow for opening of a container. Opening of a container may include removal of a lid or other covering, or otherwise accessing food within a container. An opening position may be a static position of a container handling subassembly or a dynamic range of positions. In other words, a container handling subassembly may remain static while a container opening subassembly moves to remove a lid, a container handling subassembly moves while a container opening subassembly remains static to remove a lid, or both the container opening subassembly and container handling subassembly move to remove a lid. In an opening position, a container handling subassembly may be positioned adjacent to, below, above, and/or in proximity to a container opening subassembly. In an opening position, a container handling subassembly may be positioned adjacent to, above, below, and/or in proximity to one or more waste collection subassemblies. For example, a container handling subassembly may be positioned adjacent to and above a waste collection subassembly such that upon removal of a lid, the lid may fall (e.g., via gravity) into a waste receptacle. In an opening position, a container handling subassembly may be located within a channel of the housing. In an opening position, a shuttle assembly and/or gripper assembly may move below and past a container opening assembly. An opening position may be located anywhere between the front and rear of a feeding assembly, between a container storage subassembly and a feeding area, or both. From an opening position, a container handling subassembly may move to a feeding position.

In a feeding position, a container handling subassembly may cooperate with one or more portions of a housing, a container holding subassembly, a transport subassembly, or a combination thereof to present a container in an open configuration to an animal. In a feeding position, a container handling subassembly may present and/or dispose a container into a feeding area. In a feeding position, a container is accessible from an outside of the housing by an animal for consumption of food therefrom. In a feeding position, a container handling subassembly may be positioned adjacent to, below, or both a container display opening. In a feeding position, a container handling subassembly may be located within the housing while a container is accessible from outside of the housing. In a feeding position, a container handling subassembly may be located between a container holding subassembly and portion of a housing (e.g., support plate), may have a housing (e.g., wall) located between the container holding subassembly and the container handling subassembly, or both. In a feeding position, a container handling subassembly may continue to retain a container while presented in the feeding position, may be free of the container while presented in the feeding area, or both. In other words, the container handling subassembly may continue to hold the container or may temporarily dispose of the container while the container is presented in the feeding area. In a feeding position, a container handling subassembly may cooperate with a container holding subassembly to place the container in a suitable location for consumption. In a feeding position, a shuttle assembly may cooperate with a lifting wedge to raise a container into a container display opening. In a feeding position, a gripper assembly may cooperate with support rails to hold a container in place. A feeding position may be biased toward or at a front of a feeding assembly, at or adjacent to a feeding area, or both. From a feeding position, a container handling subassembly may move into a disposing position.

In a disposing position, a container handling subassembly may cooperate with one or more portions of a housing, a container disposal subassembly, a transport subassembly, a waste collection subassembly, or a combination thereof to transfer a container (e.g., used container) into a waste collection subassembly. In a disposing position, a container handling subassembly may be positioned such as to dispose a container into a waste collection subassembly, cooperate with a container disposal subassembly, or both. In a disposing position, a container handling subassembly may dispose or release a container base. In a disposing position, a container handling subassembly may be located adjacent to, partially or completely disposed within, or both a waste collection subassembly. In a disposing position, a container handling subassembly may be located within a channel of the housing. In a disposing position, a container handling subassembly may be located adjacent to, below, above, and/or abut to a container disposing subassembly. In a disposing position, a shuttle assembly may be adjacent to, above, or both a waste receptacle. In a loading position, a disposal bar of a shuttle assembly may be moved into a holding support, may abut to and/or may be moved by a disposal subassembly, may move or otherwise urge a container out of a cradle, or combination thereof. In a disposing position, a gripper assembly may be configured to be inserted into a waste receptacle. In a disposing position, a support plate of a gripper assembly, one or more grippers, or both may release to allow a container to fall therefrom into a waste receptacle. A disposing position may be between a feeding area and a container storage subassembly, between a front and a rear of a feeding assembly, between a feeding area and a container opening subassembly, or any combination thereof. From a disposing position, a container handling subassembly may move to a resting position, may remain in place to transition into a resting position, or both.

In a resting position, a container handling subassembly may rest prior to retrieving or receiving a container. In a resting position, the container handling subassembly may be retained out of the way of other moveable or removable components. The container handling subassembly may cooperate with a transport subassembly to be arranged in a resting position. A resting position may be between a feeding area and a container storage subassembly, between a front and a rear of a feeding assembly, between a feeding area and a container opening subassembly, between a container disposal subassembly and a container storage subassembly, or any combination thereof.

A container handling subassembly may include a gripper assembly, a shuttle assembly, and/or the like. One or more components of a gripper assembly may cooperate with one or more components of a shuttle configuration. For example, a cradle may take on the form of a gripper. For example, a shuttle assembly may cooperate with an actuator for rotation. For example, a cradle may be paired with a gripper or support plate.

A container handling subassembly may include or be free of a shuttle assembly. A shuttle assembly may function to retain a container while being moved through various positions within the feeding assembly. A shuttle assembly may function to cooperate with a transport subassembly to move a container through various positions within a feeding assembly. A shuttle assembly may function to hold a container base while allowing for removal of a lid therefrom. A shuttle assembly may include a cradle, holding support, bearings, through holes, disposal bar, biasing devices, the like, or a combination thereof.

A shuttle assembly may include a cradle. A cradle may function to temporarily retain a container, cooperate with a container storage subassembly to receive a container, retain a container while being transported to various positions within the feeding assembly, retain a container base while allowing for removal of a lid, cooperate with a disposal subassembly to allow a container to be disposed therefrom, cooperate with a container holding subassembly (e.g., lifting wedge) to raise a container into a container display opening, or any combination thereof. A cradle may have any size, shape, and/or configuration for retaining a container. A cradle may have a cross-sectional shape reciprocal with a cross-sectional shape or outer peripheral shape of a container base. For example, a cradle may have a two-dimensional shape which is substantially U or C shaped, circular, ovular, square, rectangular, triangular, polygonal, the like, or any combination thereof. A cradle may include one or more keying features. One or more keying features may be the overall shape and/or size of the cradle and/or one or more features formed therein. One or more keying features may be similar or same as those described for the hopper. A cradle may have an opening, passthrough, one or more ramped surfaces, one or more biasing devices, and/or the like.

A cradle may have an opening. The opening may function to receive the container therein. A cradle may have a size such as to engage with a container base, cooperate with a flange of a container, or both. An opening of a cradle may have an opening that is equal to or larger than the outer width or diameter of a container base. An opening of a cradle may have an opening that is smaller than the outer width or diameter of a flange of a container. A cradle may have a container base located within the opening while a flange is resting atop the cradle.

A cradle may have a passthrough. A pass through may mean that the cradle is not completely continuous. For example, a substantially circular or ovular cross-section of a cradle may have a pass through such that the cradle forms a U or C shape. A cradle may be moveable relative to one or more other components of a shuttle assembly. A cradle may be movable relative to one or more holding supports. A cradle may be moveable retained in a holding support.

A cradle may include one or more ramped surfaces. One or more ramped surfaces may cooperate with one or more other components to lift a cradle toward a feeding area, present a container into a feeding area, or both. One or more ramped surfaces may face toward the bottom of a feeding assembly, a lifting wedge, or both. The one or more ramped surfaces may face toward one or more ramped surfaces of a lifting wedge. One or more ramped surfaces may cooperate with one or more opposing ramped surfaces while a container handling subassembly or shuttle assembly is being moved toward and into the eating position. Opposing ramped surfaces may apply an upward force to the ramped surfaces of the cradle, causing the cradle to lift away from the holding support. The cradle may transfer the upward force to the flanges of the container. Upward movement of the cradle may result in upward movement of the container being held therein. Upon retreating and moving away from a feeding position, the force from the one or more ramped surfaces may be removed. Upon removal of the force, the cradle may move back into position and rest on the holding support. The cradle may include one or more biasing devices. One or more biasing devices may bias a cradle toward the holding support. The force from the ramped surfaces may overcome the biasing force.

A shuttle assembly may include one or more holding supports. One or more holding supports may function to retain a cradle, a disposal bar, or both. The holding support may allow for movement of the cradle and/or disposal bar relative thereto. A holding support may affix a cradle to one or more bearings. A holding support may have an opening, rim or ledge, pass throughs, or any combination thereof. The opening and passthrough may have a shape and/or size substantially reciprocal with the size and/or shape of the cradle, container, container base, or any combination thereof. The opening and passthrough may perform a similar function as the opening and passthrough of the cradle. The holding support may include rim or ledge about the opening. The rim or ledge may function to support the cradle. The cradle may rest on the rim or ledge. The holding support may include one or more pass throughs. One or more pass throughs may moveably house one or more ramped surfaces, disposal bars, or both. One or more pass throughs may be formed about the opening, through the rim or ledge, be parallel to an axis of movement of a cradle, or combination thereof. One or more pass throughs may be formed adjacent to an opening, distanced from a rim or ledge, be parallel to an axis of movement of a disposal bar, be perpendicular to an axis of movement of a cradle, or any combination thereof. A holding support may be affixed to one or more bearings.

A shuttle assembly may include one or more bearings. One or more bearings may function to couple a container handling subassembly to a transport assembly, shuttle assembly to a transport assembly, or both. One or more bearings may be located on one or opposing sides of the shuttle assembly, on one or both sides of a holding support, one or both sides of a cradle, or a combination thereof. Opposing bearings may provide for balanced support of a container handling subassembly while moving within the feeding assembly. One or more bearings may be separate from or integral with (e.g., one-piece, formed with) a holding support. One or more bearings may function to house one or more shafts (e.g., drive shaft, support shaft). One or more bearings may include one or more through holes. One or more through holes may be keyed to match a shaft, may work with a shaft to convert rotation to linear motion, provide a surface which minimizes friction imparted on a shaft, or any combination thereof. One or more through holes may be a drive shaft through hole. One or more through holes may have a threaded interior to engage with a threaded exterior of a drive shaft. Rotation of a drive shaft within a through hole may result in conversion of rotation to linear movement. Rotation of a drive shaft within a through hole may result in the bearing moving along the length of the drive shaft. Movement along the length of a drive shaft may result in movement of a container handling subassembly within the feeding assembly, from one or more positions to one or more other positions, or both. One or more other through holes may receive one or more support shafts.

A shuttle assembly may include one or more disposal bars. One or more disposal bars may function to cooperate with a disposal subassembly, urge a container or container base out of the shuttle assembly, or both. One or more disposal bars may be moveable affixed to one or more portions of a shuttle assembly. One or more disposal bars may include one or more retaining legs. One or more retaining legs may be moveably housed within the holding support, bearings, or other portion of a shuttle assembly. One or more retaining legs may be axially moveable within the shuttle assembly. One or more retaining legs may reside within one or more pass throughs of a holding support. One or more retaining legs may include two opposing and distanced retaining legs. The retaining legs may be affixed to a transverse bar. A transverse bar may be located outside of the holding support, bearings, or both. A transverse bar may be located opposite a passthrough of a cradle. A transverse bar may be moveable toward and away from the cradle. Movement of the transverse bar may result in movement of the retaining legs relative to the holding support and/or bearings. The transverse bar may be configured to receive a disposal force from a container disposal subassembly. Opposite the transverse bar may be push bar. The push bar may also be affixed to and/or extend between the two retaining legs. The push bar may be located adjacent to, outside of, or both an opening of the cradle. The push bar may be biased or urged toward the opening, into the opening, overlapping with the opening, or any combination thereof. Upon being biased or urged, the push bar may come into contact with a container (e.g., container base) and apply a push force. The push force may be toward a pass through of a cradle. The push force may be applied by the push bar such that the container is urged out of the pass through of the cradle. Upon being urged out, a container may be disposed of from a container handling subassembly, fall into a waste collection subassembly, or both. The disposal bar may include or be in communication with one or more biasing devices, such as one or more springs. One or more biasing devices may bias a transverse bar away from the cradle. The force from disposal subassembly may overcome the biasing force and push the transverse bar toward the cradle.

A container handling subassembly may include or be free of a gripper assembly. A gripper assembly may be configured to engage with and hold a container in response to a transport subassembly moving the one or more grippers into the container storage subassembly, to facilitate remove of a lid associated with a container, and/or to dispose a container in a feeding area in response to the transport subassembly moving the container to the feeding area. A gripper assembly may move the container base of a container relative to a lid and/or maintain a position of a container base of the container while a container opening subassembly interacts with and removes the lid. A gripper assembly may include one or more arms, supports, actuators, or any combination thereof. The one or more pairs of arms, supports, or both may extend from a gripper base. The one or more pairs of arms and/or supports may be statically affixed to and/or hingedly affixed to the gripper base.

The gripper assembly may include at least one pair of arms. The pair of arms may function to be located around a container, grasp a container, release a container, access one or more containers, be able to be moved through one or more openings, the like, or any combination thereof. The pair of arms may be laterally spaced apart from each other, laterally moveable toward and away from each other, static relative to one another, or a combination thereof. The gripper assembly may include an upper pair of arms, lower pair of arms, or both. The upper pair of arms may be vertically spaced apart from the lower pair of arms, vertically moveable toward and away from the lower pair of arms, static relative to the lower pair of arms, or any combination thereof. A container may be disposed between the pair of arms, between the upper pair of arms and the lower pair of arms, or both. The one or more arms may be formed to have a contour reciprocal with one or more portions of a container. The one or more arms may be rigid, flexible, or both. The tips of the arms may be flexible. Flexibility may allow for one or more arms to bend and follow a contour of a container as a container moves into the space between the arms (e.g., lateral movement into the space between the arms).

The upper pair of arms may be rotated relative to the lower pair of arms between a closed securing position and an opening position (also referred to as a loading position, a feeding position, and/or a disposing position). In the securing position, the upper pair of arms may contact a container which is supported by a lower pair of arms and/or a lower support plate. In the opening position, the upper pair of arms may be rotated away from the lower pair of arms relative to a feeding position. In the opening position, the upper pair of arms may be moved out of contact with a container. To engage with a container, a lower pair of arms may be disposed below a flange or rim of a container and then raised vertically into engagement with the flange or rim, thus lifting the container. The container handling subassembly may then move the container (e.g., away from a container storage subassembly) and the upper pair of arms may transition from an opening position to as securing position to secure a container base between the upper pair of arms and the lower pair of arms. The upper pair of arms and the lower pair of arms may retain the container by applying opposing forces. The upper pair of arms may be located on an upper surface of lid and/or flange while the lower pair of arms may be located on a lower surface of the flange.

The upper pair of arms and/or lower pair of arms may be rotated toward and away from each other between a closed securing position and an opening position. The upper pair of arms and/or the lower pair of arms may function like a claw, rotating away from each other into an opening position and toward each other in a securing position. Each pair of arms may selectively move laterally apart or laterally close to each about. The pair of arms may move about the gripper base. The pair of arms may move closer together when inserted into or moved in proximity to a container storage subassembly. The gripper subassembly may be free of a lower pair of arms and only work with an upper pair of arms or vice-versa.

The gripper assembly may include one or more supports. One or more supports may include a lower support plate, lower support, upper support plate, upper support, the like, or any combination thereof. One or more supports may be in the form of one or more plates. One or more plates may be solid, hollow, or a combination of both. A plate may be referred to as a support plate, gripper plate, or both. One or more supports may be configured to be below and/or above a container. A support plate may be configured to be located below a container and have a container resting thereon. A support plate may be located below one or more pairs of arms. In a loading or securing position, a support plate may slide below a container or have a container disposed thereon. In a loading or securing position, one or more pairs of arms may rotate closer to one another to grasp a container which is supported by (e.g., located on, sitting on) a support plate.

The gripper assembly may include one or more engagement features. The one or more engagement features may engage with corresponding engagement features of a container. The one or more engagement features may facilitate alignment and/or securing of the container to the gripper assembly. The one or more engagement features may be part of one or more arms, supports, or both.

The gripper assembly may include one or more sensing devices. The one or more sensing devices may function to measure one or more parameters associated with a container. For example, the gripper plate may include a weight sensor and/or identifications sensor for measuring a parameter associated with the container.

The gripper assembly may include or be coupled to one or more actuators. The actuator may be configured to move the arms laterally and/or vertically apart or together, rotate one or more arms, rotate one or more supports, or any combination thereof. In this manner, the pair of arms may be configured to grip and secure a container, allow for retrieval from a container storage subassembly, release a container, and/or allow for disposing into a waste collection subassembly. The actuator may be a rotational actuator. One or more drive units or portions thereof as disclosed herein may be useful as an actuator. For example, the actuator may be a motor (e.g., stepper motor).

The gripper assembly may include one or more springs. One or more springs may allow a gripper assembly to naturally return to an open configuration or closed configuration in the absence of a transitioning force applied by one or more actuators, or applied due to an interaction between a container and an obstruction, such as a wall of a receptacle or a wall of a container storage subassembly.

A container handling subassembly may be configured to be compatible with a plurality of different gripper assemblies. A plurality of gripper assemblies may be provided in different shapes and/or sizes. Gripper assemblies may be configured to be compatible with particular container shapes and/or sizes or ranges of shapes and/or sizes. A container handling subassembly or a portion thereof may be selectively detachable and re-attachable to a feeding assembly. For example, a gripper assembly may be removable to attach a different size and/or shaped gripper assembly.

The feeding assembly may include a transport subassembly. A transport subassembly may function to cooperate with a container handling subassembly, move a container handling subassembly and/or container among varying positions withing a feeding assembly, or both. A transport subassembly may function to transport a container to a container opening subassembly, feeding area, and/or container disposal subassembly. A transport subassembly may function to move a container handling subassembly to a loading position, opening position, feeding position, disposing position, resting position, the like, or any combination thereof. A transport subassembly may function to move a container handling subassembly and/or container along one or more axes (e.g., axial movement), one or more linear directions, or both. A transport subassembly may move a container handling subassembly along a single axis, along two axes, and/or along three axes.

A transport subassembly may be located within the housing. A transport subassembly may be supported by one or more walls, a base, or both of a housing. A transport subassembly may be mounted onto a support plate, midsupport, or both. A transport subassembly may be located adjacent to, below, above, and/or in proximity to one or more waste collection subassemblies, container storage subassemblies, container opening subassemblies, disposal subassemblies, the like, or any combination thereof.

A transport subassembly may be coupled to and/or be part of a container handling subassembly.

A transport subassembly may include one or more support structures, mounting bars, drive units, trolleys, conveyer belts, track chains, rollers, actuators movable on rails, one or more ramp surfaces, and/or any other suitable components for transporting a container to an opening subassembly, feeding area, and/or container disposal subassembly.

A transport subassembly may include one or more drive units. One or more drive units may function to drive movement of a transport subassembly. One or more drive units may be as described herein. One or more drive units may function to drive movement along one or more support structures. One or more drive shafts of a drive unit may be engaged with a container handling subassembly. A drive shaft may extend through a through hole of a container handling subassembly. A drive shaft may extend through a bearing of a container handling subassembly. A drive unit in combination with a container handling subassembly may convert rotation into linear motion. For example, a drive shaft may be a lead screw. A drive shaft may be rotatably engaged with a container handling subassembly. A drive shaft may be rotatably engaged with a threaded through hole of a container handling subassembly. Rotation of the drive shaft may thus result in axial movement of the container handling subassembly along the longitudinal axis of the drive shaft. Rotation of a drive shaft by a drivee source may cause a container handling subassembly to move in the X, Y, and/or Z direction. One or more drive units may be referred to as one or more actuators.

For example, with a container handling subassembly which only moves in a single axial direction. A transport subassembly may be coupled to the container handling subassembly such that one drive shaft (e.g., lead screw) is in rotatable communication with the container handling subassembly. Rotation of the drive shaft in a first direction may cause the container handling subassembly to move toward a front of the feeding assembly, a feeding area, or both. Rotation of the drive shaft in a second direction may cause the container handling subassembly to move toward a rear of the feeding assembly, toward a loading position, or both.

For example, with a container handling subassembly which moves in three differential axual directions. A first actuator may be coupled to a first lead screw extending in the X direction, a second actuator may be coupled to a second lead screw extending in the Y, and a third actuator may be coupled to a third lead screw extending in the Z-direction, such that container handling subassembly can be moved independently, and sequentially or simultaneously in the X, Y, and/or Z-direction.

A transport subassembly may include one or more support shafts. One or more support shafts may function to provide bearing surfaces, may provide guides for the container handling subassembly to travel along, distribute the weight of a container handling structure, or any combination thereof. One or more support shafts may be located adjacent to, parallel, inside, or any combination thereof a channel within a housing. One or more support shafts may run parallel to a drive shaft. One or more support shafts may be located within one or more through holes of a container handling subassembly. One or more support shafts may extend through one or more bearings of a container handling subassembly. One or more support shafts may include two opposing support shafts. The opposing support shafts may be located on and support opposing sides of a container handling subassembly.

A transport subassembly may include one or more support structures. One or more support structures may function to move a container handling subassembly from one or more positions to one or more other positions in the feeding assembly. One or more support structures may move a container handling subassembly from a loading position to a lid removal position, from a loading position and/or lid removal position to a feeding position, from a feeding position to a disposal position, from a feeding area and/or disposal position to a resting and/or loading position, the like, or any combination thereof. Support structures may include one or more mounting bars. Support structures may include a first mounting bar extending vertically from the base of the housing. A first mounting bar may allow for a container handling subassembly to be translated in a vertical direction (e.g., in the Z-direction). For example, to vertically align the container handling subassembly with any one of the containers that may be vertically stacked in the container magazine and/or hopper. The support structures may also include a first set of mounting bars extending in a first direction perpendicular to the vertical direction (e.g., the X-direction). Support structures may include a second set of mounting bars extending in a second direction perpendicular to the first direction and the vertical direction (e.g., the Y-direction). The first and second set of mounting bars may allow for a container to be translated in the first and second directions. The support structures work together to provide for movement of the container handling subassembly across three dimensions and three different axes.

The transport subassembly may also include a rotational actuator. A rotational actuator may be configured to rotate the container handling subassembly about the vertical or Z-axis. For example, in a first configuration, the rotational actuator may be configured to orient the container handling subassembly in a first radial orientation in which the container handling subassembly faces the container storage subassembly. This may allow the container handling subassembly to access the containers disposed in the container handling subassembly or allow the container handling subassembly to be moved into or out of a waste collection subassembly. A rotational actuator may be configured to selectively reorient the container handling subassembly in a second radial orientation in which the container handling faces the feeding area to allow at least a portion of the container handling subassembly to be selectively moved into or out of the feeding area. A rotational actuator may include a gear, wheel, pulley, and/or the like.

The feeding assembly may include a container opening subassembly. A container opening subassembly may function to open a container, to remove a lid, to separate a lid from a container base, to remove or at least partially open a casing, the like, or a combination thereof. A container opening subassembly may be referred to as lid removal subassembly or structure.

A container opening subassembly may be configured to releasably couple to the lid, apply a pulling force to a lid, and remove a lid from a container base. A container opening subassembly may be configured to releasably couple to a casing, apply a pulling and/or cutting force to a casing, remove a casing and/or expose a food within a casing. A container opening subassembly may engage with a lid and/or peel the lid from the container base as the lid and/or the container base is moved (e.g., via a transport subassembly, container handling subassembly, or both). A container opening subassembly may be configured to move the lid away from the container base while the container base is held static, retain the lid in place while the container base is moved, or move the lid away from the container base while the container base is also simultaneously moved away from the lid.

A container opening subassembly may include one or more components which function as an arm, knife, hook, clamp, can opener, vacuum source, jaws, the like, or any combination thereof.

A container opening subassembly may be located between a container storage subassembly and a feeding area, near an opening position, between a loading position and a feeding position of a container handling subassembly, the like, or any combination thereof. A container opening subassembly may be located above, adjacent, below, and/or in proximity to a container handling subassembly, waste collection subassembly, or both. A container opening subassembly may be located above a container handling subassembly, a waste collection subassembly, or both. This positioning may allow for a container having a lid to pass below a container opening subassembly for removal of a lid located on an upper portion, prevent food from spilling during lid removal, or both. This positioning may allow for a lid, once removed, to be disposed (e.g., fall), into a waste collection subassembly. A container opening subassembly may be located within the housing. A container opening subassembly may be located within a top cover, be mounted to a support plate, in proximity to a hopper, the like, or any combination thereof.

A container opening subassembly may include one or more jaws, drive units, drive supports, arms, hooks, and/or the like.

A container opening subassembly may include a pair of jaws. The jaws may function to grasp and pinch a portion of a lid, hold a lid static while a container base is moved, move the lid while the container base is held static, or move the lid while the container is also moved in an opposing direction. The pair of jaws may grasp and pinch an extension tab of a lid, container base, or both. The pair of jaws may include two moveable jaws or one moveable jaw and one stationary jaw. The pair of jaws may be distanced from one another in an open configuration, and moved closer together and/or into contact in the pinch configuration. A stationary jaw may be held in place via being mounted to one or more portions of a housing. A stationary jaw may be mounted to a support plate and/or mid-support of a housing.

A distance between the pair of jaws may be referred to as a pinch gap. The pinch gap may be the gap where a portion of the lid is received. The pinch gap decreases as the jaws move into the closed configuration.

A moveable jaw may be moveable via one or more drive units. A moveable jaw may be driven into the open configuration and pinch configuration by a drive unit. A moveable jaw may convert rotation into linear motion, rotation about a different axis, or both. A moveable jaw may cooperate with a screw and nut system. For example, the drive unit may be a motor with a drive shaft. That drive shaft may have a nut assembled thereon associated with the moveable jaw. A drive support may house the drive shaft, may be affixed to the stationary jaw or a moveable jaw, or both. A moveable jaw may move into the open configuration by axially (e.g., linear) moving away from the stationary jaw, by rotating (e.g., pivoting) away from the stationary jaw, or both.

A container opening subassembly may include a hook. A hook may function to latch or otherwise engage with an opening of a lid, hold a lid static while a container base is moved, move the lid while the container base is held static, or move the lid while the container is also moved in an opposing direction. The hook may be moved into place to align with the opening when the container is moved via the container handling subassembly, may remain static and be in the path of movement of the container when moved via the container handling subassembly, or both. The hook may be mounted onto an arm. The arm may be static relative to the housing, may be rotated via one or more hinges, may be axially moved (e.g., lateral or vertical), or any combination thereof.

The feeding assembly may include a container holding subassembly. The container holding subassembly may function to retain a container in a feeding area, present a container in a feeding area, or both. The container holding subassembly may cooperate with one or more container handling subassemblies, transport subassemblies, portions of the housing, or any combination thereof to prevent movement of a container while in a feeding area, to facilitate presenting of a container in a feeding area, or both. A container holder subassembly may include or be a lifting wedge, arms, rails, shroud, or combination thereof.

A container holding subassembly may include a lifting wedge. A lifting wedge may function to provide a lifting force to a portion of a container handling subassembly. A lifting wedge may cooperate with a cradle to raise a cradle away from a holding support, or both. A lifting wedge may cooperate with one or more ramped surfaces of a cradle. A lifting wedge may include one or more reciprocal and opposing ramped surfaces. The ramped surfaces of the lifting wedge may be reciprocal with the ramped surfaces of a cradle. A lifting wedge may be located in and/or over a channel of a mid-support and/or support plate, under a container display opening, or both. A lifting wedge may have an opening. The opening may have a shape reciprocal with an outer shape of a container base. The opening may cooperate with an opening of cradle. The lifting wedge and the cradle, when in the feeding position, may wrap about the container to retain the container in place.

A container holding subassembly may include a set of arms, rails, and/or a shroud configured to secure a container within a feeding area and/or cooperate with a support plate of a gripping assembly so as to inhibit movement of the container relative to the housing as the animal is interacting with and feeding from the container.

The feeding assembly may include one or more container disposal subassemblies. A container disposal subassembly may urge a used container into a waste collection subassembly, cooperate with a container handling subassembly, cooperate with a transport subassembly, or any combination thereof. A container disposal subassembly may have a configuration which cooperates with a path of movement of a container handling subassembly. A container disposal subassembly may cause disposal of a container (e.g., used container base) from a container handling subassembly when moving away from a feeding position, at the disposing position, moving toward a resting position, moving toward a loading position, the like, or any combination thereof. A container disposal subassembly may be configured to move out of the way or otherwise not disturb a container in a container handling subassembly while moving toward a feeding position. A container disposal subassembly may be located along a path of movement of a container handling subassembly. A container disposal subassembly may be located on one or both sides of a channel. The one or more container disposal subassemblies may include two opposing disposal subassemblies on each side of a channel. A container disposal subassembly may be configured to retract away from a channel and/or a travel path and avoid disturbing a container when a container handling subassembly is traveling toward a feeding position. A container disposal subassembly may be configured to extend into a channel and/or a travel path to transfer a biasing force to a container handling subassembly to urge a container to be disposed. A container disposal subassembly may be located above, in proximity to, below, and/or adjacent to one or more waste collection subassemblies. A channel may be the channel in a mid-support, support plate, or both. A container disposal subassembly may include a mount, plunger, spring, ramped surface, levers, and/or the like.

A container disposal subassembly may include a mount. A mount may function to affix a container disposal subassembly to one or more portions of a housing. A mount may be referred to as a mounting bracket. A mount may affix a container disposal subassembly to a mid-support, support plate, or both. A mount may be located adjacent to a channel of a mid-support, support plate, or both. A mount may be located between a feeding area and a container storage subassembly. A mount may be a mounting bracket. The mounting bracket may be affixed to the housing via one or more fasteners. The mounting bracket moveably house a plunger, spring, and/or the like.

A container disposal subassembly may include a plunger. A plunger may function to contact a portion of a container handling subassembly and urge a container to be disposed therefrom. A plunger may contact and apply a pushing force onto a disposal bar of a container handling subassembly. A plunger may come into contact with a disposal bar as the container handling subassembly is moved from a feeding position toward the disposing position, resting position, loading position; from a front toward a rear of the feeding assembly; or any combination thereof. A plunger may be moveably affixed to a mount. A plunger may partially reside within a mount, between a mount and a mid-support or support plate, or a combination thereof. A plunger may include a ramped surface. A ramped surface may allow for a container handling subassembly to move toward a feeding position from a loading position, opening position, or both; from a rear toward a front; or a combination thereof. A ramped surface may allow for a container handling subassembly to move toward a feeding position without disrupting a container seated therein. A container handling subassembly may come into contact with the ramped surface and bias the plunger away. The container handling subassembly may apply force to the ramped surface that is then transferred to a biasing device. The force may compress the biasing device. By allowing the biasing device to compress, the plunger may move into the mount and retract away from the path of travel of the container handling subassembly.

A container disposal subassembly may include a biasing device. A biasing device may function to apply a biasing force to a plunger, allow for a plunger to be retracted, transmit a biasing force to a container handling subassembly, or any combination thereof. A biasing device may be a spring. A spring may include a compression spring. The biasing device may be affixed to the mount, plunger, or both. A biasing device may provide for biasing force which urges a plunger away from a mount, toward a channel, toward a container handling subassembly, or a combination thereof. A biasing device provides for a sufficient biasing force to cause movement of a disposal bar of a container handling subassembly. The biasing device may also be compressed, allow for a plunger to be retracted away from a channel and/or container handling subassembly, or both.

The feeding assembly may include one or more waste collection subassemblies. A waste collection subassembly may be configured to collect one or more lids, container bases, food, and/or the like; collect one or more lids after removal from a container base; collect one or more container bases after an animal has been given the opportunity to consume therefrom; collect residual waste; the like; or any combination thereof. A waste collection subassembly may be easily accessible such that a user may be able to easily access waste contents within the waste collection subassembly for disposal. A waste collection subassembly may include one or more waste receptacles, openings, residual waste collectors, or both. A waste collection subassembly may include one or more waste receptacles, openings, removable lids, seals, trash bags, the like, or any combination thereof. A waste receptacle may be configured to receive lids, container bases, residual waste, or a combination thereof.

One or more waste collection subassemblies may be located within the housing, supported by the housing, form part of the housing, and/or any combination thereof. One or more waste collection subassemblies may be located within, below, above, and/or adjacent to a base of a housing. One or more waste collection subassemblies may be located below one or more feeding areas, container handling subassemblies, one or more container opening subassemblies, transport subassemblies, below part or all of a movement path of one or more containers within the feeding assembly, or any combination thereof. One or more openings of a waste collection subassembly may be aligned with one or more channels of one or more mid-supports, support plates, or both of a housing.

One or more waste collection subassemblies may include one or more waste receptacles. A waste receptacle may function to provide a hollow cavity which receives waste (e.g., lids, container bases, residual waste), cooperates with one or more components of a housing to have the waste receptacle removably retained therein, or both. A waste receptacle may function to collect waste, temporarily store the waste, prevent malodors related to waste (e.g., odor from residual food) from exiting the device, or a combination thereof. One or more waste receptacles may have any size, shape, and/or configuration to be stored within the housing or form part of the housing. One or more waste receptacles may have a shape reciprocal with a waste cavity. A waste cavity may be formed in a housing. A waste cavity may be formed in the base of the housing. The waste receptacle, or portions thereof, may have a three-dimensional shape which is substantially spherical, ovoidal, cylindrical, cuboidal, conical, pyramidical, the like, or any combination thereof.

A waste receptacle may be configured to retain a waste bag (e.g., trash bag) therein. A waste bag once filled with waste may be removed from a waste receptacle and disposed of. The waste receptacle may be free of using a bag. A user may simply remove waste from a waste receptacle and then cleanse an interior of the waste receptacle.

One or more waste receptacles may be formed as one or more drawers, baskets, stationary containers, and/or any accessible configuration.

A basket may generally refer to a waste receptacle which defines a receptacle for the waste and the basket is removably stored within a cavity of the housing. The cavity of the housing may be closed and opened by a door. The door may be part of the housing. The door may be hinged or otherwise similarly openable to access the basket. A basket may be moveable along any plane in and out of the waste cavity.

A stationary container may generally refer to a receptacle which defines a receptacle for the waste and remains affixed to the housing. The stationary container may remain stationary relative to a base and/or other components of a housing while waste is being removed from therein. A stationary container may have a cover. A cover may be removable to access the waste therein for removal.

A drawer may generally refer to a waste receptacle which defines a receptacle for the waste and is able to slide in and out of a waste cavity. Movement of the drawer may be caused by pushing and pulling. A wall of a drawer may be used as a front panel to receive the pushing and pulling force. Generally, a waste drawer may slide along a substantially horizontal plane.

One or more waste receptacles may be configured as a waste drawer. One or more waste receptacles may include one or more handles. One or more handles may allow for easily pulling and pushing the waste receptacle from and into the feeding assembly. One or more waste receptacles may include one or more side walls, front panels, rear panels, or any combination thereof. One or more side walls and/or panels may include one or more features for cooperating with a housing for easy insertion and removal therefrom. One or more features may include one or more rails, grooves, and/or the like. For example, a waste receptacle may be formed as a waste drawer having rails or grooves on the side walls which slidably engage with mating features of a waste cavity in a base.

A waste collection subassembly may include a seal. One or more seals may function to prevent odor from transferring from a waste receptacle and/or base to an exterior of the feeding assembly. The one or more seals may include any seal capable of forming a sealing junction between two or more surfaces to prevent malodors from passing therethrough. The one or more seals may include one or more mechanical seals. The one or more mechanical seals may include one or more adhesives, sealants, gaskets, compressing fittings, plugs, the like, or any combination thereof. One or more gaskets may include one or more flange gaskets, O-ring gaskets, brush seals, the like, or any combination thereof. The one or more seals may be located about the opening which defines an entry into a waste receptacle. The one or more seals may be located about a rim of a waste drawer. The seal may seal a gap between a waste receptacle and a base, mid-support, support plate, or any combination thereof. The one or more seals may allow for a waste receptacle to be moved in and out of a waste cavity.

A single waste collection subassembly may receive all of the waste associated with a container (e.g., lid, container base, residual waste) or a plurality of waste collection subassemblies may be dedicated to receiving the different types of waste. A plurality of waste collection subassemblies may include a lid waste subassembly (e.g., first waste collection subassembly), a container base waste subassembly (e.g., second waste collection subassembly), a residual waste subassembly, the like, or any combination thereof.

A lid, once removed, may fall from or be released by the container opening subassembly into a waste collection subassembly. Another component or subassembly, such as a container handling subassembly, may be configured to urge a separated lid away from a container opening subassembly such that the lid falls into the waste collection subassembly.

A container base, after removal from a feeding area, may fall into, be transported to, be released into, or a combination thereof into a waste collection subassembly. A transport subassembly and/or container handling subassembly may move a used container base from a feeding area to above or into a waste collection subassembly. Another component or subassembly, such as a portion of a container handling subassembly, disposal subassembly, or both may be configured to urge a used container base away from a container handling subassembly such that the container base falls into the waste collection subassembly.

The container bases may be stacked or distributed within the waste collection subassembly. Distribution may be random or substantially uniform. A waste collection subassembly dedicated to receiving container bases may be shaped such as to receive used container bases. A waste receptacle may have a cross-sectional shape corresponding to the shape of the perimeter of a used container base. As additional used container bases are added, the used container bases may form a vertical stack of used container bases. The used container bases may at least partially nest with adjacent container bases. The depth of nesting may depend on the volume of food remaining within a used container base.

A residual waste collector may be disposed beneath one or more positions where a container may be located. A residual waste collector may function to collect any food or waste spilled in or outside of the housing. A container may include wet food that includes water and/or small food chunks. Wet food may spill out of the container during movement of the container within the housing, while being consumed by an animal, or both. A residual waste collector may receive any splashes of wet food that may fall out of the container. A residual waste collector may be configured to be periodically removed from the feeding assembly, cleansed, and then reinstalled into the feeding assembly.

The residual waste collector may include or be formed as a bottom surface of the feeding assembly. The residual waste collector may cooperate with one or more waste receptacles. A residual waste collector may be located in surfaces below a path of a container within a feeding assembly that may not have a waste receptacle located underneath. A residual waste collector may generally be a flat structure. A residual waste collector may be formed as a tray, mat, and/or the like. A residual waste collector may be removable and reusable. A residual waste collector may be washable.

A residual waste collector may be made of one or more washable materials. For example, a washable mat may be a rubber or polymer mat and/or a metallic or plastic tray.

A residual waste collector may be located outside of or extend out of the housing. A residual waste collector may extend outside of the housing and/or may be adjacent to the feeding area. The residual waste collector may also extend into the feeding area outside the housing such that at least a portion of the residual waste collector is disposed beneath the container and/or in front of the feeding area. The residual waste collector or a separate residual waste collector can be entirely disposed of in the feeding area or adjacent to the feeding area outside the housing.

The feeding assembly may include one or more drive units. One or more drive units may be configured to drive movement of one or more components of the feeding assembly. The one or more drive sources may be associated with container storage assembly (e.g., restraint mechanism), a transport subassembly, a container opening subassembly, a container handling subassembly (e.g., grippers), a moveable cover (e.g., covering the container display opening), and/or the like. One or more drive sources may be shared amongst different components or be dedicated drive sources. For example, a drive source associated with the transport subassembly may also be associated with a container opening subassembly. A drive unit may also be referred to as an actuator.

A drive unit may include one or more drive sources. A drive source may convert electrical energy into mechanical energy. A drive source may be configured to be in electrical communication with a power source. A drive source may be a motor or other power supply. The drive source may be an electronic motor, pneumatic power supply, hydraulic power supply, another power supply, or a combination thereof. An exemplary electronic motor may include a stepper motor. The drive source may transfer or produce torque in a drive shaft.

The drive source may include a drive shaft. The drive shaft may receive torque from the drive source, output torque, or both. The drive shaft may be in communication with the drive source. The drive shaft may be rotationally affixed to the drive source. A drive shaft may include a lead screw.

The drive unit may include and/or be in communication with one or more gears. The drive source, drive shaft, or both may be in rotational communication with one or more gears. The drive source, drive shaft, or both may transfer torque and/or drive one or more gears. One or more gears may include one or more drive gears. One or more gears may be directly engaged or in communication with the drive shaft. The one or more gears of a drive unit may engage with one or more gears of a container storage assembly (e.g., restraint mechanism), a transport subassembly, a container opening subassembly, a container handling subassembly (e.g., grippers), a moveable cover (e.g., covering the container display opening), and/or the like.

The feeding assembly may include one or more sensing devices. One or more sensing devices may function to sense a presence of one or more containers, obtain one or more parameters of one or more containers and/or container magazines, sense a position of one or more subassemblies, or any combination thereof. One or more sensing devices may generally function to sense a status of one or more components within the feeding assembly. One or more sensing devices may be in electrical communication with one or more controllers. One or more sensing devices may include one or more identification sensors, container presence sensors, holder position sensors, weight sensors, the like, or any combination thereof.

One or more sensing devices may include one or more identification sensors. One or more identification sensors may function to read and/or communicate with one or more identifiers. One or more identification sensors may be disposed proximate to the container storage subassembly. One or more identification sensors may be disposed such as to have a view of, form a connection with, or both one or more identifiers of one or more containers. One or more identification sensors may function to obtain one or more parameters associated with the container and/or food therein, obtain access to a database or other repository having one or more parameters associated with the container and/or food therein, or both. One or more identification sensors may be any type of transceiver compatible with any identifier disclosed herein, able scan or read an identifier, able to obtain parameters associated with a container or food therein, able to direct a controller as to where to obtain parameters associated with a container or food therein, the like, or any combination thereof. The one or more identification sensors may include one or more radio frequency transmitters, barcode readers, QR code readers, nearfield communication transmitters (NFC), image sensors, the like, or any combination thereof. The identification sensor may be an optical sensor (e.g., a UV sensor, an IR sensor, a CCD camera, an electrical sensor, etc.). The one or more identification sensors may be compatible with one or more identifiers including a bar code, a QR code, a reflective feature, a scannable optical feature, an IR or UV visible printed feature, raised or recessed features, or an electrical circuit (e.g., a resistive electrical circuit), an NFC chip, an RFID, or any other visual, electric, or electromagnetic indicator.

One or more sensing devices may include one or more container presence sensors. One or more container presence sensors may function to determine if a container has been retrieved by, received in, is positioned correctly in, or any combination thereof a container handling subassembly. The one or more sensing devices may be any type of sensing device which may detect a presence of a container in a container handling subassembly. One or more presence sensors may identify the presence of a container by sight or blocking of a light path, by mass, and/or the like. A presence sensor may continuously or intermittently monitor for presence of a container. A presence sensor may automatically check for presence of a container after a container storage subassembly has been triggered to release a container, a container handling subassembly has been triggered to retrieve a container, or both. One or more presence sensors may include one or more mass sensors, capacitive sensors, infrared sensors, laser sensors (e.g., time of flight), ultrasonic sensors, membrane sensors, radio frequency (RF) admittance sensors, conductive sensors, optical interface sensors, microwave sensors, the like, or combination thereof.

A presence sensor may be located at any location within the feeding assembly suitable for detecting presence of a container within the container handling subassembly. The presence sensor may be mounted onto the container handling subassembly, may be mounted to the housing, or both. The presence sensor may be mounted in close proximity to a container storage subassembly. The presence sensor may be mounted toward the rear of a feeding assembly. The presence sensor may be mounted onto a support plate, mid-support, or both. The presence sensor may be mounted adjacent to, toward a rear of, or both a channel of a mid-support, support plate, or both.

One or more sensing devices may include one or more position sensors. One or more position sensors may function to detect a position of one or more subassemblies within the feeding assembly. One or more position sensors may function to detect the position of a container handling subassembly. One or more position sensors may function to detect if a container handling subassembly is stationed at the loading position. By checking that a container handling subassembly is at a loading position, the position sensors acknowledge that the container handling subassembly is ready to receive and/or retrieve a container from a container storage subassembly. Any type of sensor suitable as a presence sensor may also be utilized as a position sensor. A position sensor may include one or more switches, such as an optical end stop switch. A position sensor may include a position pocket. A position pocket may be an indentation. The indentation may be reciprocal with an extension projecting from a container handling subassembly. The extension may project from any portion of the container handling subassembly. The extension may be seated within the position pocket when the container handling subassembly is at the loading position.

A position sensor may be located at any location within the feeding assembly suitable for detecting a container handling subassembly being at a desired position, such as a loading position. The position sensor may be mounted onto the container handling subassembly, may be mounted to the housing, or both. The position sensor may be mounted in close proximity to a container storage subassembly, loading position, or both. The position sensor may be mounted toward the rear of a feeding assembly. The position sensor may be mounted onto a support plate, mid-support, or both. The presence sensor may be mounted adjacent to, toward a rear of, or both a channel of a mid-support, support plate, or both. The position sensor may be mounted in close proximity to the presence sensor.

One or more sensing devices may include one or more weight sensors. One or more weight sensors may function to measure the weight of a container before feeding the animal and after the animal has finished eating. One or more weight sensors may function to weigh a container before, during, and/or after being positioned at a feeding area. One or more weight sensors may include one or more strain gauges (incl. load cell), impedance sensors (e.g., capacitive-based weight sensor), hydraulic sensors, pneumatic sensors, the like, or any combination thereof. One or more weight sensors may be affixed to or part of one or more container handling subassemblies, transport subassemblies, housings, the like, or a combination thereof. One or more weight sensors may be affixed to one or more support plates of one or more container handling subassemblies. One or more weight sensors may be affixed to one or more support plates of one or more housings. One or more weight sensors may measure an overall weight of a transport subassembly, container handling subassembly, container, or a combination thereof to determine a weight of a container.

The feeding assembly may include one or more temperature control devices. The one or more temperature control devices may function to maintain and/or change the temperature of food in a container to a temperature desirable for one or more animals to promote consumption of the food, to prevent growth of bacteria, or both. The one or more temperature control devices may function to maintain, decrease, and/or increase the temperature of the food within a container. The one or more temperature control devices may control temperature of one or more containers contained within a container storage assembly, a feeding area, a waste receptacle, and/or the like. The one or more temperature control devices may function by being in direct and/or indirect contact with or in proximity to a container, hopper, container magazine, waste receptacle, and/or the like. The one or more temperature control devices may be housed within a top cover, base, gap between a mid-support and support plate, the like, or any combination thereof. One or more temperature control devices may include one or more refrigeration systems. One or more refrigeration systems may include one or more mechanical-compression refrigeration systems, absorption refrigeration systems, evaporative cooling systems, thermoelectric refrigeration systems, or combination thereof.

The feeding assembly may be in communication with or include one or more power sources. A power source may function to provide power to one or more components of the device. A power source may be any typical power source for consumer products. A power source may be an outlet, direct current, alternating current, the like, or a combination thereof. The device may house an adapter for a power source, such as in base of the feeding assembly.

Controller

The feeding assembly may include one or more controllers. The one or more controllers may function to receive one or more signals, transmit one or more signals, control operations of one or more components of the device, or a combination thereof. The one or more controllers may be configured to control overall operation of the feeding assembly. The one or more controllers may be in communication with one or more sensing devices, subassemblies, communication modules, other components, or any combination thereof. The one or more controllers may be adapted to receive one or more signals from the one or more sensing devices, subassemblies, communication modules, and/or the like. The one or more controllers may be in electrical communication with one or more sensing devices, subassemblies, communication modules, and/or the like. The one or more controllers may interpret one or more signals from one or more sensing devices as one or more status signals, parameters, and/or other information. The one or more controllers may automatically receive, interpret, and/or transmit one or more signals. A controller may be configured to receive a signal indicative of one or more parameters associated with a container from one or more identification sensors. The controller may determine the parameters directly via the information from the identification sensor and associated signal or may communicate via a network to obtain further information. The one or more controllers may automatically control one or more operations of one or more components upon receipt of one or more signals or instructions. A controller may selectively cause a transport subassembly to move a container handling subassembly between a container storage subassembly and feeding area and/or any positions therebetween. A controller may be configured to adjust a movement speed of a transport subassembly, container handling subassembly, or both. A speed may be adjusted based on one or more parameters associated with a container. A controller may be housed and/or supported y one or more portions of a housing. A controller may be located within and/or supported by a base, mid-support, support plate, top housing, the like, or any combination thereof. The one or more controllers may include one or more controllers, microcontrollers, microprocessors, processors, storage mediums, or a combination thereof. The one or more controllers may include one or more computing devices, processors, storage mediums, or any combination thereof. The one or more controllers may be in communication with one or more other computing devices, processor(s), storage mediums, or any combination thereof.

System Including Feeding Assembly

The feeding assembly may be incorporated into a system. A system may include a network, one or more computing devices in communication with the feeding assembly, or both. A system may be useful for allowing for remote control and/or monitoring of a feeding assembly. A system may include one or more feeding assemblies, computing devices, processors, storage mediums, databases, a network, communication modules, communication hubs, and/or the like.

The feeding assembly may include and/or be in communication with one or more computing devices. The one or more computing devices may function to receive and/or transmit one or more signals, convert one or more signals to data entries, to send one or more data entries to a storage medium, to store one or more data entries, to retrieve one or more data entries from a storage medium, to compute one or more algorithms, apply one or more rules, or any combination thereof. One or more computing devices may include or be in communication with one or more other computing devices, processors, storage mediums, databases, or any combination thereof. One or more computing devices may communicate with one or more computing devices, processors, storage mediums, databases, or any combination thereof. Communication between computing devices may be controlled or managed via a managed cloud service. The one or more computing devices may include one or more non-transitory storage mediums. A non-transitory storage medium may include one or more physical servers, virtual servers, or a combination of both. One or more servers may include one or more local servers, remote servers, or both. One or more computing devices may include one or more processors of the feeding assembly, one or more controllers, personal computers (e.g., laptop, desktop, etc.), mobile computing devices (e.g., tablet, mobile phone, etc.), or a combination thereof. One or more computing devices may refer to the plurality of computing devices used across the system, located in the feeding assembly, in communication directly to the feeding assembly, and/or in indirect communication to the feeding assembly via a network. One or more computing devices may use one or more processors.

One or more computing devices may include one or more processors. The one or more processors may function to analyze one or more signals across any part of the system. The one or more processors may function to analyze one or more signals from the feeding assembly or one or more components thereof, one or more other computing devices, one or more other processors, one or more storage mediums, databases, communication modules, the like, or any combination thereof. The one or more processors may be located within or in communication with one or more computing devices, controllers, servers, storage mediums, or any combination thereof. One or more processors may be in communication with one or more other processors. The one or more processors may function to process data, execute one or more algorithms to analyze data, apply one or more rules, evaluate data against one or more rules, or any combination thereof. The one or more processors may automatically process data, execute one or more algorithms, apply one or more rules, evaluate data, or a combination thereof; may wait for an instruction or signal such as from a user; or any combination thereof. Processing data may include receiving, transforming, outputting, executing, the like, or any combination thereof. One or more processors may be part of one or more hardware, software, systems, or any combination thereof. One or more hardware processors may include one or more central processing units, multi-core processors, front-end processors, the like, or any combination thereof. One or more software processors may include one or more word processors, document processors, the like, or any combination thereof. One or more system processors may include one or more information processors, the like, or a combination thereof. One or more processors suitable for use within the device as part of the one or more controllers may include a microcontroller, such as Part No. PIC18F45K22 and/or Part No. PIC18F46J50 produced by Microchip Technology Inc., incorporated herein by reference in their entirety for all purposes. The one or more processors may be located within a same or different non-transient storage medium as one or more storage mediums, other processors, communication modules, communication hubs, or any combination thereof. The one or more processors may be an ARM-based processor, ASIP processor, FPGA process, or any combination thereof. Exemplary ARM-based processors may include one or more of the Cortex-M Family, versions ARM to ARMv6 (ARM 32-bit), version ARMv6-M to ARMv9-R (ARM 32-bit Cortex), versions ARMv8-A to ARMv-9 (ARM 64/32-bit), the like, or any combination thereof. The one or more processors may include one or more cloud-based processors. A cloud-based processor may be part of or in communication with a dispatch interface, an interaction interface, an authentication portal, or a combination thereof. A cloud-based processor may be located remote from a device, a computing device, one or more other processors, one or more databases, or any combination thereof. Cloud-based may mean that one or more processors may reside in a non-transitory storage medium located remote from the device, computing device, processor, databases, or any combination thereof. One or more cloud-based processors may be accessible via one or more networks. A suitable cloud-based processor may be Amazon Elastic Compute Cloud™ (EC2TM) may be provided by Amazon Web Services®, incorporated herein by reference in its entirety for all purposes. Another suitable platform for a cloud-based processor may include Lambda™ provided by Amazon Web Services®, incorporated herein in its entirety by reference for all purposes. The one or more processors may convert data signals to data entries to be saved within one or more storage mediums. The one or more processors may access one or more algorithms to analyze one or more data entries and/or data signals. The one or more processors may access one or more algorithms saved within one or more memory storage mediums. The one or more algorithms being accessed by one or more processors may be located in the same or different storage medium or server as the processor(s).

One or more computing devices may include one or more memory storage mediums. The one or more memory storage mediums may include one or more hard drives (e.g., hard drive memory), chips (e.g., Random Access Memory "RAM)"), discs, flash drives, memory cards, the like, or any combination thereof. The one or more storage mediums may include one or more cloud-based storage mediums. A cloud-based storage medium may be located remote from a device, a computing device, one or more processors, one or more databases, or any combination thereof. Cloud-based may mean that the one or more storage mediums may reside in a non-transitory storage medium located remote from the device, computing device, processor, other databases, or any combination thereof. One or more cloud-based storage mediums may be accessible via one or more networks. A suitable cloud-based storage medium may be Amazon S3TM provided by Amazon Web Services®, incorporated herein by reference in its entirety for all purposes. One or more memory storage mediums may store one or more data entries in a native format, foreign format, or both. One or more memory storage mediums may store data entries as objects, files, blocks, or a combination thereof. The one or more memory storage mediums may include one or more algorithms, rules, databases, data entries, the like, or any combination therefore stored therein. The one or more memory storage mediums may store data in the form of one or more databases.

One or more computing devices may include and/or be able to access one or more databases. One or more databases may be useful for storing information therein related to one or more animals, users, feeding assemblies, containers, foods, the like, or any combination thereof. One or more databases may include one or more animal profile databases. An animal profile database may store one or more parameters of one or more animals therein. One or more parameters may include age, gender, breed, weight, color, medical information, feed information (e.g., quantity, schedule), the like, or any combination thereof. One or more databases may include one or more food databases. One or more food databases may include one or more parameters of food stored therein. The food may be the food associated with containers compatible for use with a feeding assembly. The one or more food parameters associated with the food may include compatibility with the feeding assembly, a type of food in the container, a volume of food in the container, nutritional values associated with the food in the container, a brand or manufacturer of the food in the container, a production and/or packaging date of the food in the container, an expiration date of the food in the container, an amount of time food may be unsealed and exposed to ambient temperatures before beginning to spoil, the like, or any combination thereof. One or more parameters may be associated with one or more identifiers or data provided therefrom. For example, an identifier may direct a computing device to find information related to that identifier in the food database. This may be opposed to or in addition to parameters provided by the identifier itself.

The feeding assembly may include one or more communication modules. The one or more communication modules may allow for the device to receive and/or transmit one or more signals from one or more computing devices, be integrated into a network, or both. The one or more communication modules may have any configuration which may allow for one or more data signals from one or more controllers to be relayed to one or more other controllers, communication modules, communication hubs, networks, computing devices, processors, the like, or any combination thereof located external of the feeding assembly. The one or more communication modules may include one or more wired communication modules, wireless communication modules, or both. A wired communication module may be any module capable of transmitting and/or receiving one or more data signals via a wired connection. One or more wired communication modules may communicate via one or more networks via a direct, wired connection. A wired connection may include a local area network wired connection by an ethernet port. A wired communication module may include a PC Card, PCMCIA card, PCI card, the like, or any combination thereof. A wireless communication module may include any module capable of transmitting and/or receiving one or more data signals via a wireless connection. One or more wireless communication modules may communicate via one or more networks via a wireless connection. One or more wireless communication modules may include a Wi-Fi transmitter, a Bluetooth transmitter, an infrared transmitter, a radio frequency transmitter, an IEEE 802.15.4 compliant transmitter, cellular radio signal transmitter, Narrowband-Internet of Things (NB-IoT) transmitter, the like, or any combination thereof. A Wi-Fi transmitter may be any transmitter compliant with IEEE 802.11. A communication module may be single band, multi-band (e.g., dual band), or both. A communication module may operate at 2.4 Ghz, 5 Ghz, the like, or a combination thereof. A cellular radio signal transmitter may be any transceiver compatible with any cellular frequency band (e.g., 500, 900, 1,800, 1,900 MHz) and/or network (3G, LTE, LTE Cat1, LTE M, 4G, 5G). A communication module may communicate with one or more other communication modules, computing devices, processors, or any combination thereof directly; via one or more communication hubs, networks, or both; via one or more interaction interfaces; or any combination thereof.

The feeding system may include and/or be in communication with a communication hub. A communication hub may function to receive one or more signals, transfer one or more signals, or both from one or more other computing devices. The communication hub may be any type of communication hub capable of sending and transmitting data signals over a network to one or a plurality of computing devices. The communication hub may include a wired router, a wireless router, an antenna, a satellite, or any combination thereof. For example, an antenna may include a cellular tower. The communication hub may be connected to a feeding assembly, one or more computing devices, or both a via a wired connection, wireless connection, or a combination of both. For example, the communication hub may be wirelessly connected with the feeding assembly via a communication module. The communication hub may allow for communication of a computing device with the feeding assembly when the computing device is directly connected to the communication hub, indirectly connected to the communication hub, or both. A direct connection to the communication hub may mean that the computing device is directly connected to the communication hub via a wired and/or wireless connection and communicates with the feeding device through the communication hub. An indirect connection to the communication hub may mean that a computing device first communicates with one or more other computing devices via a network before transmitting and/or receive one or more signals to and/or from the communication hub and then to the feeding assembly.

The feeding assembly may be integrated into one or more networks. The feeding assembly may be in removable communication with one or more networks. The one or more networks may be formed by placing a feeding assembly in communication with one or more other computing devices. One or more networks may include one or more communication hubs, communication modules, computing devices, feeding assemblies, or a combination thereof as part of the network. One or more networks may be free of one or more communication hubs. One or more computing devices of the system may be directly connected to one another without the use of a communication hub. For example, a communication module of the feeding assembly may be placed in direct communication with a communication module of a pet health device or other computing device without having a communication hub therebetween. One or more networks may be connected to one or more other networks. One or more networks may include one or more local area networks (LAN), wide area networks (WAN), intranet, Internet, Internet of Things (IoT), the like, or any combination thereof. The network may allow for a feeding assembly to be in communication with one or more user interfaces remote from the feeding assembly via the Internet, such as through one or more managed cloud services. An exemplary managed cloud service may include AWS IoT Core by Amazon Web Services®. The network may be temporarily, semi-permanently, or permanently connected to the feeding assembly, one or more computing devices, or both. A network may allow for one or more computing devices to be temporarily and/or permanently connected to the feeding assembly to transmit one or more data signals to the feeding assembly, receive one or more data signals from the feeding assembly, or both. The network may allow for one or more signals from one or more controllers to be relayed through the system to one or more other computing devices, processors, storage mediums, the like, or any combination thereof. The network may allow for one or more computing devices to receive one or more data entries from and/or transmit one or more data entries to one or more storage mediums. The network may allow for transmission of one or more signals, status signals, data entries, instruction signals, or any combination thereof for processing by one or more processors. Communication across one or more networks may be enabled by one or more protocols. One or more protocols may be proprietary, open-source (e.g., "Matter"), and/or shared.

One or more computing devices (e.g., personal computing devices) may include one or more user interfaces. The one or more user interfaces may function to display information related to one or more animals (e.g., usage, consumption, trends, etc.), receive user inputs from a user (e.g., animal caregiver), display data and/or one or more prompts to a user, or any combination thereof. The one or more user interfaces may be suitable for receiving data from a user. The one or more user interfaces may include one or more graphic user interfaces (GUI), audio interfaces, image interfaces, the like, or any combination thereof. One or more graphic user interfaces may function to display visual data to a user, receive one or more inputs from the user, or both. The one or more graphic interfaces may include one or more screens. The one or more screens may be a screen located on a computing device. The one or more screens may be a screen on a mobile computing device, non-mobile computing device, or both. The one or more graphic interfaces may include and/or be in communication with one or more user input devices, audio interfaces, image interfaces, the like, or any combination thereof. The one or more user input devices may allow for receiving one or more inputs from a user. The one or more input devices may include one or more buttons, wheels, keyboards, switches, mice, joysticks, touch pads (i.e., a touch-sensitive area, provided as a separate peripheral or integrated into a computing device, that does not display visual output), touch-sensitive monitor screens, microphones, the like, or any combination thereof. The one or more input devices may be integrated with a graphic user interface. An audio interface may function to project sound to a user and/or receive sound from a user. The audio interface may include audio circuitry, one or more speakers, one or more microphones, the like, or any combination thereof. An image interface may function to capture, receive, display, and/or transmit one or more images. An image interface may include one or more cameras. A user interface may function to display and/or navigate through one or more menus of the application.

The system may include one or more applications. The application (i.e., "computer program") may function to access data, upload data, or both to the system, interact with a user interface, interact with a feeding assembly, or any combination thereof. The application may be stored on one or more memory storage devices. The application may be stored on one or more personal computing devices. The application may comprise and/or access one or more computer-executable instructions, algorithms, rules, processes, methods, user interfaces, menus, databases, the like, or any combination thereof. The computer-executable instructions, when executed by a computing device, may cause the computing device to perform one or more methods described herein. The application may be downloaded, accessible without downloading, or both. The application may be downloadable onto one or more computing devices. The application may be downloadable from an application store (i.e., "app store"). An application store may include, but is not limited to, Apple App Store, Google Play, Amazon Appstore, or any combination thereof. The application may be accessible without downloading onto one or more computing devices. The application may be accessible via one or more web browsers. The application may be accessible as a website. The application may interact and/or communicate through one or more user interfaces. The application may be utilized by one or more computing devices. The application may also be referred to as a dedicated application.

External developers may be in communication with one or more computing devices, user devices, the feeding assembly, or any combination thereof. External developers may include third party mobile or web application developers. The network may enable external developers to create applications that are compatible with the website or application installed on the user device, and which may be used to control the feeding assembly.

Container Compatible with Feeding Assembly

The present teachings relate to a container. The container may function for storing food therein, being used as a serving dish to have an animal consume therefrom, compatible with an automatic feeding assembly for automatically opening the container, compatible with an automatic feeding assembly for being presented to an animal to consume therefrom, or any combination thereof. The container may have the food sealed therein such as to extend the shelf life of the food and avoid the need for refrigeration.

The container may include a container base, a lid, a seal member(s), identifier(s), the like, or a combination thereof.

The container may have a symmetric or asymmetric shape. Symmetry may be about an axis or plane intersecting both a container base and lid.

A container may have an open configuration, closed configuration, partially open configuration, the like, or any combination thereof. A closed configuration may allow for shipping and storage of the container. A closed configuration may mean that a lid of the container is located and sealed to the container base. In a closed configuration, a lid may cooperate with a cavity base to completely seal a cavity of the cavity base. An open configuration and/or partially open configuration may allow for access to food within a container, consumption of food directly from the container (e.g., by an animal), accessing food for placing into a serving dish, or any combination thereof. An open configuration may mean that a lid of the container is removed from a container base such as to expose the cavity thereof.

A container may cooperate with a feeding assembly to be moved from a closed configuration to an open configuration and/or partially open configuration or vice versa.

A container may include a container base. A container base may function to retain food therein. A container base may function as a serving dish for an animal to consume directly therefrom. A container base may define an internal volume in which food may be placed. A food cavity may be defined by the internal volume. A container base may include one or more storage portions, rims, flanges, keying features, alignment features, engagement features, lid access features, lid reinforcing features, the like, or a combination thereof.

The container base may include a storage portion. A storage portion may define a hollow cavity for containing the food. A storage portion may be the portion of a container an animal consumes from.

A bottom wall may define the bottom surface of the container. The bottom wall may cooperate with the lid and one or more side walls to seal food stored within the container. The bottom wall may cooperate with one or more side walls to define a food cavity.

One or more side walls may define the outer surface of the container base. One or more side walls may determine part of, most of, or all of volume and/or height of a container and/or container base. One or more side walls may extend from the bottom wall. The one or more side walls may have a closed end and a free end. A closed end may be an end adjoining to a bottom wall. A free end may define the rim of the container base.

A container base may include one or more rims. One or more rims may serve as the outer edge of a container base, one or more flanges, or both. One or more rims may include or be separate from one or more flanges.

A container base may include one or more flanges. One or more flanges may function to provide a surface for a lid to be adhered to, cooperate with one or more container storage subassemblies, cooperate with one or more container handling subassemblies, cooperate with a container magazine, the like, or any combination thereof. A flange may extend from a storage portion. A flange may extend from one or more side walls, one or more rims, or both. A flange may extend from and/or define the rim of the container base. A flange may be separate from, affixed to, and/or integral with the rim of the container base. A flange may be a laterally outward extending portion of a rim. A flange may extend substantially laterally from a side wall below a rim, from a downward projecting portion from a rim, below a top surface of a rim, or any combination thereof. In other words, flange may be located along any part of the height of one or more side walls and/or rim. A flange may be biased more toward the rim, an upper surface of a rim, and/or an upper surface of a side wall. A flange may provide a surface for handling a container, adhering to a lid, supporting a seal member, or any combination thereof. A flange may cooperate with one or more container storage subassemblies, container handling subassemblies, container opening subassemblies, container holding subassemblies, the like, or any combination thereof.

A flange may have a cross-sectional shape (cut plane parallel to flange, longitudinal and/or horizontal plane) or overall two-dimensional plan shape (viewing top down or bottom up) which is substantially circular, ovular, egg-shaped, teardrop shaped, triangular, square, rectangular, polygonal (e.g., pentagon, hexagon), and/or the like. A flange may have a shape which is asymmetrical or symmetrical about one or more planes. A flange may have a shape which is free of symmetry, includes one plane of symmetry, two or more planes of symmetry. A flange shape may aid in orienting of a container.

A container may include or be free of one or more keying features. One or more keying features may function to allow for a container to be keyed for engagement with a feeding assembly, a container magazine, or both. One or more keying features may aid in a human correctly orientating a container, one more portions of a feeding assembly correctly orientating a container, or even one or more machines within an assembly process. One or more keying features may function to allow for a container to be keyed for engagement with a container storage subassembly, container magazine, container handling subassembly, container holding subassembly, waste collection subassembly, the like, or any combination thereof. One or more keying features may be formed in and/or affixed to any portion of a container which may be suitable. One or more keying features may be formed, included in, and/or affixed to one or more rims, flanges, side walls, bottom walls, lids, the like, or any combination thereof.

One or more keying features may be changes in contours in one or more portions of a container base. One or more keying features may include one or more concave portions, convex portions, protrusions, indentations, flat surface, straight edges, the like, or any combination thereof. One or more keying features may include an overall shape of flange, a two-dimensional shape of a flange, or both. For example, a flange may have a cross-sectional or plan shape which is not circular, does not have radial symmetry, or both. For example, shapes such as tear-drop, egg-shaped, ovular with a blunt end, the like, or a combination thereof. Such a shape may aid in providing for limited correct orientations and aid in correct placement. Exemplary keying features may include one or more notches, tabs, rounded portions, and/or flat portions. Keying features may be formed in a flange such as to avoid impacting storage volume or shape of a storage portion of a container base. Keying features may be formed in a flange to aid in correct orientation of shapes which may have more than one plane of symmetry (e.g., square, rectangle, circle). One or more keying features may include one or more pockets formed in a flange.

One or more keying features may include a single keying feature or a plurality of keying features. Keying features may or may not be mirrored on an opposing portion of a container. Mirroring may provide for a single or two or more correct orientations of a container. For example, mirroring of keying features with a container base (e.g., flange) having only symmetry about one-plane, may provide for only a single correct orientation. For example, mirroring of keying features with a container base (e.g., flange) having symmetry about two or more planes, may provide for two or more correct orientation. A plurality of keying features may include 2 or more, 3 or more, 4 or more, or even 6 or more keying features. A plurality of keying features may all be the same or different from one another. One or more keying features may have the same and/or different shape and/or size one or more other keying features. For example, all of the keying features may be notches. As another example, some keying features may be notches while others are straight edges. As another example, a single keying feature may be the overall two-dimensional shape of a flange.

One or more keying features may include, function as, or be separate from one or more alignment features, engagement features, lid access features, lid reinforcing features, the like, or a combination thereof.

A container may include or be free of one or more alignment features. One or more alignment features may facilitate alignment of a container within a container storage subassembly, container magazine, container handling subassembly, or both. One or more alignment features may facilitate alignment of a container within a hopper, cartridge magazine, shuttle assembly, gripper assembly, lifting wedge, the like, or a combination thereof. One or more alignment features may facilitate maintaining a container oriented properly during movement within a feeding assembly, facilitate loading of a container, or both. One or more alignment features may prevent rotation, teetering, or turning of a container once loaded into a container storage subassembly, container magazine, container handling subassembly, or any combination thereof.

One or more alignment features may include a change in contour of a rim, flange, bottom wall, side wall(s), or any combination thereof. One or more alignment features may include one or more indentations, projections, planar surface, planar edges, rounded surfaces, rounded edges, or any combination thereof in a rim, flange, bottom wall, side wall, or combination thereof. One or more alignment features may include a change in contour in an upper surface, lower surface, and/or peripheral edge of a rim, flange, bottom wall, side wall, or combination thereof. One or more alignment features may include one or more protrusions extending from a rim and/or flange of the container base laterally way from the lid, generally parallel with a vertical axis, toward a bottom wall, or any combination thereof. One or more alignment features may be reciprocal in shape to or provide a reciprocal shape with one or more portions of a container storage subassembly, container magazine, container handling subassembly, or any combination thereof.

One or more alignment features may be located at one or more engagement points with one or more components of a feeding assembly. One or more alignment features may be biased toward the rear of a container, front of a container, a leading edge and/or a trailing edge, sides of a container, or any combination thereof. One or more alignment features may be fairly centered or off-center relative to a frontal plane, longitudinal plane, or both. One or more alignment features may or may not be mirrored relative to one or more other alignment features. One or more alignment features may be mirrored relative to one or more opposing alignment features. One or more alignment features may be located opposite one another relative to a frontal plane, longitudinal plane, or both.

One or more alignment features may cooperate with a cradle, one or more pairs of arms, or both. Cooperation may include engagement, mating, providing a friction surface, providing a channel, providing reciprocal surfaces, or any combination thereof. For example, one or more alignment features together with a side wall of a container and a bottom surface of a flange may form a channel (e.g., C-shape channel). For example, one or more alignment features may include two or more projections projecting from a side wall and forming a groove, and/or channel about at least a portion of the container base. For example, one or more alignment features may include one or more indentations or projections forming a groove or channel in a bottom wall. The channel and/or groove may receive a portion of a cradle, one or more arms, a support plate (e.g., of a handling subassembly) or combination thereof and aid in maintaining the container base in a stationary position relative thereto. For example, one or more alignment features may be a planar portion of a side wall which is mostly curved. The planar portion of the side wall may align with a planar portion of a container handling subassembly, container storage subassembly, or both.

A container may include or be free of one or more engagement features. One or more engagement features may function to engage with one or more components of a feeding assembly, container magazine, maintain proper orientation and retain of the container relative to the one or more components or both. One or more engagement features may cooperate with one or more container storage subassemblies, container magazines, container handling subassemblies, container holding subassemblies, or combination thereof. One or more engagement features may engage with a cradle, a pair of arms, a support plate (e.g., of a container handling subassembly), lifting wedge, or any combination thereof. One or more engagement features may be the same or separate from one or more keying features, alignment features, or both.

One or more engagement features may provide a shape which receives a portion of one or more container storage subassemblies, container handling subassemblies, container holding subassemblies, the like, or any combination thereof. One or more engagement features may be provided in a rim, flange, bottom wall, side wall, or any combination thereof. One or more engagement features may function to receive one or more projections partially or entirely therethrough. One or more engagement features may or may not be partially or completely reciprocal with one or more projections. One or more engagement features may include one or more holes, depressions, grooves, and/or the like.

One or more projections may include one or more pins, tabs, posts, hooks, and/or the like. One or more projections may be part of a container storage subassembly, container handling subassembly, container holding subassembly, and/or the like. One or more projections may extend from one from one or more cradles, arms, support plates (e.g., of a container handling subassembly), lifting wedges, rails, and/or any combination thereof. For example, one or more projections may include pins protruding from one or more arms of a container handling subassembly, a gripper plate and/or support plate of a container handling subassembly, a cradle of a container handling subassembly, a lifting ramp of a container holding subassembly, or any combination thereof.

Exemplary engagement features may include a plurality of holes defined at predetermined locations through a rim and/or flange of the container base. These holes may receive corresponding pins protruding from a gripper plate and/or cradle of the container handling subassembly. Together, the holes and pins may maintain proper orientation and retention of the container base within various stages of the feeding cycle.

A container base may include or be free of one or more lid access features. One or more lid access features may function to allow a portion of a lid to be accessible; allow a bottom surface of a lid to be accessible, in addition to an upper surface; expose a portion of a bottom of a lid; allow for a leading edge to be accessible; receive one or more components of a container opening subassembly; allow for one or more components of a container opening subassembly to engage with a lid for subsequent removal; or a combination thereof. One or more lid access features may protect a leading edge, trailing edge, or both of a lid. One or more lid access features may be provided in one or more locations of a container.

A container may be configured to have a single correct orientation or multiple correct orientations for being located into a feeding assembly and/or cooperating with a container opening subassembly. A lid may be formed such that the leading edge and trailing edge may or may not be reversible. For example, a container may have no planes of symmetry or just one plane of symmetry to provide for one correct orientation or two planes of symmetry to provide for two correction orientations. A container with a single correct orientation may have one or more lid access features only adjacent to and/or in proximity to a leading edge of a lid. A container with two correct orientations may have one or more lid access features adjacent to and/or in proximity to a leading edge and a trailing edge of a lid.

One or more lid access features may include one or more pockets, one more rim and/or flange indentations, one or more rim/or flange blunt surfaces, the like, or any combination thereof.

One or more lid access features may include one or more pockets. One or more pockets may function to protect and maintain a handling portion of a lid. One or more pockets may create a pocket gap for a portion of a container opening subassembly to be received in. A pocket may be defined by or coupled to a rim and/or flange of a container base. A pocket may extend below the upper surface of the container base, below a flange plane, below a flange axis, below the main upper surface of a flange, or any combination thereof. A pocket may be formed in a flange and/or rim of a container base. A pocket may be formed as an indentation, concave portion, and/or the like in a flange and/or rim. A pocket may project away from a lid, away from an upper surface of a container base, away from an upper surface of a rim and/or flange, toward a bottom of a container, generally parallel to a vertical axis of the container, or a combination thereof. A pocket may be formed in proximity to and/or adjacent to a leading edge of a lid, trailing edge of a lid, a stress rise feature of a seal member, or a combination thereof. A pocket may cooperate with a lid to define a pocket gap. A pocket gap may be a distance between the pocket and the lid.

One or more lid access features may include one or more rim indentations. One or more rim indentations may function to allow a bottom surface of a lid to be accessible, in addition to an upper surface; may allow for a leading edge to be accessible; may expose a portion of a lid relative to container; may allow for one or more components of a container opening subassembly to engage with a lid; or any combination thereof. One or more rim indentations may be formed in a rim and/or flange of a container base. One or more rim indentations may be formed in proximity to and/or adjacent to a leading edge of a lid, a stress rise feature of a seal member, or both. One or more rim indentations may project inward toward a vertical axis, a center of the container, a center of a rim and/or flange, or a combination thereof. One or more rim indentations may be formed as one or more cutouts and/or notches. One or more rim indentations may refer to a localized area of contour change of a rim and/or flange. One or more rim indentations may have a shape reciprocal with or dissimilar to one or more components of a container opening subassembly. One or more rim indentations may have a shape reciprocal or dissimilar to one or more jaws, hooks, and/or the like. One or more rim indentations may have a shape with a cross-sectional area equal to or larger than a cross-sectional area of one or more jaws, hooks, and/or the like. A cross-sectional area equal to or larger than a cross-sectional area of one or more jaws and/or hooks may allow for them to have sufficient access to a lid for removal.

One or more lid access features may include one or more blunt surfaces (e.g., straight edges). One or more blunt surfaces may function to allow a bottom surface of a lid to be accessible, in addition to an upper surface; may allow for a leading edge to be accessible; may expose a portion of a lid relative to container; may allow for one or more components of a container opening subassembly to engage with a lid; or any combination thereof. One or more blunt surfaces may be formed in a rim and/or flange of a container base. One or more blunt surfaces may be formed in proximity to and/or adjacent to a leading edge of a lid, a stress rise feature of a seal member, or both. One or more blunt surfaces may be formed as one or more straight edges, edges tangent to a majority of a contour, or both of one or more rims and/or flanges. One or more blunt surfaces may be formed as a substantially flat and/or straight edge of a rim and/or flange. One or more blunt surfaces may be dissimilar to the majority of peripheral contour of a rim and/or flange. One or more blunt surfaces may be formed in a cross-sectional and/or two-dimensional plan shape coming to a straight surface. For example, one or more rounded shapes may have one or more straight edges formed therein. For example, a circle, oval, egg-shape, tear-drop shape, and/or the like may curve and/or narrow to a straight edge to form a blunt surface. The blunt surface may be opposite a rounded surface. One or more blunt surfaces may refer to a localized area of contour change of a rim and/or flange. One or more blunt surfaces may also define an exposed area of the lid referred to as the handling portion.

A container may include or be free of one or more lid reinforcing features. One or more lid reinforcing features may function to reinforce a lid during removal from a container base, prevent tearing of the lid while peeling away from the container base, provide a structurally sufficient structure to cooperate with a container opening subassembly, or any combination thereof. One or more lid reinforcing features may function as one or more keying features, provide for consistent orientation of a lid, or both. Often, when peelable lids are peeled away from respective container bases, these lids tear, leaving remnants of the lid still adhered to the container base. The remnants may block access of an animal into the food cavity to consume food therein. This is especially problematic with an automatic feeding assembly, as a user may not be physically present to remove the remnants of the lid.

The lid reinforcing feature may aid in distributing the peeling force to the outer periphery, seal member, and/or away from a center line/longitudinal plane (e.g., while a lid is being peeled away from a container base). By distributing the peeling force outward, this reduces and/or eliminates the risk of the lid being incompletely peeled and leaving behind remnants of lid adhered to the container base. The peeling force may be distributed outward during an initial motion of peeling, when initiating peeling at a leading edge, before reaching a halfway point of peeling, before peeling reaches the widest portion of a container base, or any combination thereof. A lid reinforcing feature may also aid in reducing the amount of force required to initiate peeling. This may be compared to the force required in the absence of the lid reinforcing feature. This force reduction may aid in reducing and/or eliminating splatter from food contained within the container base.

The lid reinforcing feature may aid in distributing the peeling force toward a seal member, toward a center line and/or longitudinal plane, or both (e.g., while a lid is being peeled away from a container base). By distributing the peeling force inward, this reduces and/or eliminates the risk of the lid being completely peeled and leaving behind remnants of lid adhered to the container base. The peeling force may be distribution outward during a latter motion of peeling, when peeling starts to reach a trailing edge, after reaching a halfway point of peeling, after peeling reaches a widest portion of a container base, or any combination thereof. A lid reinforcing feature may also aid in reducing the amount of force required to finalize peeling. This may be compared to the force required in the absence of the lid reinforcing feature. This force reduction may aid in reducing and/or eliminating splatter from food contained within the container base.

One or more lid reinforcing features may be provided as part of the lid, the container base, or both. One or more lid reinforcing features may be provided at a handling portion of a lid. A handling portion may be located toward and/or adjacent to a leading edge of a lid, a portion of a lid and/or container base (e.g., flange) a container opening subassembly may interact with, or both. A handling portion may be located adjacent to one or more lid access features. A handling portion may be exposed by a lid access feature.

The container may include a lid. A lid may function to close or seal a container, preserve food within a container, or both. A lid may be shaped to be reciprocal with, similar to, dissimilar to, fully cover a food cavity of a container base, or any combination thereof. A lid may be shaped to be reciprocal with, similar to, dissimilar to, fully cover, partially cover, or any combination thereof a flange and/or rim of a container base. The lid may be adhered to the container base. The lid may be partially or completely removable. Removing a lid may transition a container from a closed configuration to an open configuration.

An edge of the lid which is peeled or otherwise removed from the container first may be referred to as a leading edge. An edge of the lid which is peeled last, remains adhered, or otherwise removed may be referred to as a trailing edge. A peeling force may be applied from a leading edge toward and/or to the trailing edge.

A lid may be releasably coupled to the container base. A lid may be releasably attached to the rim and/or flange. A lid may be releasably coupled to a container base via a seal member. A lid may or may not be able to be recoupled to a container base.

A lid may be shaped such as to completely cover an opening of a container base defining a food cavity therein. A lid may be shaped to cover the opening defined by the rim and/or flange of a container base. A lid may be shaped such as to cooperate with a container opening subassembly. A lid may be shaped such as to allow for consistent presentation and locating relative to a container opening subassembly container magazine, or both. A lid may be shaped for repeatable and accessible gripping, clamping, hooking, and/or the like by a container opening subassembly, user, or both.

A lid may be shaped such that when a lid is presented to a container opening subassembly it is presented at a consistent location with a leading edge facing toward the container opening subassembly. A lid may have a cross-sectional shape (cut plane parallel to upper surface of lid, longitudinal and/or horizontal plane) or overall two-dimensional plan shape (viewing top down or bottom up) which is substantially circular, ovular, egg-shaped, teardrop shaped, triangular, square, rectangular, polygonal (e.g., pentagon, hexagon), and/or the like. A lid may have a shape which is asymmetrical or symmetrical about one or more planes. A lid may have a shape which is free of symmetry, includes one plane of symmetry, two or more planes of symmetry. A lip shape may aid in orienting of a container within one or more components of the feeding assembly.

A lid may include a handling portion. A handling portion may provide for a portion of the lid which is gripped, clamped, hooked, and/or otherwise retrieved to allow for a peeling force to be applied for removal of the lid. A handling portion may be a portion of the lid which extends beyond a container base, rim, and/or flange. A handling portion of the lid may be a portion of the lid intended for engagement with a container opening subassembly. A handling portion may extend beyond most of a flange but have a lid reinforcing feature affixed thereto. A handling portion may have a removable flange portion affixed thereto. A handling portion may have a lid contact portion affixed thereto. A handling portion may extend in the same direction as a flange, laterally project away from one or more side walls of a container base, or both. A handling portion of the lid may be formed as an extension tab. A handling portion may not be folded over a rim and/or flange, as is typically seen in standard single use food containers.

A lid may include a rigid engagement portion. A rigid engagement portion may be disposed on the handling portion of the lid. A rigid engagement portion may be the same or different as the lid reinforcing feature described relative to the flange. A rigid engagement portion may be the same as or different from the lid contact portion of a lid reinforcing feature. The rigid engagement portion may prevent the lid from collapsing or moving relative to the container base and/or a remainder of the lid.

The handling portion of the lid may or may not include any removal openings. A removal opening may cooperate with one or more container opening subassemblies. A removal opening may be configured to receive a portion of a container opening subassembly therein. A portion of the container opening subassembly may be any portion configured to grip, grasp, hook, or otherwise engage and retain the lid for subsequent removal from a container base. A removal opening may receive a hook, post, jaw, and/or the like.

The container may include one or more seal members. One or more seal members may function to removably couple a lid to a container base, adhere a lid to a container base, permanently adhere a lid reinforcing feature to a lid, or any combination thereof. A seal member may refer to a means of directly adhering a lid to a container base, an adhesive separate from the lid and the container base, or both.

The container may include one or more identifiers. The one or more identifiers may function to indicate one or more parameters associated with the container. One or more identifiers may include one or more visual identifiers, signal identifiers, or both. One or more visual identifiers may include one or more quick response ("QR") codes, bar codes, colored pattern, textures, surface reflectivity patterns, the like, or a combination thereof. One or more signal identifiers may include one or more radio frequency identification tags ("RFID"), near-field communication ("NFC") tags, the like, or any combination thereof. One or more RFID identifiers may be passive. The one or more identifiers may be disposed on one or more portions of the container. The one or more identifiers may be disposed on an exterior of the container. One or more identifiers may be located on an exterior of the lid, an exterior the one or more side walls of the container base, a bottom wall of a container base, an exterior of a casing, the like, or any combination thereof. The one or more identifiers may be placed on a container such as to be accessible and readable by an identification sensor. The one or more parameters associated with an identifier may include compatibility with the feeding assembly, a type of food in the container, a volume of food in the container, nutritional values associated with the food in the container, a brand or manufacturer of the food in the container, a production and/or packaging date of the food in the container, an amount of time food may be unsealed and exposed to ambient temperatures before beginning to spoil, an expiration date, the like, or any combination thereof. The one or more parameters associated with the identifier may include one or more instructions to access one or more databases to retrieve information about the container or food.

One or more portions of a container may define or be defined by one or more axes, planes, or both.

The one or more axes may include a vertical axis, horizontal axis, longitudinal axis, frontal axis, transverse axis, flange axis, the like, or any combination thereof. A vertical axis may extend through a container base and lid, through a bottom of a container base and cavity defined therein, through a bottom of a container base and an aperture defined by a rim and/or flange, or any combination thereof. A vertical axis may be generally perpendicular to the bottom of a container base, rim, flange, lid, or a combination thereof. A vertical axis may be generally parallel to a side wall of a container base. A frontal and/or center axis may be a vertical axis which is generally centered with the container, container base, lid, or combination thereof. A horizontal axis may be generally perpendicular to a vertical axis. A horizontal axis may be generally parallel with a rim, flange, lid, bottom of a container base, or combination thereof. A horizontal axis may intersect or be free of intersecting a vertical axis. A longitudinal axis may be a horizontal axis. A longitudinal axis may include a center line of the container. A transverse axis may be a horizontal axis. A flange axis may be an axis which is generally parallel with a majority of a surface area of a flange. A flange axis may be generally parallel or offset from a horizontal axis, longitudinal axis, or both.

The one or more planes may include a flange plane, rim plane, lid plane, longitudinal plane, transverse plane, frontal plane, the like, or a combination thereof. A flange plane may be a plane defined by a majority of a surface area (e.g., upper surface, surface facing toward lid) of a flange. A flange plane may have a flange axis lying therein (e.g., parallel, not intersecting). A flange plane may be substantially parallel to a transverse plane, a lid plane, or both. A rim plane may be a planed defined by a majority of a surface area of a rim. A rim plane may be parallel to a flange plane, lid plane, and/or transverse plane. A rim plane may be the same or offset from a flange plane. A lid plane may be a plane defined by a majority of the surface area of a lid (e.g., bottom or top surface of lid). A lid plane may be generally parallel or offset from a flange plane. A lid plane may be parallel to a transverse plane, a flange plane, or both. A frontal plane may be a plane intersecting through the container, the container base, the lid, or a combination thereof. A frontal plane may divide a container between a front and a rear. A frontal plane may define one or more planes of symmetry of one or more components of the container. A frontal plane may be located between a leading edge and a trailing edge of a lid. A frontal plane may have a vertical axis and/or frontal axis lying therein (e.g., parallel, not intersecting). A frontal plane may be generally perpendicular to a flange plane, lid plane, longitudinal plane, transverse plane, or a combination thereof. A longitudinal plane may be generally perpendicular to a transverse plane, frontal plane, flange plane, lid plane, or a combination thereof. A longitudinal plane may divide a container between sides (e.g., left and right). A longitudinal plane may have a longitudinal axis, vertical axis, and/or frontal axis lying therein and/or be parallel to. A longitudinal plane may have a centerline of the container lying therein (e.g., parallel to and lying in). A transverse plane may define an upper portion and a lower portion of a container. A transverse plane may be formed between a lid and a container base or may cut through the container base. A transverse plane may be perpendicular to a transverse plane, longitudinal plane, or both. A transverse plane may be parallel to a flange plane, lid plane, or both.

A container may or may not have a symmetrical shape. Symmetry may be symmetry about one or more planes. Symmetry may mean symmetry about a frontal plane, longitudinal plane, or any other symmetry plane such as any plane intersecting a center point of the container. A container having only one plane of symmetry may have one correct orientation for interaction with a feeding assembly, removal of a lid, or both. A container having two or more planes of symmetry may have two or more correct orientations for interaction with a feeding assembly, removal of a lid, or both. Interaction with a feeding assembly may include placement and/or orientation in and/or relative to a container storage subassembly, container handling subassembly, container opening subassembly, container holding subassembly, container disposal subassembly, waste collection subassembly, or a combination thereof. Interaction with a feeding assembly may include placement and/or orientation in and/or relative to a hopper, container magazine, jaws, hook, grabbing/retaining feature, cradle, lifting wedge, container display opening, disposal bar, waste receptacle, or a combination thereof. A single correct orientation may increase the accuracy of component interactions while reducing complexity and cost in container design, manufacturing, and/or shipping. Two or more correct orientations may reduce the probability of loading errors by a user. Loading errors may include incorrect orientation such that one or more features of a container intended to interact with one or more components of a feeding assembly are unable to perform their function and/or cooperate together.

Method of Presenting Food

The present teachings may also relate to a method for automatically presenting food to an animal for consumption by a feeding assembly. The method may use the feeding assembly, container, and/or system according to the teachings herein. The method may include a) a container handling subassembly automatically receiving and/or retrieving a container of the food from a container storage subassembly; b) the container handling subassembly automatically moving the container to a feeding area and presenting the container for consumption; and c) the container handling subassembly automatically moving the container to a waste collection subassembly and releasing the container into the waste collection subassembly.

The method may include receiving and/or retrieving a container from a container storage subassembly. Retrieval may include a container handling subassembly grasping or otherwise actively acquiring a container from a container storage subassembly. A container handling subassembly may enter into a container storage subassembly to acquire a container. Receiving may include a container being dispensed into a container handling subassembly. Dispensing may be executed by a portion of a container storage subassembly. Dispensing may be executed by a restraint mechanism. Dispensing may provide for a container being dispensed into a cradle of a container handling subassembly. Receiving and/or retrieving a container may be based on one or more configurations input by a user, system defaults, or both. For example, initiating receiving and/or retrieving based on a feeding schedule input by a user.

The method may include a container handling subassembly automatically moving the container to a feeding area and presenting the container for consumption. Movement may be along one or more axes. Movement may be generated by a container transport subassembly. A container handling subassembly may stop at one or more positions prior to being located at a feeding area. The one or more positions may be those disclosed herein.

The method may include automatically opening the container by a container opening subassembly. Opening may be during movement of the container, container handling subassembly, or both between the container storage subassembly and the feeding area. The opening may include peeling a lid from a container base. The opening may include engaging a leading edge and/or removal opening near the leading edge of the lid by the container opening subassembly. The opening may include the container opening subassembly moving relative to the container handling subassembly, the container handling subassembly moving relative to the container opening subassembly, or the container opening subassembly and the container handling subassembly moving relative to one another. The opening may be prior to presenting the container at the feeding area. The opening may occur at an opening position.

Engaging the leading edge and/or the removal opening may include engaging with a lid reinforcement feature of the container base. Upon applying a peeling force, the lid reinforcement feature may break away from the container base while remaining adhered to the lid. Due to the lid reinforcement feature, the peeling force may initially be distributed away from the center line of a lid and outward toward the peripheral edges of the lid, a seal member, or both. Due to the lid reinforcement feature, the peeling force after passing a wider portion of the container and/or halfway point is distributed toward a center line of a lid.

The method may include a container handling subassembly automatically moving the container to a waste collection subassembly and releasing the container into the waste collection subassembly. Movement may be generated by a container transport subassembly. A container handling subassembly may be located on top of and/or inside of a waste collection subassembly. A container handling subassembly may cooperate with one or more container disposal subassemblies to urge the container into the waste collection subassembly.

The method may include a user configuring the feeding assembly via a user interface on the feeding assembly, a computing device separate from the feeding assembly (e.g., personal computer, mobile device), or both. Configuring may include a user configuring a feeding schedule for the animal, one or more serving sizes, one or more types of food (e.g., brand, flavor, etc.), and/or the like. Configuring may be completed over an application.

The method may include receiving one or more signals from one or more sensing devices. One or more signals may be used to initiate one or more steps of the method. One or more parameters of a container may be received before dispensing and/or retrieving the container. The presence of a container in a container handling subassembly may be confirmed before moving the container handling subassembly toward a feeding area. The position of a container handling subassembly may be confirmed before dispensing a container into the container handling subassembly.

Illustrative Examples

The following figures and explanations are intended as illustrative examples. Features of one example may be combined with features of another example. For example, the keying features of any of FIGS. 47-50 may be combined with any of the containers in FIGS. 51-57. For example, the lid reinforcing features and handling portion of the container in FIGS. 51-57 may be combined with any of the containers in FIGS. 47-50. For example, the cradle assembly of any of FIGS. 11-16 and 26-31 may be combined with the feeding assembly of FIGS. 39-41. The gripper assembly of any of FIGS. 39-41 may be combined with the feeding assembly of any of FIGS. 1-34. The container magazine of FIGS. 42 and 43 may be combined with the feeding assembly of any of FIGS. 1-34 and 39-41.

FIG. 1 is a perspective view of a feeding assembly 1. The feeding assembly 1 includes a housing 10, container storage subassembly 12, waste collection subassembly 14. The feeding assembly 1 presents a container 16 in an open configuration O. The housing 10 includes a base 18, mid-support 28, support plate 20, and top cover 22. The base 18 houses the waste collection subassembly 14. The support plate 20 includes a feeding area 32. The support plate 20 includes a container display opening 24. About the container display opening 24 and atop the support plate 20 is a guard 26.

FIGS. 2 and 3 are a front view and a rear view of a feeding assembly 1. The feeding assembly 1 includes a housing 10 and waste collection subassembly 14. The housing includes a base 18 and top cover 22. The base 18 houses the waste collection subassembly 14. The base 18 includes a cavity 30. The cavity 30 may function to house one or more components associated with a power source.

FIG. 4 is a top view of a feeding assembly 1. The feeding assembly 1 includes a housing 10. The housing 10 includes a top cover 22. The top cover 22 includes a container refill opening 34. The container refill opening 34 provides access to a container storage subassembly 12. The container storage subassembly 12 houses one or more containers 16. The container(s) is in a closed configuration C. The housing 10 includes a support plate 20. The support plate 20 rests atop a base 18. The support plate 20 includes a feeding area 32. The feeding area 32 includes a container display opening 24. About the container display opening 24 is a guard 26.

FIG. 5 is a bottom view of a feeding assembly 1. The feeding assembly 1 includes a housing 10. The housing 10. The housing 10 includes a base 18. Removably housed within the base 18 is a waste collection subassembly 14. The waste collection subassembly 14 includes a waste receptacle 36. A bottom of the base 18 may include a plurality of feet 38.

FIGS. 6 and 7 are side views of the feeding assembly 1. The feeding assembly 1 includes a base 18. Atop the base 18 is a top cover 22. The top cover 22 only spans across a portion of the depth of the base 18. The feeding assembly 1 includes a feeding area 32.

Figures 8, 9, 10:
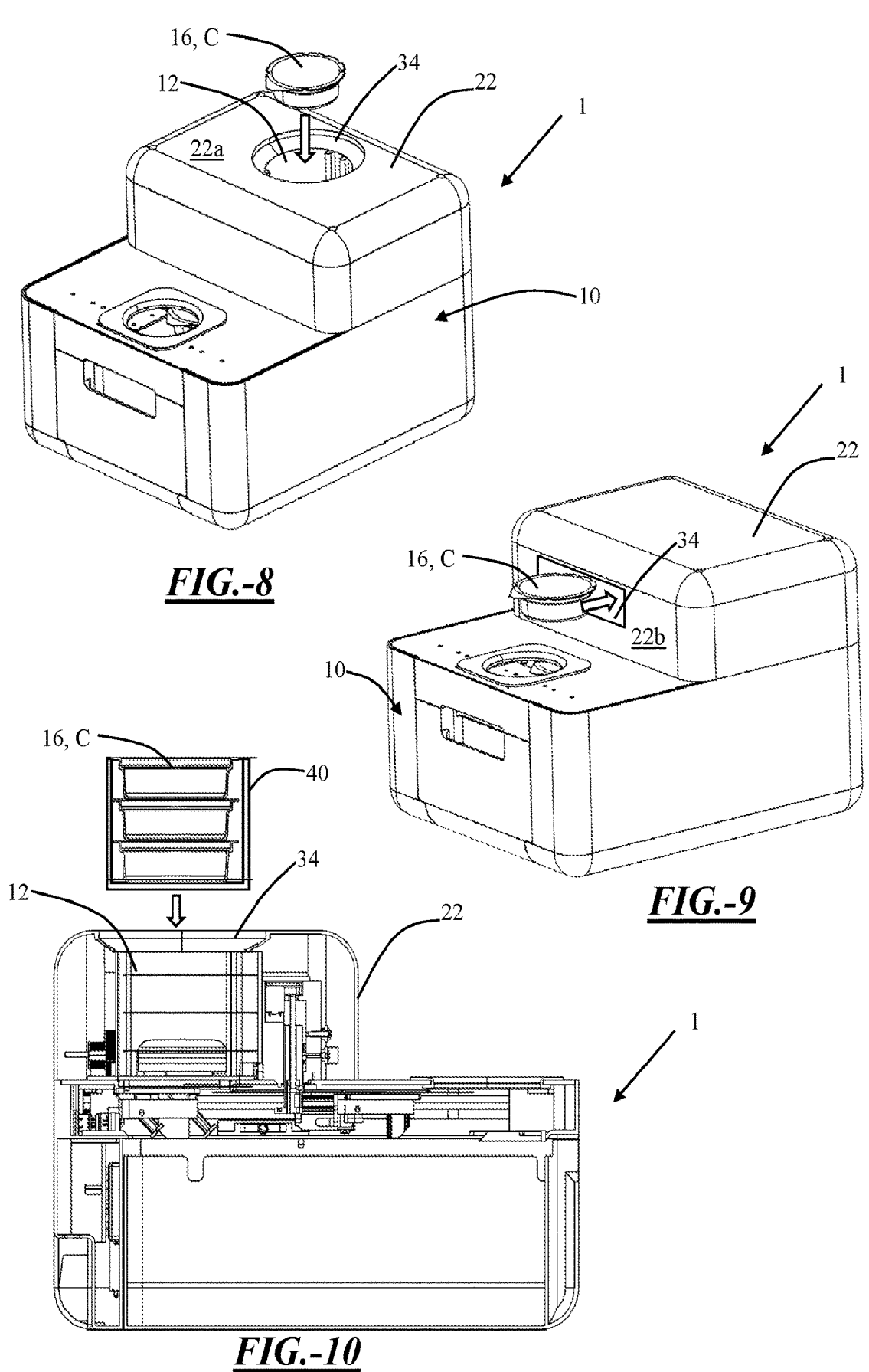
FIG. 8 illustrates loading a container into a feeding assembly.
FIG. 9 illustrates loading a container into a feeding assembly.
FIG. 10 illustrates loading a plurality of containers into a feeding assembly.

FIG. 8 illustrates a method of refilling a feeding assembly 1. The feeding assembly 1 is refilled with a container 16. The container 16 is in a closed configuration C. The container 16 is inserted into a container refill opening 34. The container refill opening 34 is formed in the housing 10. The container refill opening 34 is formed in a top cover 22. The container refill opening 34 is provided at a top surface 22*a* of the top cover 22. The container refill opening 34 provides access to a container storage subassembly 12.

FIG. 9 illustrates a method of refilling a feeding assembly 1. The feeding assembly 1 is refilled with a container 16. The container 16 is in a closed configuration C. The container 16 is inserted into a container refill opening 34. The container refill opening 34 is formed in the housing 10. The container refill opening 34 is formed in a top cover 22. The container refill opening 34 is provided at a side surface 22*b* of the top cover 22.

FIG. 10 illustrates a method of refilling a feeding assembly 1. The feeding assembly 1 is refilled with a plurality of containers 16. The plurality of containers 16 are each in a closed configuration C. The plurality of containers 16 are held together by a container magazine 40. The plurality of containers 16 are stacked together within the container magazine 40. The container magazine is inserted into a container refill opening 34. The container refill opening 34 is formed in a top cover 22. The container refill opening 34 provides access to a container storage subassembly 12.

Figure 11:
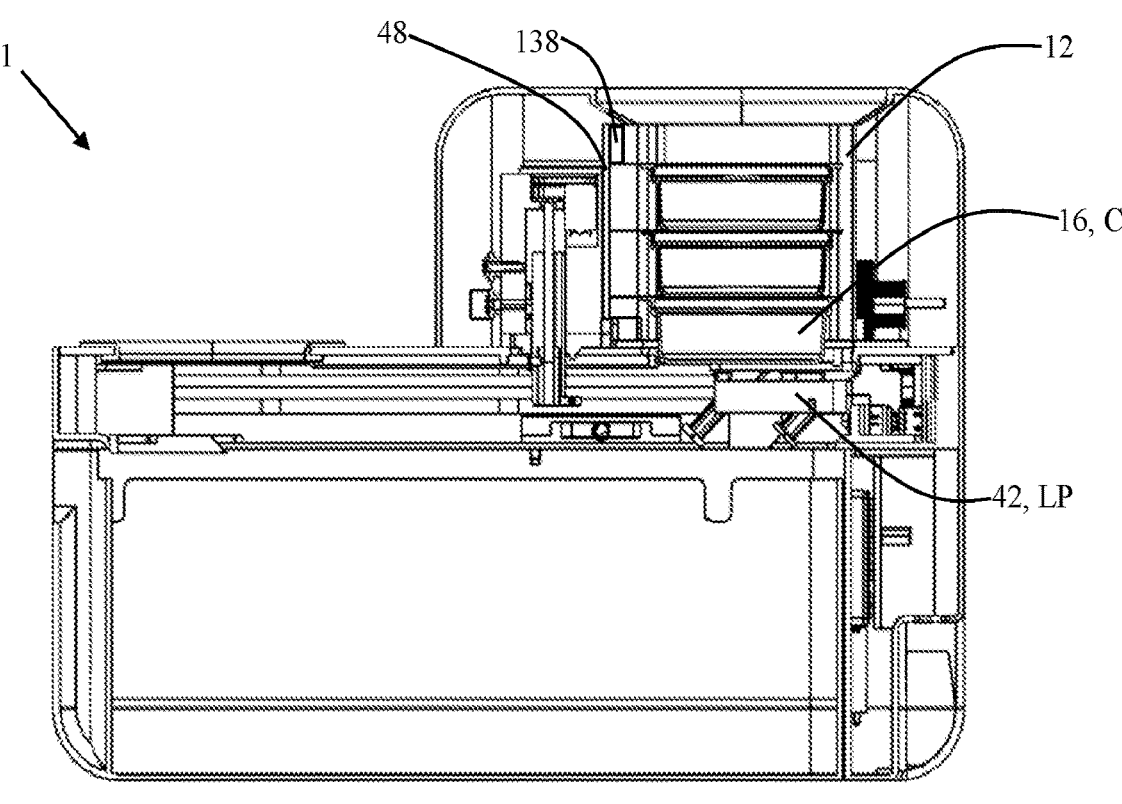
FIG. 11 illustrates a cross-section of a feeding assembly with a container handling subassembly in a loading position prior to dispensing a container into the container handling subassembly.

FIG. 11 is a cross-section view of a feeding assembly 1. The feeding assembly 1 includes a container storage subassembly 12. The container storage subassembly 12 is filled with a plurality of containers 16. The containers 16 are in a closed configuration C. The containers 16 are held in place within a hopper 48. In proximity to the hopper 48 is an identification sensor 138. The containers 16 are held in place by a restraint mechanism 50 (not shown). In proximity to the container storage subassembly 12 is a container handling subassembly 42. The container handling subassembly 42 is shown in a loading position LP. In the loading position LP, the container handling subassembly 42 may be aligned with the container storage subassembly 12. Alignment may allow for a container 16 to be transferred from the container storage subassembly 12 to the container handling subassembly 42.

Figure 12:
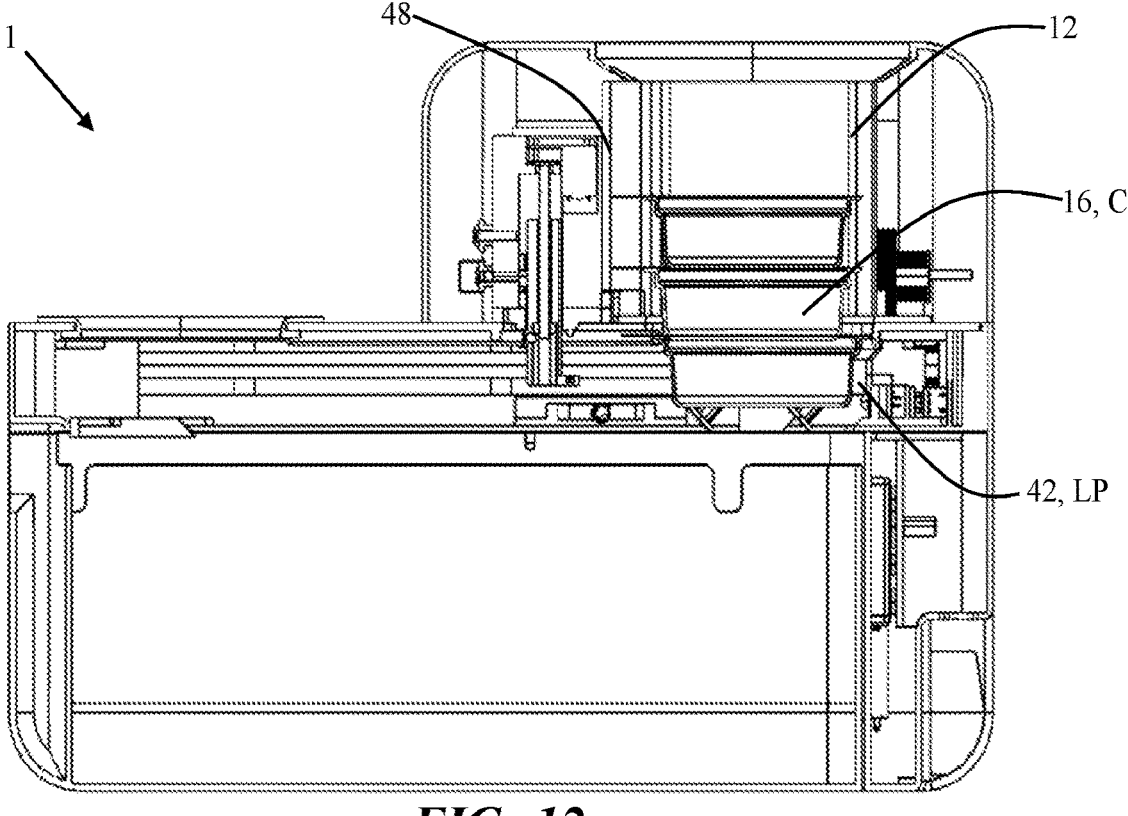
FIG. 12 illustrates a cross-section of a feeding assembly with a container handling subassembly in a loading position and retaining a container.

FIG. 12 is a cross-section view of a feeding assembly 1. The feeding assembly 1 includes a container storage subassembly 12. The container storage subassembly 12 is filled with a plurality of containers 16. The containers 16 are in a closed configuration C. A container handling subassembly 42 is adjacent to the container storage subassembly 12 and in the loading position LP. The container handling subassembly 42 is aligned with a hopper 48. A restraint mechanism 50 (not shown) urges a container 16 into the container handling subassembly 42.

FIG. 13 is a cross-section view of a feeding assembly 1. A container handling subassembly 42 moves from a loading position LP (as shown in FIG. 12) to an opening position OP. The container handling subassembly 42 moves from the container storage subassembly 12 toward a feeding area 32. The container handling subassembly 42 moves a container 16 which is in a closed configuration from the container storage subassembly 12 toward a container opening subassembly 46. The container opening subassembly 46 engages with a lid 54. In this example, the container opening subassembly 46 pinches the lid 54. As the container handling subassembly 42 continues to move toward the feeding area 32, the container opening subassembly 46 continues to retain a portion of the lid 54. By maintaining a portion of the lid 54 as static while a container base 52 continues to move to a feeding area 32, the lid 54 is removed from the container base 52.

FIG. 14 is a cross-section of a feeding assembly 1. A container handling subassembly 42 is located within, below, and/or adjacent to a feeding area 32. The container handling subassembly 42 is in a feeding position FP. The container handling subassembly 42 includes a container 16 therein. The container 16 is in an open configuration O. The lid 54 has been previously removed. The lid 54 is located within a waste collection subassembly 14. The lid 54 is within a waste receptacle 36 of the waste collection subassembly 14. The container handling subassembly 42 moves both horizontally and vertically up into the feeding area 32. The upward motion results in the container 16 being moved up into a container display opening 24.

Figures 15, 16:
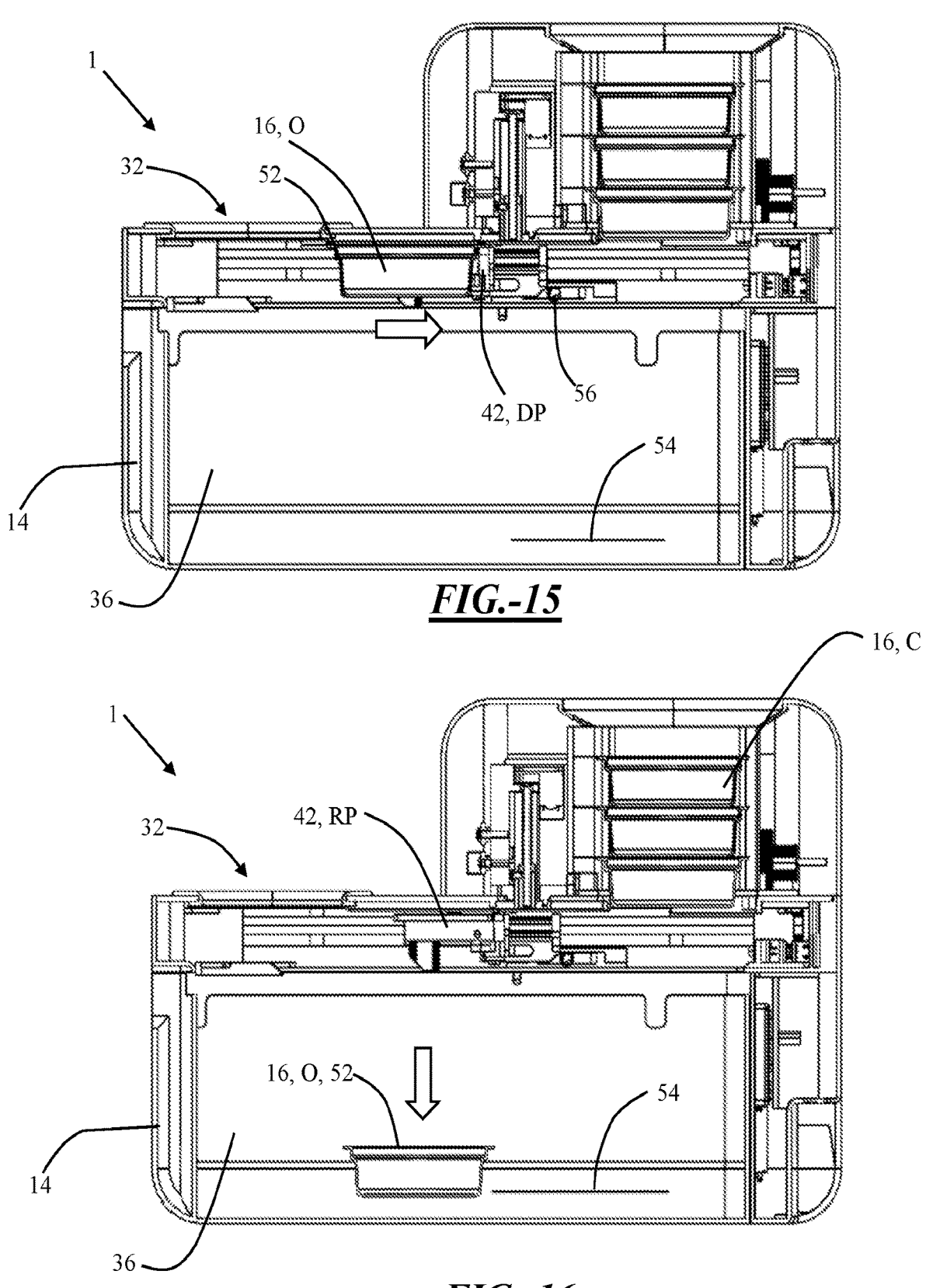
FIG. 15 illustrates a cross-section of a feeding assembly with a container handling subassembly in a disposing position.
FIG. 16 illustrates a cross-section of a feeding assembly with a container handling subassembly in a resting position.

FIGS. 15 and 16 are a cross-section of a feeding assembly 1. A container handling subassembly 42 is moved toward a disposal subassembly 56. The disposal subassembly 56 cooperates with the container handling subassembly 42. The container handling subassembly is in a disposing position DP. Interaction between the disposal subassembly 56 and the container handling subassembly 42 urges a container 16 into a waste collection subassembly 14. The container 16 falls into a waste receptacle 36. After the container 16 is disposed into the waste collection subassembly 14, the container handling subassembly 42 rests in a resting position RP. The container handling subassembly 42 may wait in this position until a subsequent container 16 from the container storage subassembly 12 is ready to be dispensed and presented to an animal for consumption.

Figure 17:
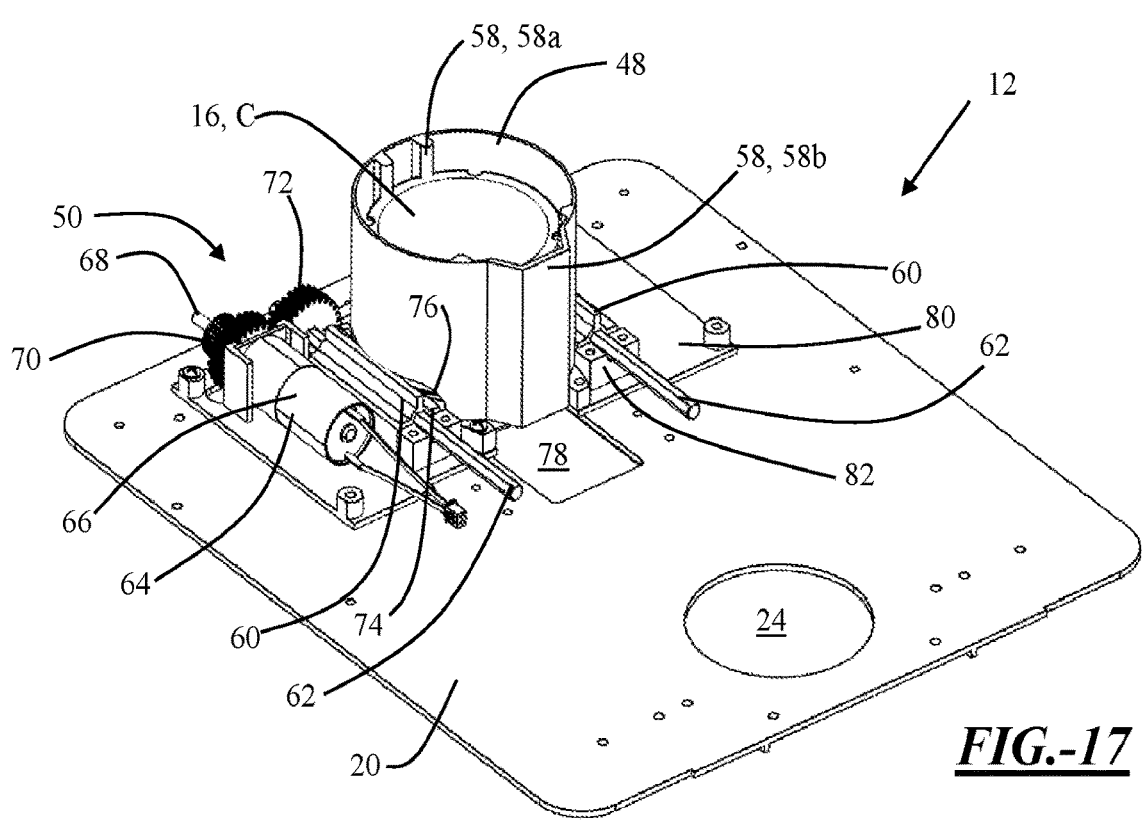
FIG. 17 is a perspective view of a container storage subassembly.
Figure 18:
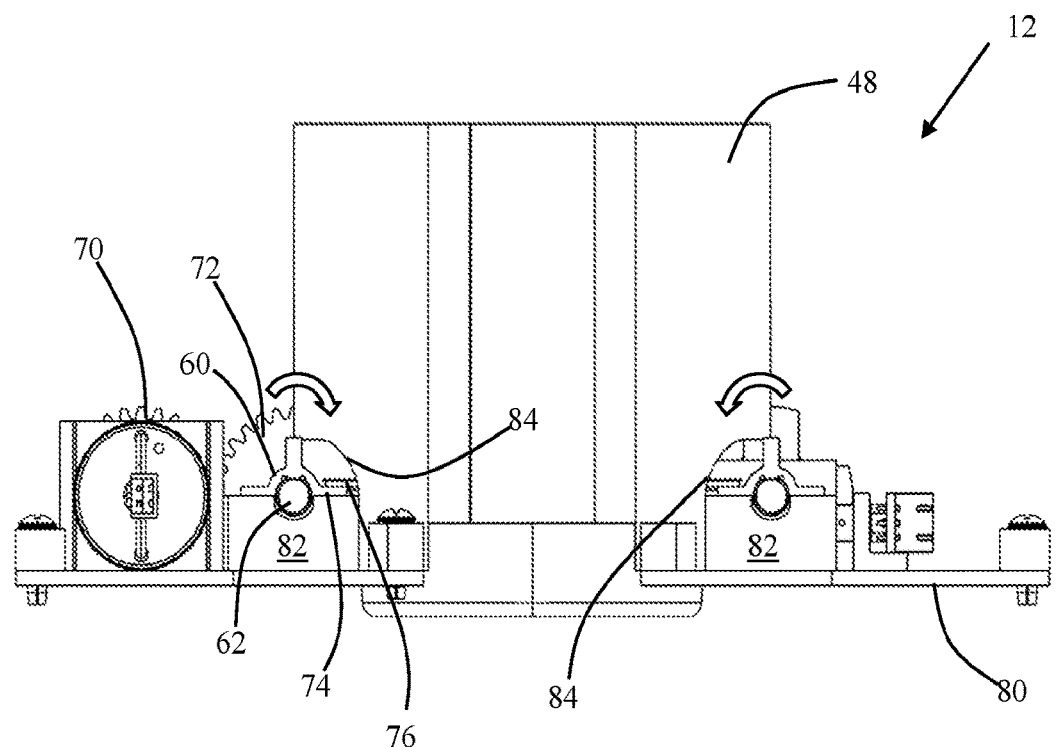
FIG. 18 is a front view of a container storage subassembly.

FIGS. 17 and 18 illustrate a container storage subassembly 12. The container storage subassembly 12 includes a hopper 48. The hopper 48 is configured to hold a plurality of containers 16. The containers 16 are in a closed configuration C. The hopper 48 has a cross-section generally reciprocal with a cross-section of the containers 16. The hopper 48 has a generally cylindrical shape. The hopper 48 includes one or more keying features 58. The hopper 48 includes one or more cutouts 84. The cutouts 84 expose the rim or flange 76 of a container 16. The containers 16 are held in place by a restraint mechanism 50. The restraint mechanism 50 includes two rollers 60. The rollers 60 include a plurality of fins 74. The fins 74 retain a rim or flange 76 of a container 16. As an example, a substantially horizontal fin 74 supports the rim 76 of the container 16 thereon. The rollers 60 are each rotatably engaged with rotary shafts 62. One or both rollers 60 are in rotatable communication with a roller drive unit 64. The roller drive unit 64 includes a motor 66, a drive shaft 68, and one or more drive gears 70. One or more drive gears 70 are rotatably engaged with one or more roller gears 72. Rotation of a drive ear 70 via the motor 66 may result in rotation of a roller gear 72. Rotation of a roller gear 72 may then result in rotation of a rotary shaft 62 and/or roller 60. The roller 60 rotates such that a fin 74 no longer supports a rim 76 of a container 16 (e.g., the fin rotates downward). Upon the roller 60 no longer supporting a container 16, the container 16 is dispensed from the hopper 48 and the container handling subassembly. Upon rotation of the roller 60, an adjacent fin 74 catches the rim 76 of the next container 16 in the stack.

As shown in FIGS. 17 and 18, the container storage subassembly 12 is mounted on a base 80. The base includes one or more cradles 82. The one or more rotary shafts 62 may be supported by the cradles 82. The base 80 may be mounted on a support plate 20. The container storage subassembly 12 may also be free of a base 80 while the support plate 20 provides for the same features. The support plate 20 includes a hopper opening 78. The hopper opening 78 is at least partially aligned with the hopper 48 to allow a container 16 to pass from the hopper through the support plate 20. The support plate 20 includes a container display opening 24.

Figure 19:
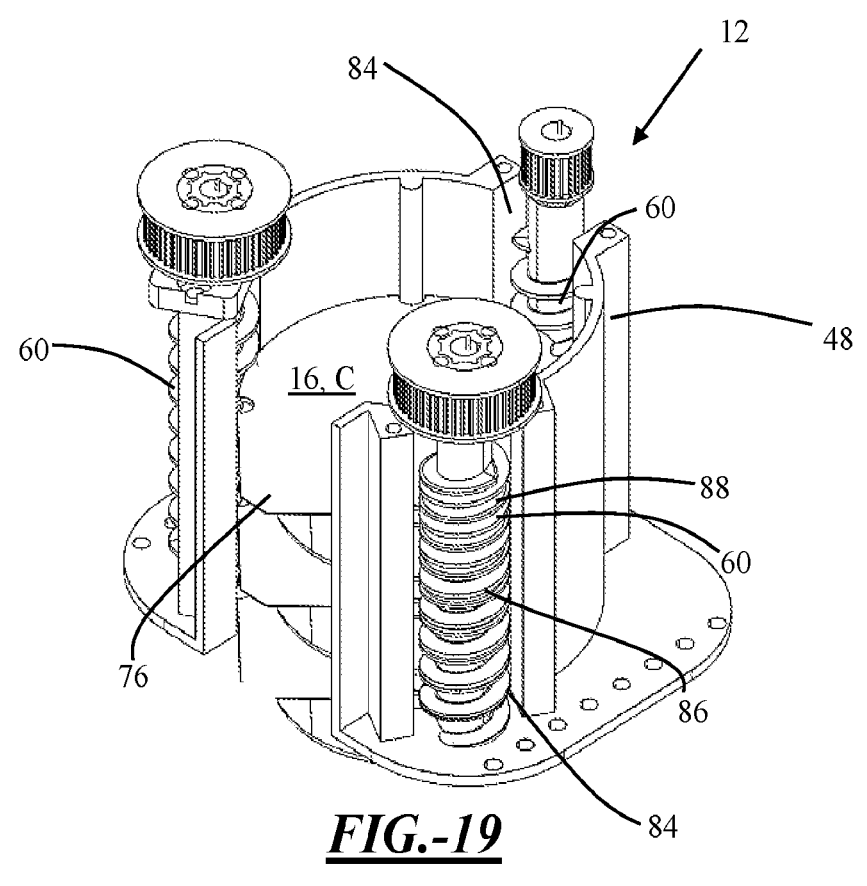
FIG. 19 is a perspective view of a container storage subassembly.
Figure 20:
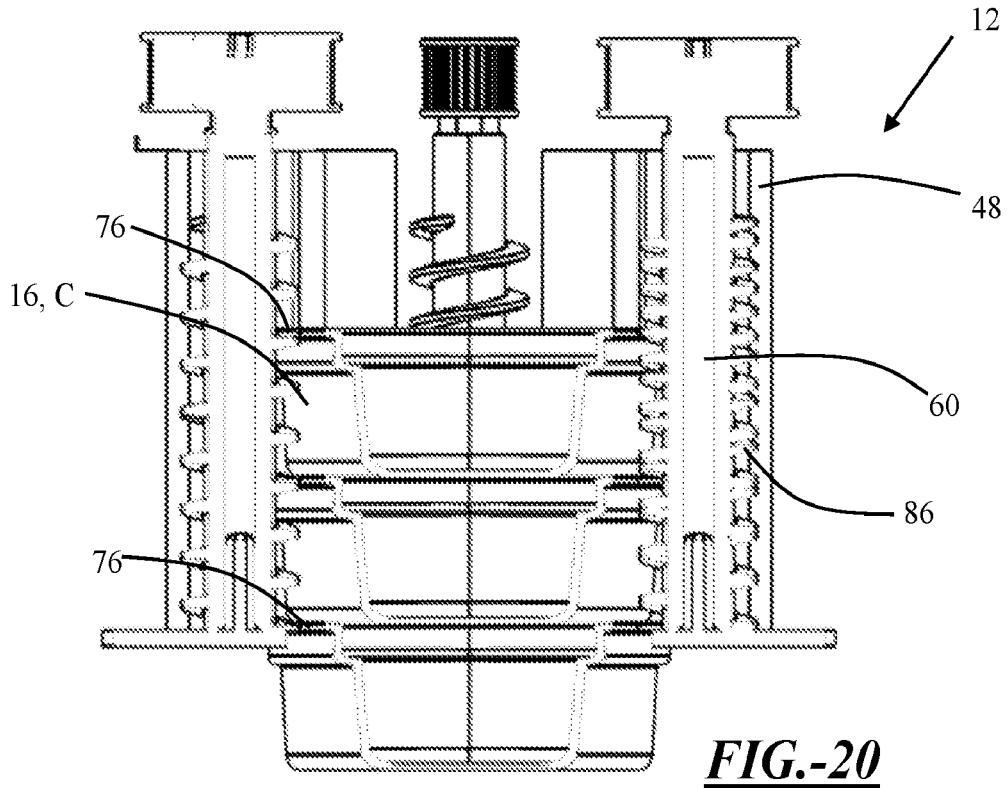
FIG. 20 is a front view of a container storage subassembly.

FIGS. 19 and 20 illustrate a container storage subassembly 12. The container storage subassembly 12 includes a hopper 48. The hopper 48 is configured to hold a plurality of containers 16. The containers 16 are in a closed configuration C. The hopper 48 has a cross-section generally reciprocal with a cross-section of the containers 16. The hopper 48 includes a plurality of cutouts 84. A rim and/or flange 76 projects through the cutouts 84. The container storage subassembly 12 includes a plurality of rollers 60. The rollers 60 may be configured as worm gears 86. The teeth 88 of the worm gears 86 may function similar to a fin 74 (not shown). The rim or flange 76 of a container 16 may engage with the teeth 88. The teeth 88 may support the rim or flange 76 and retain the container 16 in place within the hopper 48. As the rollers 60 rotate, rotation of the teeth 88 causes the rim or flange 76 to travel downward through the hopper 48. The rollers 60 are rotated via a drive unit 64 (not shown).

Figures 21, 22, 23:
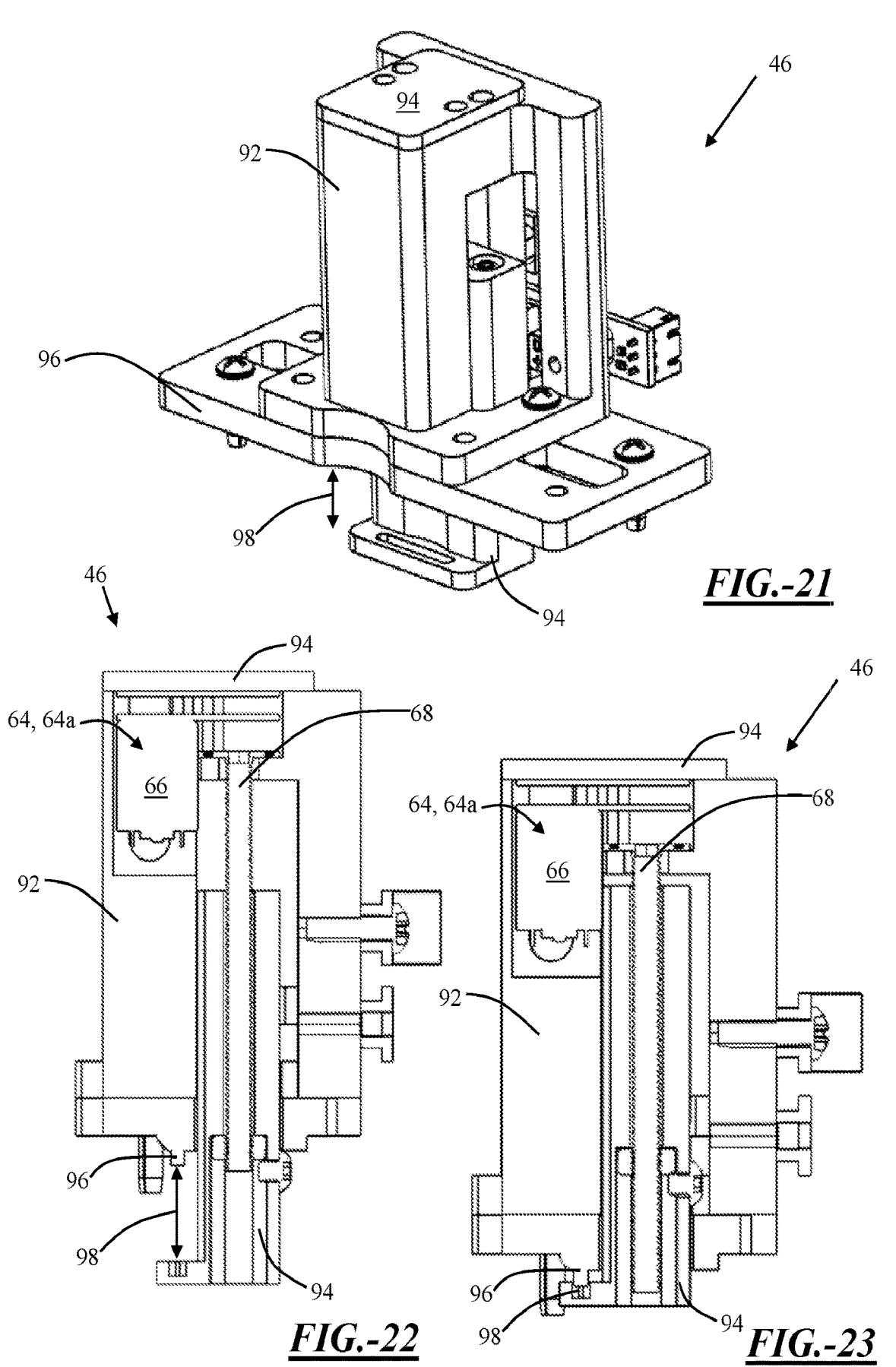
FIG. 21 is a perspective view of a container opening subassembly.
FIG. 22 is a cross-section of a container opening subassembly in an opening position.
FIG. 23 is a cross-section of a container opening subassembly in a closed or pinch position.

FIGS. 21, 22, and 23 illustrate a container opening subassembly 46. The container opening subassembly 46 includes a drive unit 64. The drive unit 64 includes a motor 66 and a drive shaft 68. The drive unit 64 may be configured as a thread motor 64a. The drive unit 64 may be housed and supported by a drive support 92. The drive unit 64 may be mounted to a drive unit cap 95. Rotatably engaged with the drive shaft 68 is a moveable jaw 94. The moveable jaw 94 is static relative to a static jaw 96. As the drive shaft 68 rotates, the moveable jaw 94 may move closer or further from the static jaw 96. Movement of the moveable jaw 94 can cause a pinch gap 98 to become larger or smaller. A lid 54 (not shown) may be moved into the pinch gap 98. The lid 54 (not shown) may be pinched and retained between the moveable jaw 94 and the static jaw 96.

Figures 24, 25, 26:
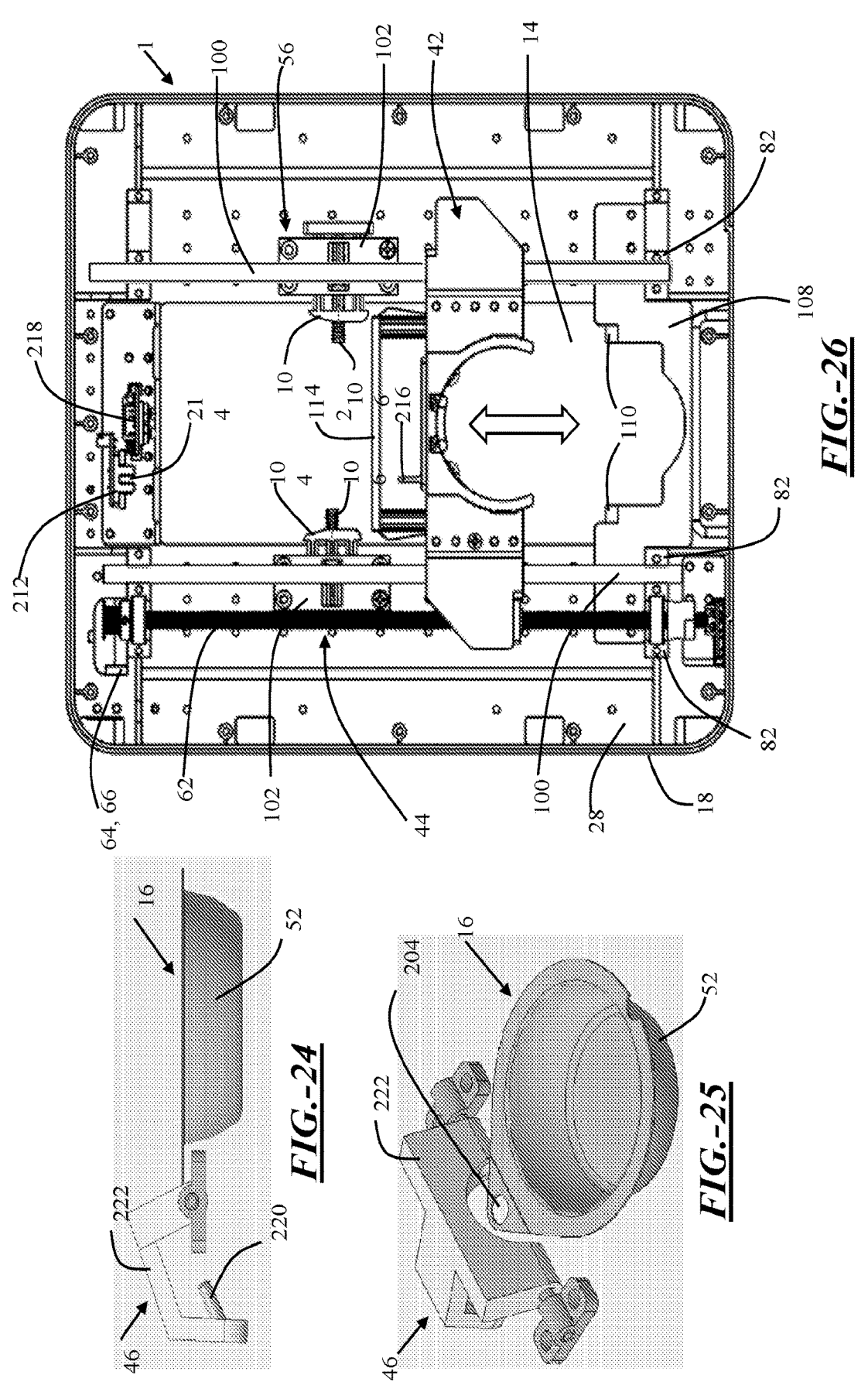
FIG. 24 is a side view of a container opening subassembly and container.
FIG. 25 is a perspective view of a container opening subassembly and container.
FIG. 26 is a top view of a portion of a feeding assembly.

FIGS. 24 and 25 illustrate a container opening subassembly 46. The container opening subassembly assembly 46 includes a hook 220. The hook 220 is affixed to an arm 222. The arm 222 may be moveable (e.g., rotatable) or static. The hook 220 interacts with a hook opening 204 of a container 16. The hook opening 204 may be formed in the container base 52 and/or the lid 54 (not shown). The hook 220 may engage with a hook opening 204 of a lid 54 (not shown) to peel the lid away from the container base 52.

FIG. 26 illustrates a portion of a feeding assembly 1. The feeding assembly 1 includes a base 18. The base 18 retains a waste collection subassembly 14 therein. The base 18 supports a mid-support 28. The mid-support 28 supports a transport subassembly 44. A transport subassembly 44 includes a drive unit 64. As shown, the drive unit 64 is located below the mid-support 28 and housed within the base 18. The drive unit 64 includes a motor 66. The drive unit 64 may drive rotation of a rotary shaft 62. The drive unit 64 may be in rotatable communication with the rotary shaft 62 via one or more gears (not shown). The transport subassembly 44 includes support shafts 100. The mid-support 28 includes a plurality of cradles 82. The cradles 82 support the rotary shaft 62 and the support shafts 100. Rotation of the rotary shaft 62 causes linear movement of a container handling subassembly 42. The rotary shaft 62 is engaged with the container handling subassembly 42. The support shafts 100 support the container handling subassembly 42 and allow for its linear movement.

The feeding assembly 1 includes two disposal subassemblies 56. The disposal subassemblies 56 are located opposite one another. Each disposal subassembly 56 include a mounting bracket 102. The mounting bracket 102 is mounted onto the mid-support 28. The mounting bracket 102 supports a plunger 104. Each disposal subassembly 56 also includes a spring 106. The spring 106 extends through the plunger 104 and the mounting bracket 102. The disposal subassemblies 56 are configured to cooperate with the container handling subassembly 42. The container handling subassembly 42 includes a disposal bar 112.

The feeding assembly 1 includes a lifting wedge 108. The lifting wedge 108 is affixed to the mid-support 28. The lifting wedge 108 includes ramped surfaces 110. The ramped surfaces 110 cooperate with ramped surfaces 110 of the container handling subassembly 42. By ramped surfaces 110 cooperating, when the container handling subassembly 42 moves into the feeding position FP (not shown), the container 16 (not shown) is able to be lifted into the feeding area 32.

The feeding assembly 1 includes a position sensor 212. The position sensor 212 is configured to sense if a container handling assembly 42 is in a loading position LP (not shown). The position sensor 212 cooperates with a portion of the container handling subassembly 42. The position sensor 212 includes a position pocket 214. The container handling subassembly 42 includes a position extension 216. When the container handling subassembly 42 is in the loading position LP, the position extension 216 sits within the extension pocket 214.

The feeding assembly 1 includes a presence sensor 218. The presence sensor 218 is configured to sense if a container 16 is seated in a container handling subassembly 42 after being disposed of from the container storage subassembly 12.

Figure 27:
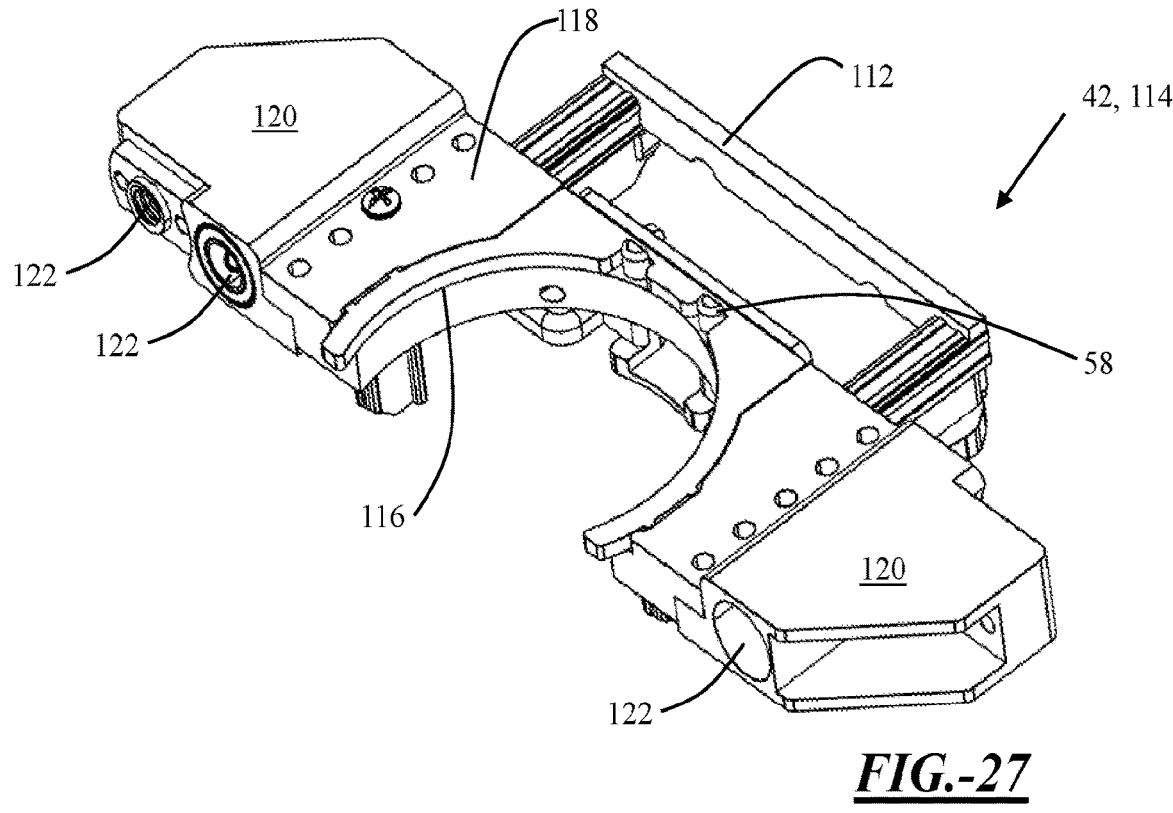
FIG. 27 is a top perspective view of a container handling subassembly.
Figure 28:
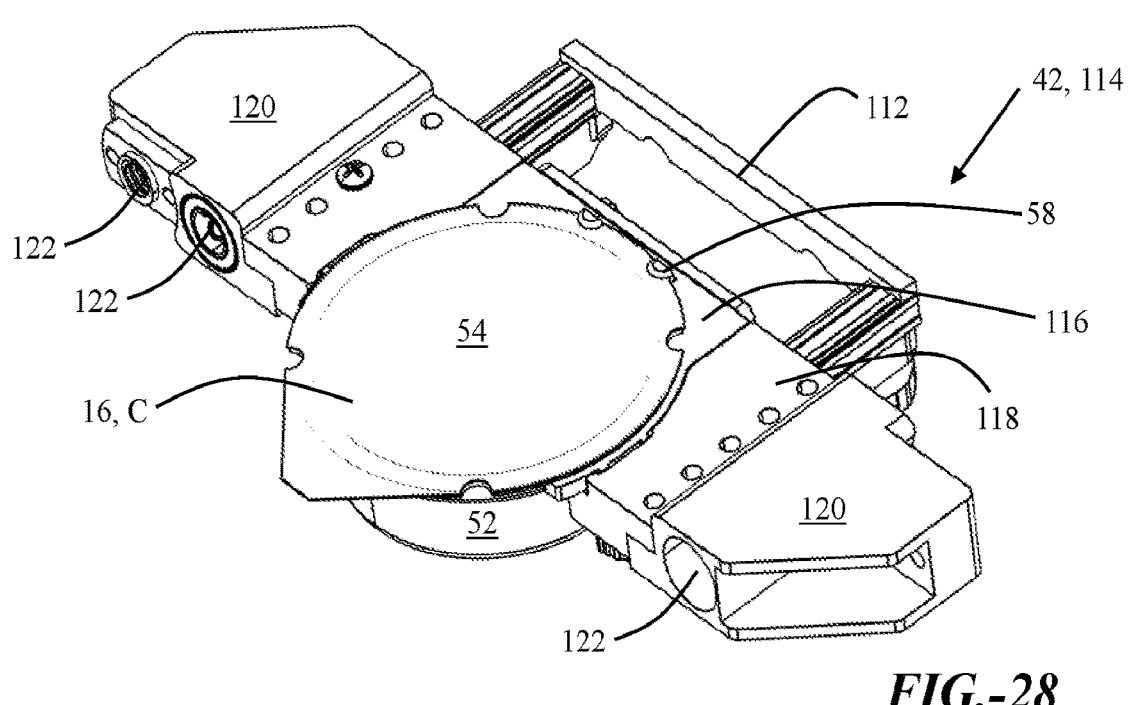
FIG. 28 is a top perspective view of a container handling subassembly retaining a container.

FIGS. 27 and 28 illustrate a container handling subassembly 42. The container handling subassembly of FIG. 28 is retaining a container 16 in a closed configuration C. The container handling subassembly 42 may be referred to as a shuttle 114. The container handling subassembly 42 includes a cradle 116. The cradle 116 is configured to retain a container 16. The cradle 116 may include one or more keying features 58. The keying features 58 may include an overall shape of the cradle, notches, or the like. The cradle 116 is retained by a holding support 118. The cradle 116 is moveable within the holding support 118. The cradle 116 may be moved vertically upward and downward relative to the holding support 118. The holding support 118 also retains the disposal bar 112. The disposal bar 112 is moveable relative to the holding support 118. The disposal bar 112 may be moved horizontal forward and rearward relative to the holding support 118. The holding support is affixed to bearings 120. The bearings 120 include through holes 122. The through holes 122 may engage with one or more shafts. One through hole may be threaded and configured to engage with a drive shaft 68 (not shown). Other through holes may be configured to engage with the support shafts 100 (not shown).

The cradle 116 has a two-dimensional shape substantially reciprocal with at least a portion of a periphery of the container 16. The cradle 116 is located about a container base 52 of the container 16. A rim or flange 76 of the container 16 rests upon the cradle 116.

Figures 29, 30, 31:
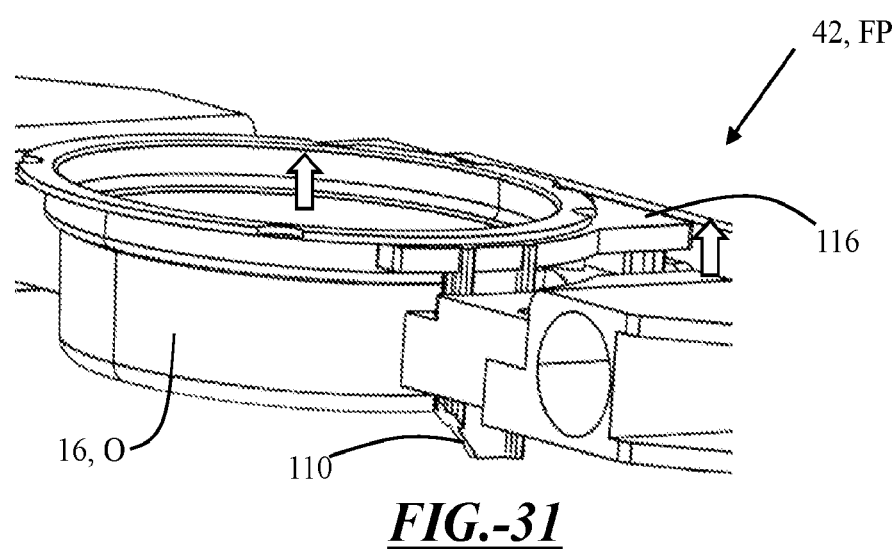
FIG. 29 is a bottom perspective view of a container handling subassembly retaining a container.
FIG. 30 illustrates a front portion of a feeding assembly.
FIG. 31 is a perspective view of a container handling subassembly while in the feeding position.

FIG. 29 illustrates a bottom of a container holding subassembly 42 with a container 16. The container holding subassembly 42 includes a cradle 116. The cradle 116 includes ramped surfaces 110.

FIG. 30 illustrates a front portion of a feeding assembly 1. The feeding assembly 1 includes a base 18. The base 18 supports a mid-support 28. Mounted on the mid-support 28 is a lifting ramp 108. The lifting ramp has two ramped surfaces 110.

FIG. 31 illustrates a portion of a container holding subassembly 42 when moved into the feeding position FP. Upon contact of the cradle 116 with the lifting ramp 108 (as shown in FIG. 30), the ramped surfaces 110 cooperate with one another. As the container holding subassembly 42 is continues to be moved forward toward the lifting ramp 108, the force between the ramped surfaces 110 results in the cradle 116 being pushed vertical upward away from the holding support 118. The cradle 116 moving upward also moves the container 16 upward into the container display opening 24 (not shown).

Figures 32, 33, 34:
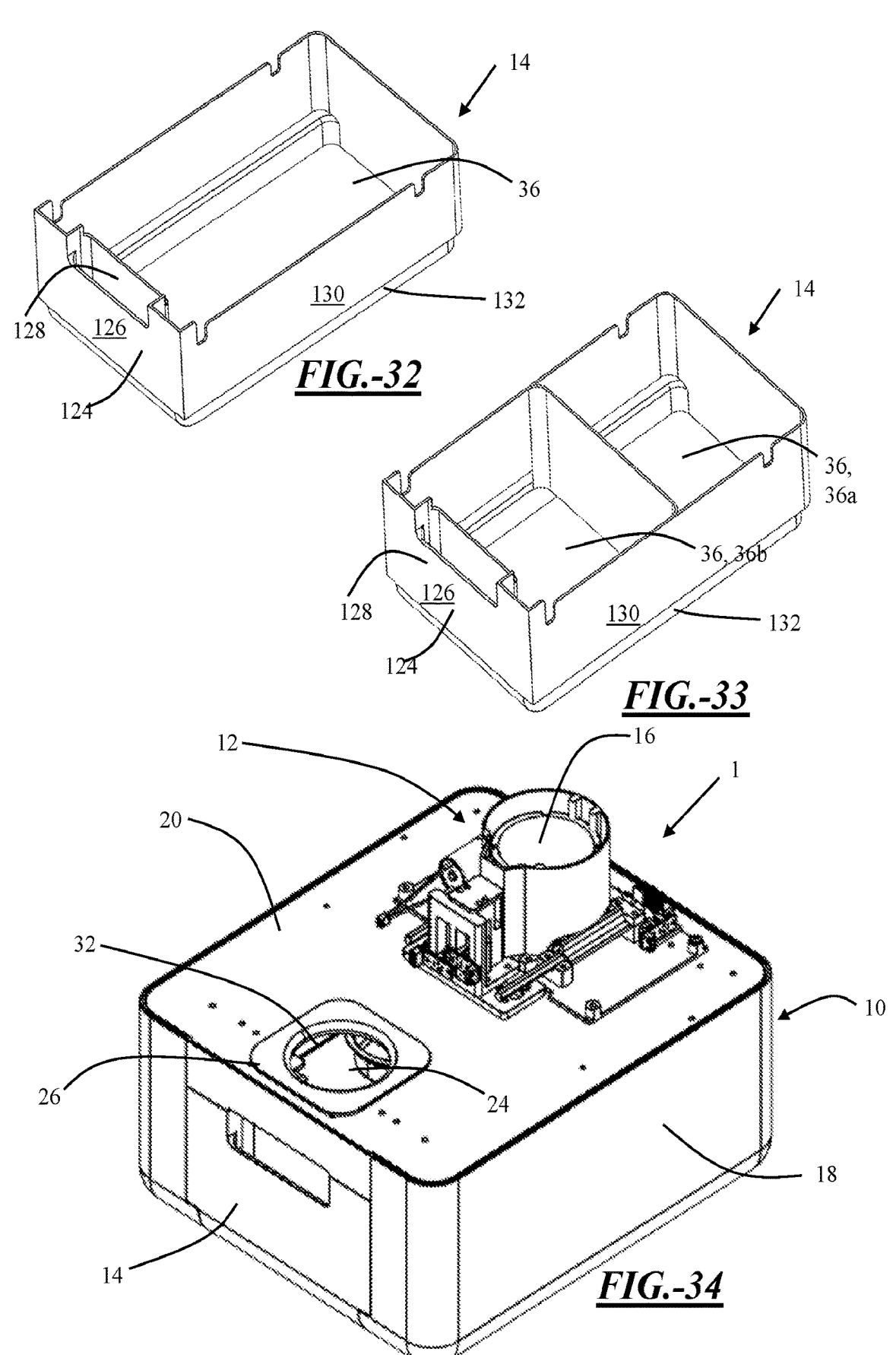
FIG. 32 is a perspective view of a waste storage subassembly.
FIG. 33 is a perspective view of a waste storage subassembly.
FIG. 34 is a perspective view of a feeding assembly without a top cover.

FIGS. 32 and 33 illustrate a waste collection subassembly 14. The waste collection subassembly 14 includes one or more waste receptacles 36. The one or more waste receptacles 36 are formed as a waste drawer 124. As shown in FIG. 32, a single waste receptacle 36 may collect all waste associated with a container. Waste may include lids, container bases, and/or unconsumed food. As shown in FIG. 32, one waste receptacle 36 may be dedicated to collecting removed lids. This waste receptacle 36 may be referred to as a lid waste receptacle 36a. Another waste receptacle 36 may be dedicated to collecting used container bases. This waste receptacle 36 may also collect unconsumed food leftover within a container base. This waste receptacle may be referred to as a container base waste receptacle 36b. The waste collection subassembly 14 includes a front panel 126. The front panel 126 includes a handle 128. The front panel 126 may form the front panel of the waste drawer 124. The waste collection subassembly 14 includes side walls 130. The side walls 130 include guide grooves 132.

FIG. 34 illustrates a feeding assembly 1 without a top cover 22 (not shown). The feeding assembly 1 includes a housing 10. The housing 10 includes a base 18 and a support plate 20. The housing 10 defines a feeding area 32. The feeding area 32 includes a container display opening 24. About the container display opening 24 is a guard 26. Located atop the support plate 20 is a container storage subassembly 12. Located within the container storage subassembly 12 are a plurality of containers 16. Located within the base 18 is a waste collection subassembly 14.

Figure 35:
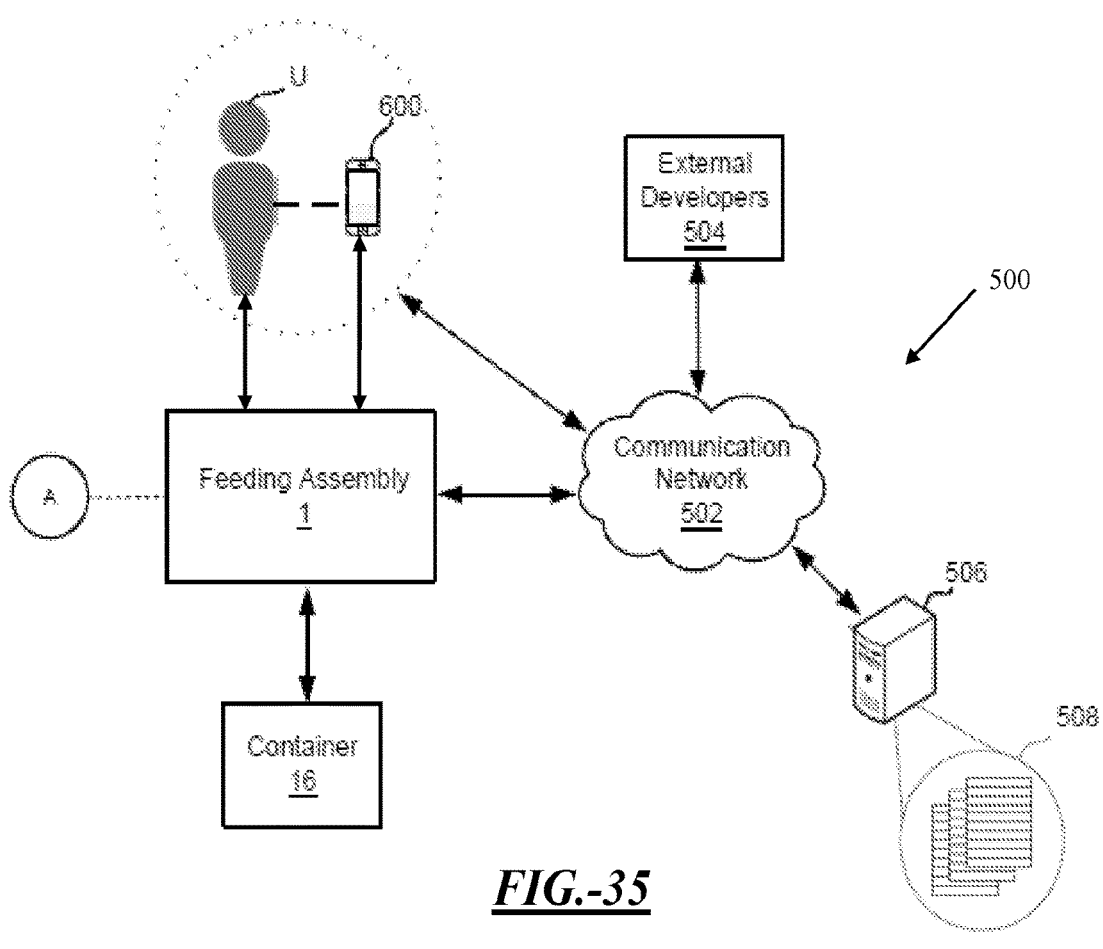
FIG. 35 illustrates a schematic of a system including the feeding assembly.

FIG. 35 is a schematic illustration of a system 500. The system may provide food (e.g., autonomously) to an animal A. The system 500 includes a feeding assembly 1. The feeding assembly 1 is configured to receive at least one container 16. The container 16 includes food therein for consumption by the animal. The feeding assembly 1 is in communication with a user device 600. The user device 600 is associated with a user U. The feeding assembly 1 may be in direct or indirect communication with the user device 600. The feeding assembly 1 may be in indirect communication with the user device 600 via a communication network 502. A remote server 506 may be in communication with the user device 600 and/or the feeding assembly 1 via the communication network 502. The remote server 506 may be associated with one or more databases 508. One or more external developers 504 may be in communication with the remote server 506, the feeding assembly 1, and/or the user device 600 via the communication network 502.

Figure 36:
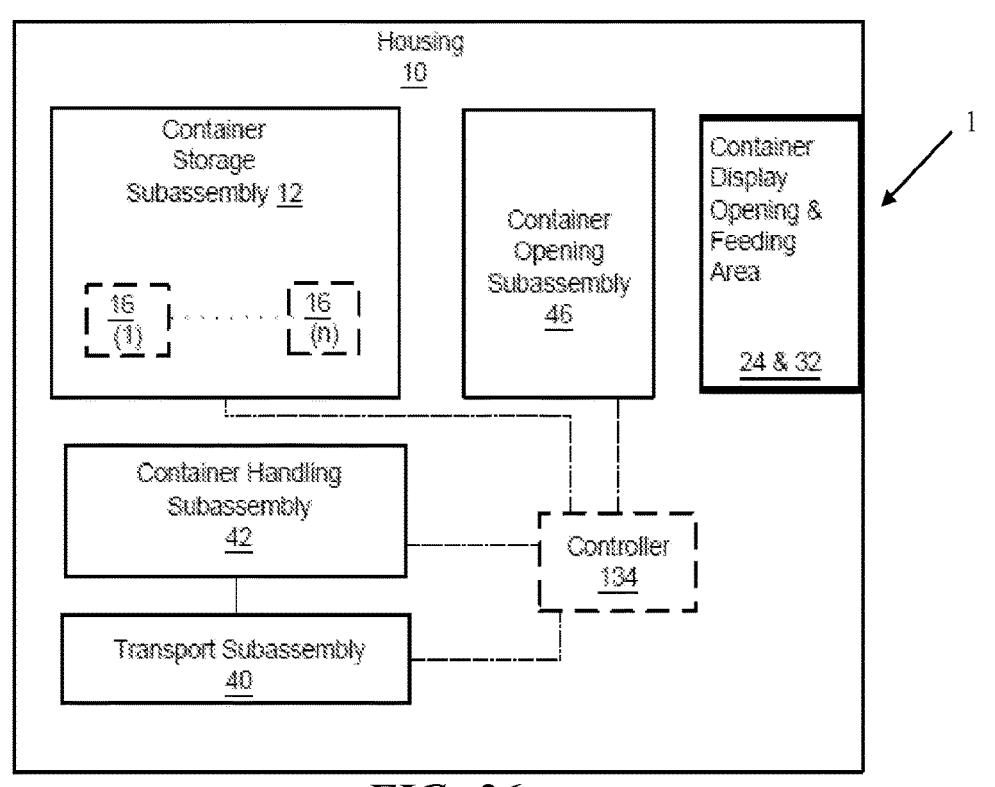
FIG. 36 is a schematic block diagram of a feeding assembly.

FIG. 36 is a schematic block diagram of a feeding assembly 1. The feeding assembly 1 includes a container storage subassembly 12, a transport subassembly 40, a container handling subassembly 42, a container opening subassembly 46, and a housing 10. The container storage subassembly 12 can be loaded with and store one or more containers 16. The housing 10 can include a container display opening 24 via which each container 16 can be at least partially disposed in a feeding area 32 such that the container is accessible to an animal. The container opening subassembly 46 (which can also be referred to as a lid removal assembly) can be configured to interact with each container 16 to separate a lid 54 (not shown) of each container 16 from the base 52 (not shown) of each container 16. The container handling subassembly can engage with and maintain each container 16 relative to the transport subassembly 40, allowing for movement of a container 16 from the container storage subassembly 12, to a location of interaction with the container opening subassembly 46 for removal of the lid 54 (not shown), and to the feeding area 32.

As shown in FIG. 36, assembly 1 optionally includes a controller 134. The controller 134 can optionally be in communication with and/or operatively coupled to one or more of the container storage subassembly 12, the container handling subassembly 42, the transport subassembly 40, or the container opening subassembly 46 to control operation of each respective subassembly (e.g., control one or more actuators thereof) and/or to exchange data with each respective subassembly (e.g., receive data from sensors thereof).

Figure 37:
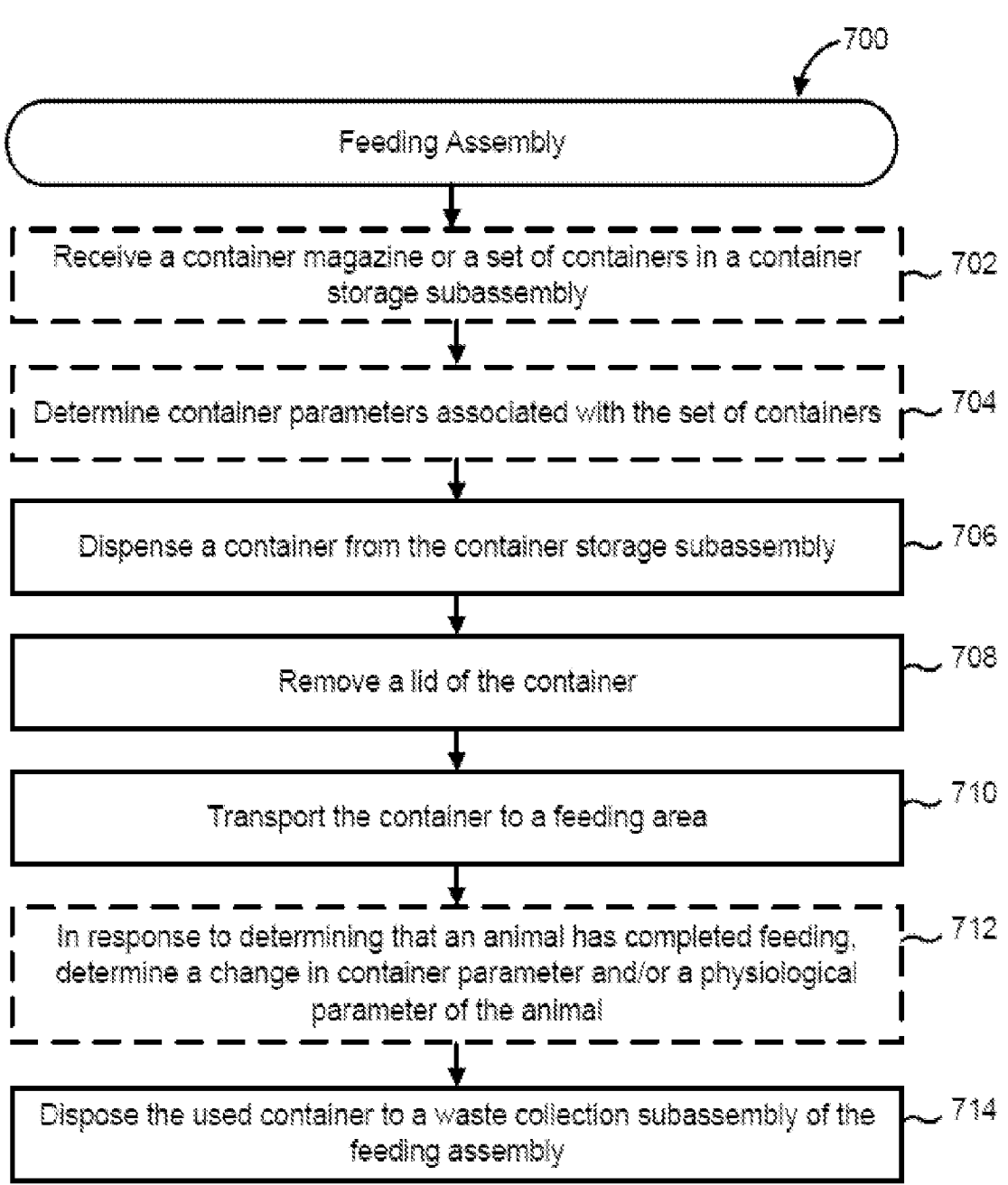
FIG. 37 is a schematic flow chart of a method for autonomously feeding an animal.
Figure 38A:
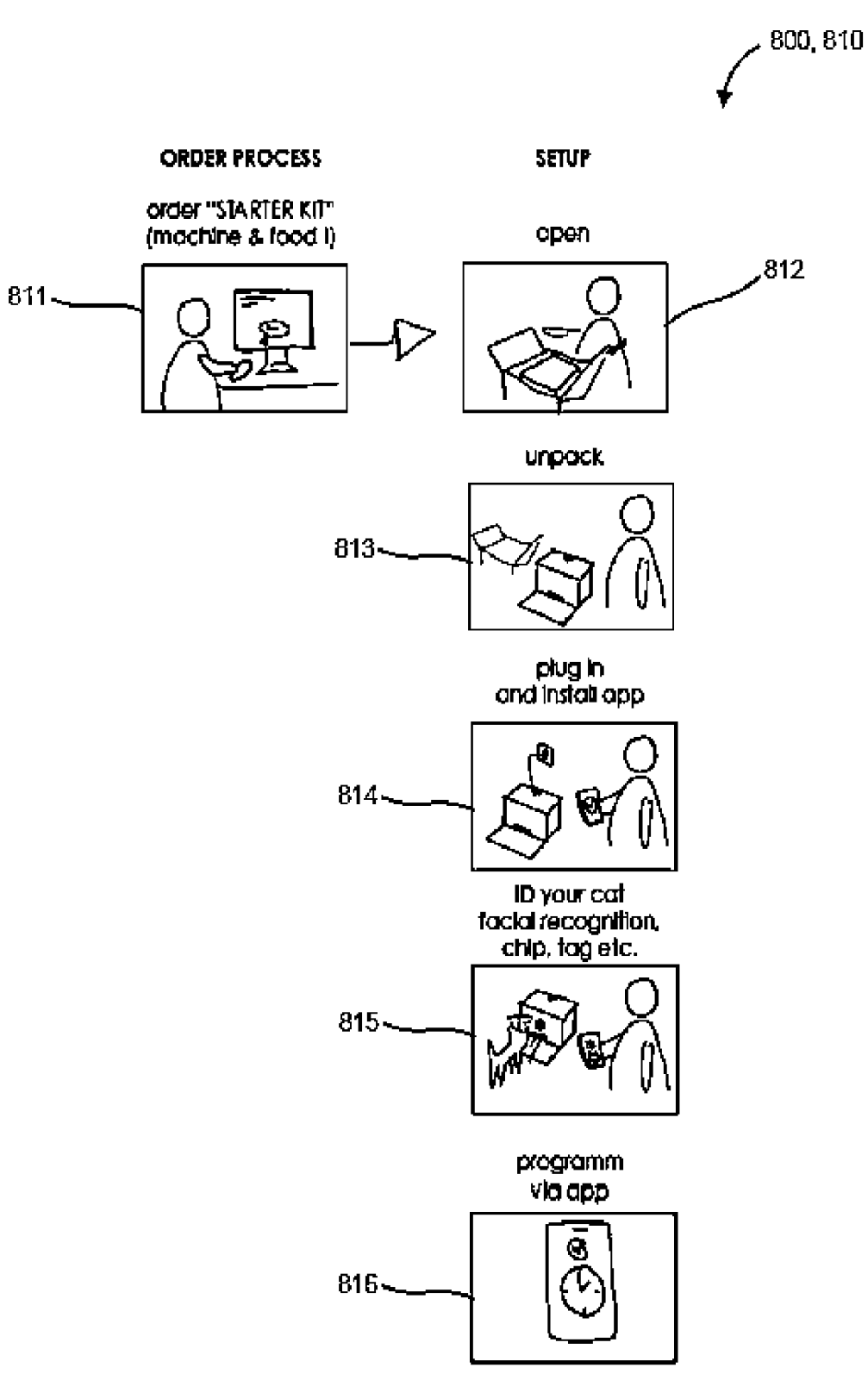
FIG. 38A is a schematic flow chart of a process of ordering and setting up a feeding assembly.
Figure 38B:
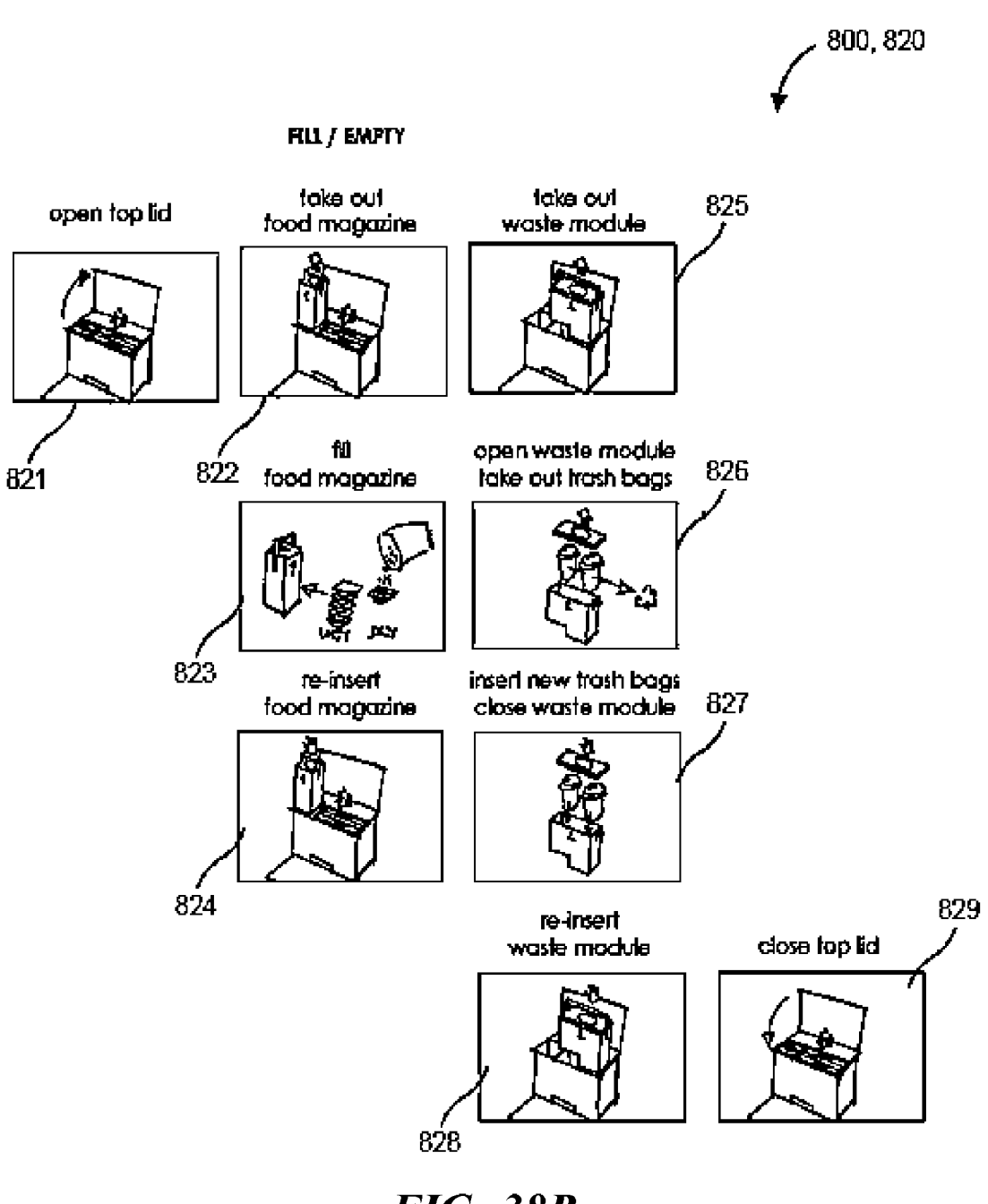
FIG. 38B is a schematic flow chart of a process of filling and/or emptying a feeding assembly.
Figure 38C:
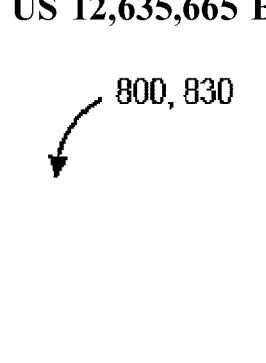
FIG. 38C is a schematic flow chart of a process of feeding an animal with wet food.
Figure 38D:
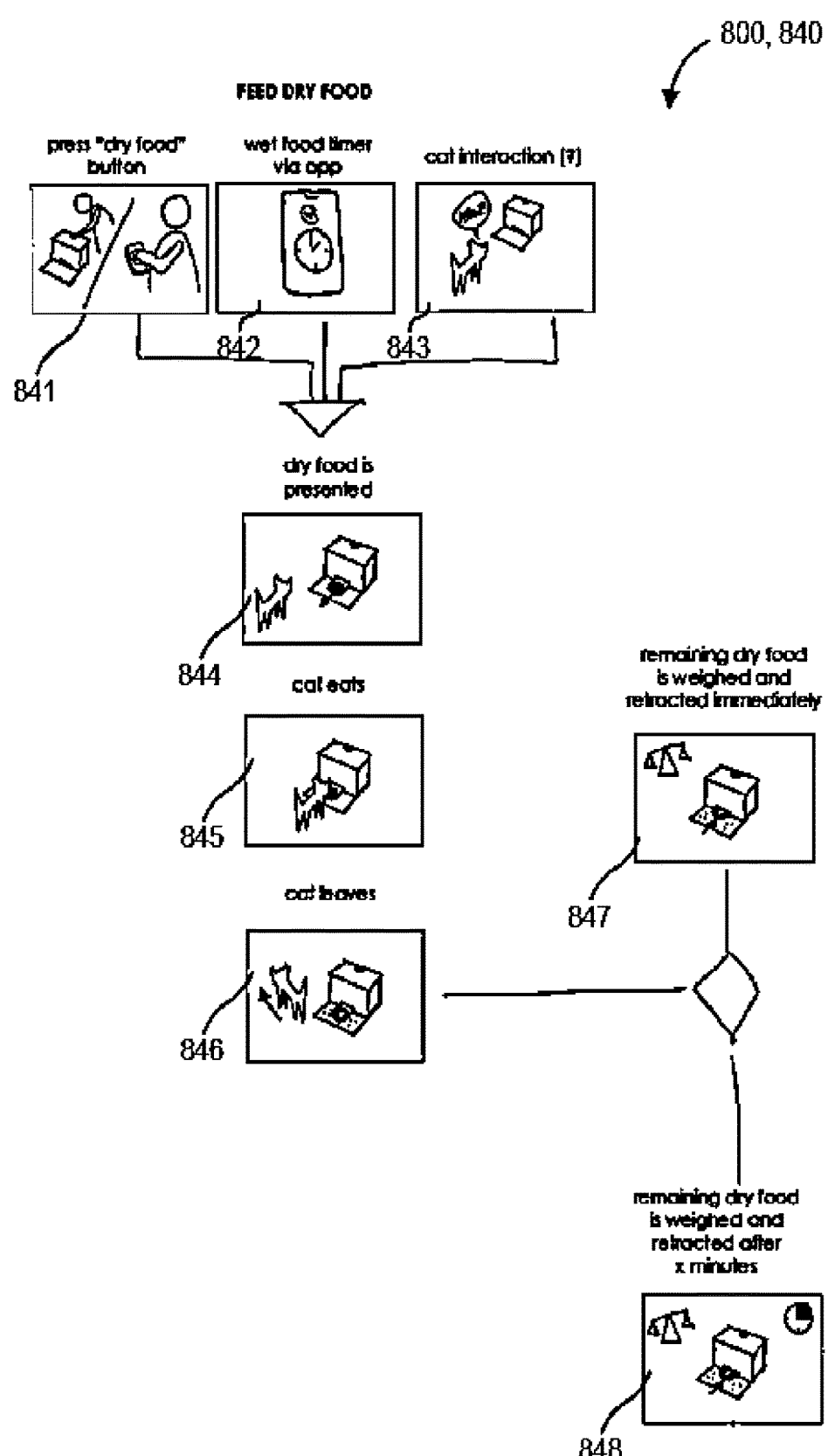
FIG. 38D is a schematic flow chart of a process of feeding an animal with dry food.

FIG. 37 is a schematic flow chart of a method 700 for autonomously feeding an animal with a feeding assembly. The method 700 may be used in combination with the feeding assembly 1 as disclosed herein. While steps of the method 700 are described in a particular sequence, this is for illustrative purposes and the operations of method 700 may be performed in any order.

The method 700 includes receiving a container or a plurality of containers within a container storage subassembly 702. The method 700 may include determining one or more container parameters associated with one or more of the containers 704. These parameters may be determined by one or more sensing devices or other components. The method 700 includes dispensing a container from a container storage subassembly 706. After dispensing, the method 700 includes removing a lid of the container 708. A lid may be removed via a container opening subassembly. Before, after, or simultaneous with the removing of the lid, a container may be transported to a feeding area 710. At the feeding area, the container, in an open configuration may be presented to an animal for consumption of food located therein. In response to determining that an animal has completed a feeding, the controller may determine a change in container parameter and/or physiological parameter of an animal 712. After an animal has completed eating or other parameters have passed, the method 700 includes disposing of the used container into a waste collection subassembly of the feeding assembly 714.

FIGS. 38A-38D are schematic flow charts illustrating a method 800 of ordering, setting up, and using a feeding assembly. The method 800 may be used in combination with the feeding assembly 1 as disclosed herein. While the steps of the method 800 are described in a particular sequence, this is for illustrative purposes and the operations of method 800 may be performed in any order.

The method 800 may include an order and setup subprocess 810. The subprocess 810 may start with a user ordering a feeding assembly and a plurality of containers (e.g., food containers) 811. The feeding assembly may be packaged. The subprocess 810 then includes opening the packaging 812 and then unpacking (e.g., removing) the feeding assembly 813. The subprocess 810 includes a user plugging the feeding assembly into a power source 814. Also, optionally, the user may install an application onto their mobile device. If the user installs the application, the user may then enter identification information associated with the animal onto the mobile application 815. Thereafter, the user can program the feeding assembly via the application 816. Programming may include setting up feeding times for an animal, feeding quantities, amount of time food is available, etc.

The method 800 includes a fill/empty subprocess 820. The subprocess 820 may start with a user opening a top lid or otherwise opening a feeding assembly to access a container storage subassembly 821. In the case that the container storage subassembly is compatible with a container magazine, the subprocess 820 may include removing the container magazine from the feeding assembly 822. At 823, the user may fill the container magazine with a plurality of containers having animal food therein. At 824, the user reinserts or installs the filled container magazine back into the container storage subassembly. In lieu of a container magazine, the user may insert new containers directly into the container storage subassembly to refill the feeding assembly. The user may then partially or entirely remove a waste storage subassembly 825. For example, a user may slide a waste drawer out from a base. If a waste receptacle includes a lid, a user may remove a lid to access one or more waste bags 826. In 826, one or more waste bags may be removed from a waste receptacle. The waste bags may include removed lids, used container bases, and/or leftover food. Thereafter, one or more fresh waste bags may be inserted into the one or more waste receptacles 827. In 828, the waste storage subassembly is then reinserted into the feeding assembly 1. If a top lid or other cover is present, the subprocess 820 may include closing the top lid 829.

The method 800 includes a feed wet food subprocess 830. The feed wet food subprocess 830 includes various operations for setting a feeding cycle for an animal (e.g., a cat). A user may press a wet food button or engage any other input/output portion of the feeding assembly (e.g., tough display) to start a feeding cycle for the animal, at 831. The user may set a wet food timer for feeding the animal via the mobile application installed on the user device, at 832. The feeding assembly may be configured to start a feeding cycle in response to the animal interacting with the feeding assembly (e.g., standing in front of the feeding assembly for a certain time period, making a noise or gesture, etc.), at 833. At 834, the feeding assembly moves an open container of food into a feeding area located outside of the housing and accessible by the animal. At 835, the animal eats the food. At 836, the animal leaves the feeding area. The feeding assembly may weigh the amount of wet food remaining in the container, and immediately retract the container into the housing after the animal leaves, at 837. The remaining food may be weighed, but the container is then retracted into the housing after a predetermined time, at 838. The method 800 may proceed from step 837 or 838 to operation 841 of the feed dry food subprocess 840, or from operation 837 to operation 844 of the subprocess 840, as described herein.

The method 800 may include a feed dry food subprocess 840. The feed dry food subprocess 840 may start with the user pressing a dry food button to initiate a dry food feed cycle for the animal, at 841, set dry food feeding time via the mobile application, at 842, and/or in response to the animal interacting with the feeding assembly, at 843. At 844, a container of dry food may be presented by the feeding assembly in the feeding area. At 845, the animal eats the food. At 846, the animal leaves. The feeding assembly may weigh the amount of dry food remaining in the container, and immediately retract the container into the housing after the animal leaves, at 847. The remaining food may be weighed, but the container of dry food may be retracted into the housing after a predetermined time, at 848. The method

800 may proceed from operation 847 or 848 to operation 851, or from operation 848 to operation 858, as described herein.

Figure 39:
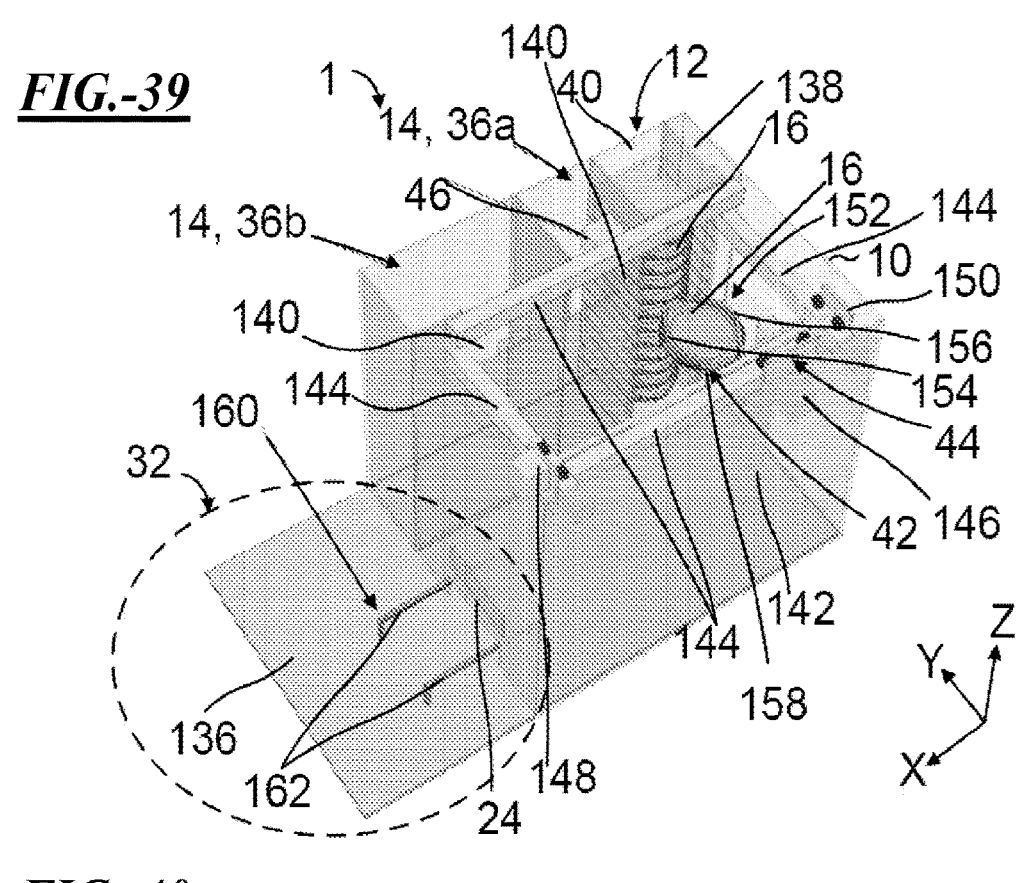
FIG. 39 is a perspective view of a feeding assembly.
Figure 40:
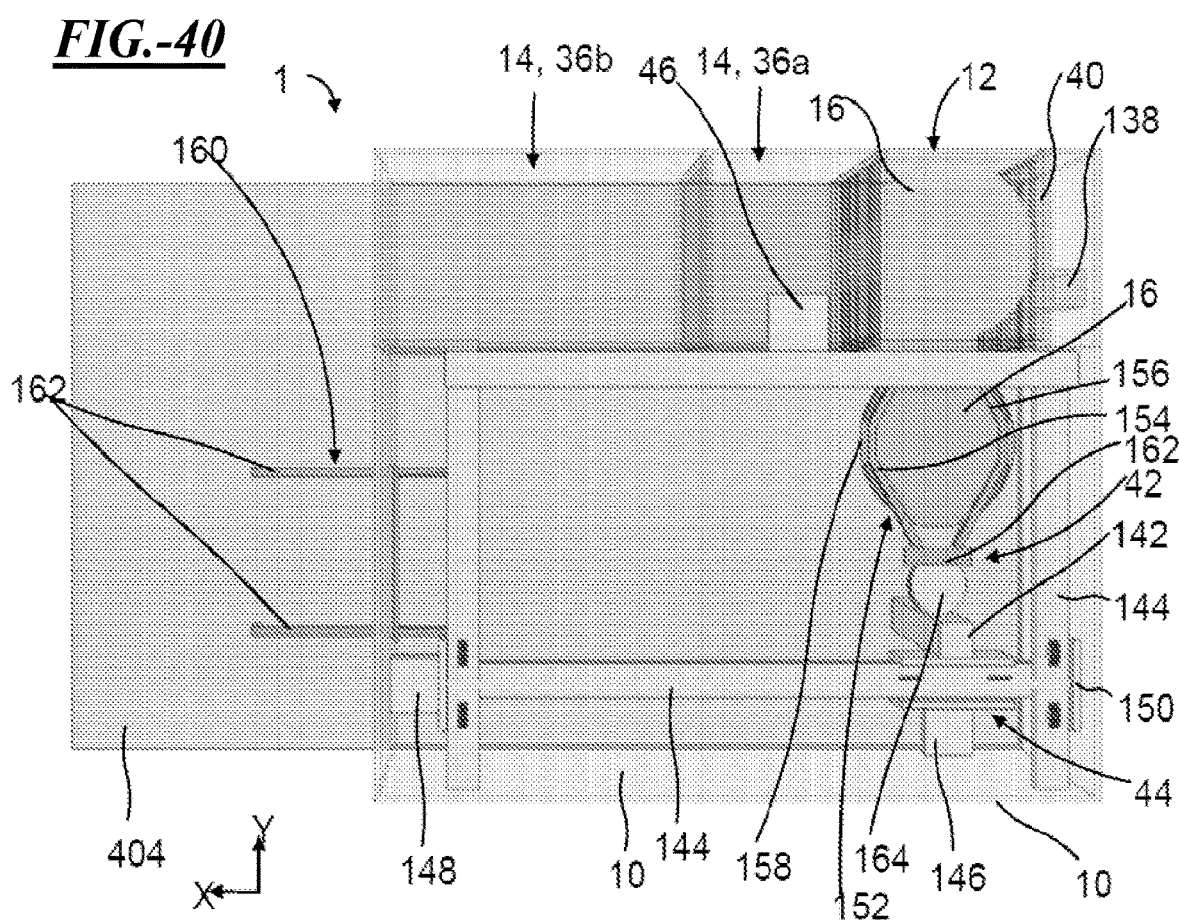
FIG. 40 is a top view of a feeding assembly.

FIGS. 39, 40, and 41 are transparent views of a feeding assembly 1. The feeding assembly 1 may include a housing 10, a container storage subassembly 12, a waste collection subassembly 14, a transport subassembly 44, a container handling subassembly 42, a feeding area 32, and may also include a controller (not shown).

A container display opening 24 may be defined in a wall of the housing 10. The container display opening 24 may be in the wall adjacent to a feeding area 32 located outside the housing 10. The opening 24 may allow a container 16 of a set of containers 16 disposed in the container storage subassembly 12 to be delivered or displayed through the opening 24 into the feeding area 32.

The assembly 1 may include a residual waste collector 136 disposed beneath the housing 10 or within the housing 10. The residual waste collector 136 may be proximate to a base of the housing 10 and/or in front of the housing 10.

The container storage subassembly 12 is configured to receive and store the set of containers 16. The container storage subassembly 12 is located within or includes a portion of a volume of the housing 10 that is configured to removably receive a container magazine 40 within which a set of containers 16 are loaded.

An identification sensor 138 may be disposed proximate to the container storage subassembly 12.

The waste collection subassembly 14 may include a section of the housing 10 or be located within the housing 10. The waste collection subassembly includes a lid waste receptacle 36*a* and a container base waste receptacle 36*b*. A container opening subassembly 46 (e.g., a protrusion, an arm, a blade, a knife, etc.) may be located in the lid waste receptacle 36*a*. The container opening subassembly 46 may be configured to engage the lid of the container 16 and remove the lid from a container base of the container 16 as the container 16 is moved into or out of the lid waste receptacle 36*a* by the container handling subassembly 42. The lid waste receptacle 36*a* may define an opening 140 in a sidewall thereof. The container handling subassembly 42 may move a container 16 into the lid waste receptacle 36*a* via the opening 140. The container base waste receptacle 36*b* may include a portion of or be housed in the housing 10. The container base waste receptacle 36*b* may be configured to receive used containers 16. In some embodiments, a sidewall of the container base waste receptacle 36*b* may define an opening 140. Via the opening 140, a container handling subassembly 42 may transport a used container 16 into the container base waste receptacle 36*b* and dispose the used container 16 therein.

The feeding assembly 1 also includes a transport subassembly 44. The container handling subassembly 42 is coupled to the transport subassembly 44. The transport subassembly may move the container handing subassembly 42, to the lid waste receptacle 36*a* and/or to the container base waste receptacle 36*b*. The transport subassembly 44 may include a first mounting bar 142. The first mounting bar 142 extends vertically or in the Z-direction. The first mounting bar 142 allows for the container handling subassembly 42 to be translated in a vertical direction. The transport subassembly 44 can also include a first set of support bars 144 extending in the X-direction (e.g., front to rear of the feeding assembly) and a second set of support bars 144 extending in the Y-direction (e.g., side to side of the feeding assembly). The transport subassembly 44 also includes a first actuator 146, a second actuator 148, and a third actuator

150. The actuators 146, 148, 150 are configured to move the container handling subassembly 42 in the Z, X, and Y-directions, respectively.

The container handling subassembly 42 may include a gripper 152. A gripper 152 is configured to hold and secure a container 16 of the set of containers 16 in response to transport subassembly 44 moving the gripper 152 into the container storage subassembly 12, facilitate removal of the lid associated with container 16, and dispose the container 16 in the feeding area in response to transport subassembly 44 moving the container 16 to the feeding area FA. The gripper 152 includes a pair of arms 154 and 156. The pair of arms 154, 156 may be referred to as an upper pair of arms. The pair of arms 154 and 156 are each coupled to a gripper base 162. The container handling subassembly 42 may also include a gripper plate 158 (also referred to as a support plate) disposed below the pair of arms 442*a/b*. The container 16 is received between the pair of arms 154, 156 and rests atop the gripper plate 158. The container handling subassembly 42 may include an actuator such as a rotational actuator 164.

The container holder subassembly 158 can be located in or in proximity to the feeding area FA. The container holder subassembly 158 may include any suitable structure to secure and prevent motion of the container 16. The container holder subassembly 158 may include a set of bars 162. The set of bars 162 protrudes from a sidewall of the housing 10 into the feeding area FA.

FIGS. 42 and 43 are plan views of a container magazine 40. The container magazine 40, may also be referred to as a carousel magazine. The container magazine 40 includes a circular hub 166. The circular hub is configured as a circular wheel. The circular hub 166 defines a plurality of slots 168. The slots 168 are located about the hub's 166 periphery. Each of the slots 168 is configured to receive a single or plurality of containers 16. The containers 16 are stored in the container magazine 40 in a closed configuration C. The hub 166 may be rotatable about a central cavity 170. By rotating about the central cavity 170, a container 16 is able to be transferred from a slot 168 into the central cavity 170. The central cavity 170 may include an access opening 172. A slot 168 may be rotated about the central cavity 170 such as to align with the access opening 172. A container 16 may be transferred from a slot 168 to the central cavity 170 by a portion of a container storage assembly 12. For example, the container storage assembly 12 may include an arm 174. The arm 174 may be configured to push a container 16 from a slot 168 into the central cavity 170. The arm 174 may push the container 16 through an access window 172. The container magazine 40 may rotate about a vertical or horizontal axis, or any angle therebetween. Once in the central cavity 170, a container handling subassembly 42 may be able to access the container 16 for subsequent transportation within the feeding assembly 1.

FIGS. 44, 45, and 46 illustrate a container magazine 40. The container magazine 40 is configured to hold a plurality of containers 16 in a closed configuration C. The containers 16 are vertically stacked.

In FIG. 44, the containers 16 are stacked one on top of the other. A lid 54 of container 16 supports a container base 52 of an adjacent container 16. The container magazine 40 includes an outer wall 176. The outer wall 176 defines the hollow interior of the magazine 40. The container magazine 40 includes a cover 178. The cover 178 may be removable to allow for the containers 16 to be dispensed.

In FIGS. 45 and 46, the containers 16 are supported by the container magazine 40. The container magazine 40 includes a plurality of slots 168. The slots 168 are formed in an outer wall 176. The slots 168 support a rim or flange 76 of the containers 16. The slots 168 may be spaced apart to adapt to different volume containers 16. For example, containers 16 with a larger volume may use only some of the slots 168 while containers 16 of smaller volume use all or different slots. FIGS. 45 and 46 illustrate the compatibility with different volume containers 16.

Figure 47:
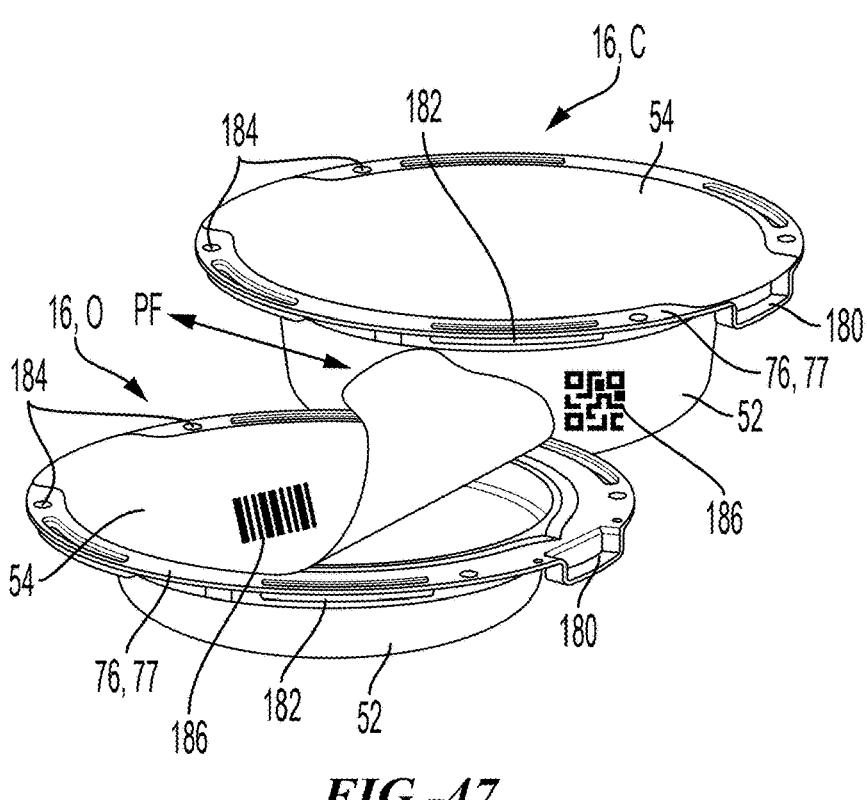
FIG. 47 is a perspective view of a plurality of containers.

FIG. 47 illustrates a container 16 in a partially open configuration O and a container 16 in a closed configuration C. The container 16 in the closed configuration C also has a larger storage volume. The container 16 includes a container base 52 and a lid 54. The lid 54 is removable from the container base 52. The lid 54 may be removable via peeling force PF. The container base 52 includes a rim 76. The rim 76 is formed a flange 77. The container base 52 includes one or more pockets 180. The pockets 180 are formed as part of the rim 76. The container base 52 includes one or more alignment features 182. The alignment features 182 are formed as part of the rim 76. The container base 52 includes engagement features 184. The engagement features 182 are formed as part of the rim 76. The lid 54 of the container 16 in the open configuration O includes an identifier 186. The container base 52 of the container 16 in the closed configuration C includes an identifier 186.

Figure 48:
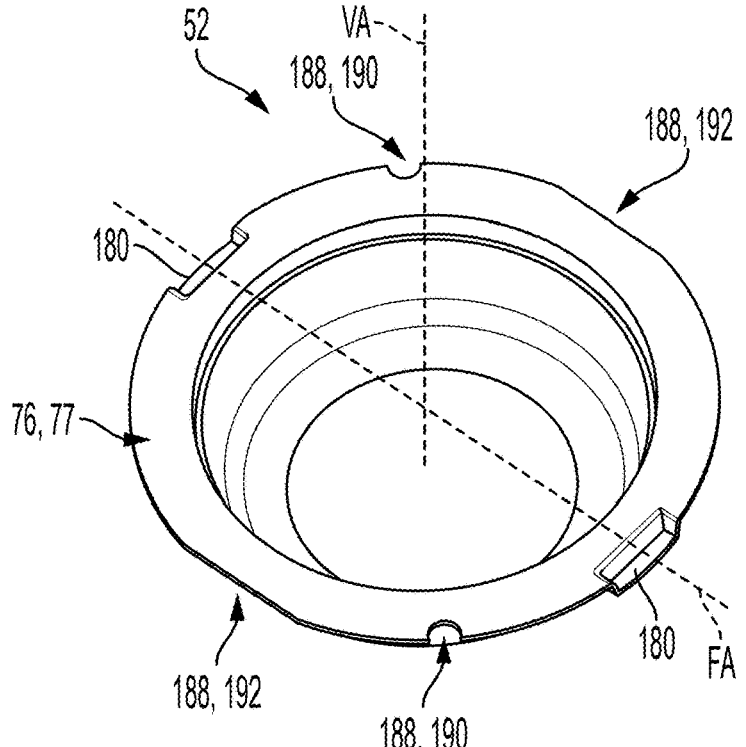
FIG. 48 is a perspective view of a container base.

FIG. 48 illustrates a container base 52. The container base 52 includes a vertical axis VA extending therethrough. The vertical axis VA is substantially centered to the container base. The container base 52 includes a rim 76. The rim 76 is formed as a flange 77. A flange axis FA is defined by the majority of the surface of the flange 77. The flange axis FA is substantially perpendicular to the vertical axis VA. The flange axis VA is aligned with opposing pockets 180. The flange 77 includes pockets 180 formed therein. The pockets 180 are formed as an indentation or change in surface of the flange 77. The pockets 180 project downward in a direction substantially similar to the vertical axis VA. The pockets 180 project away from the axis A. The flange 77 includes keying features 188 formed therein. The keying features 188 define a change in the peripheral contour of the flange 77. The keying features 188 include one or more indentations 190. The indentations 190 project inward toward the vertical axis VA. The keying features 188 include one or more straight edges 192. The straight edges 192 are substantially parallel to the axis A.

Figure 49:
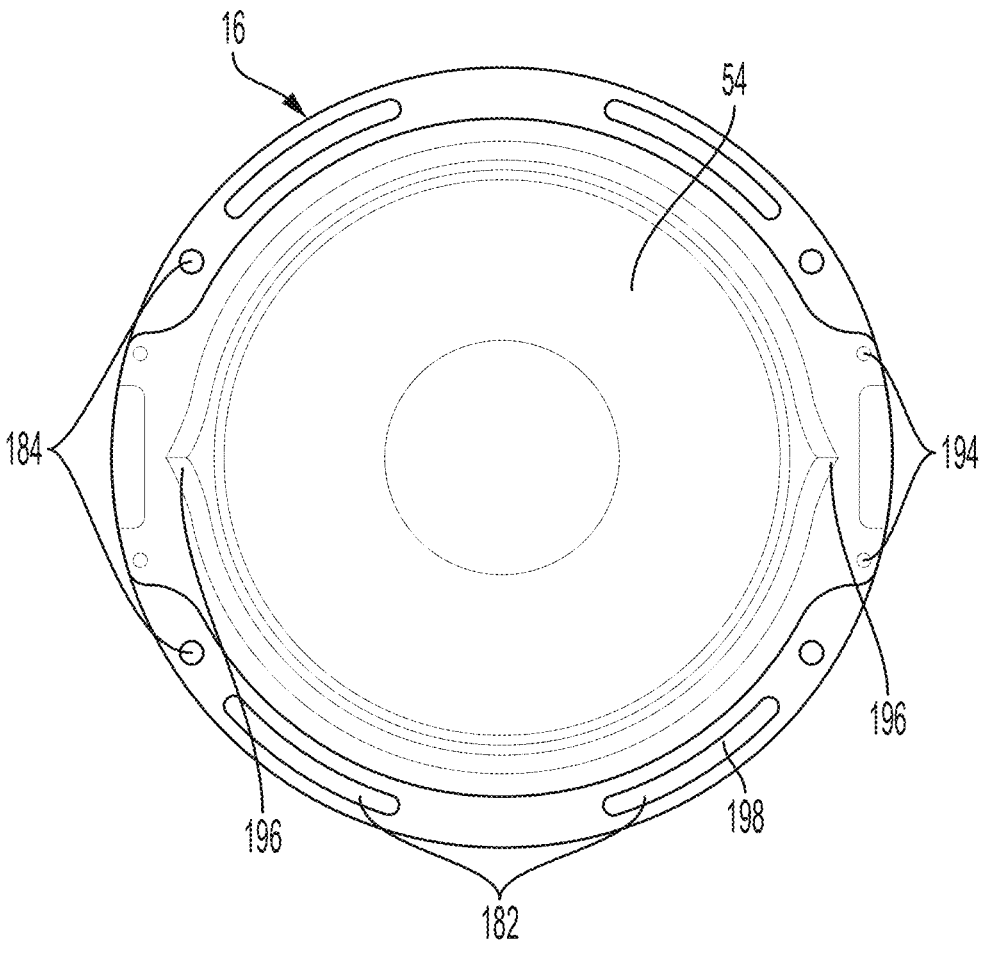
FIG. 49 is a top view of a container.
Figure 50:
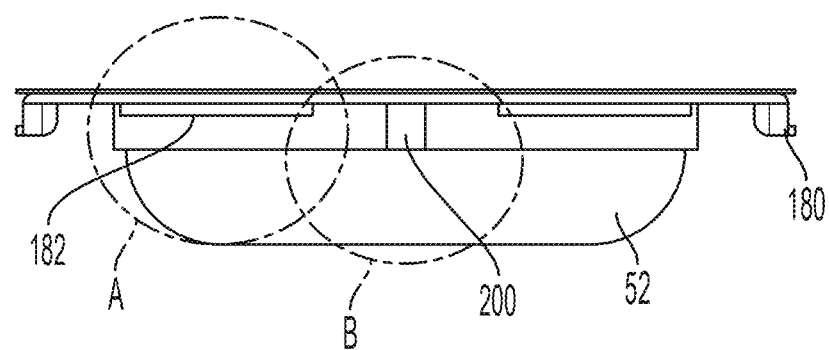
FIG. 50 is a side view of a container.
Figures 51, 52, 53, 54:
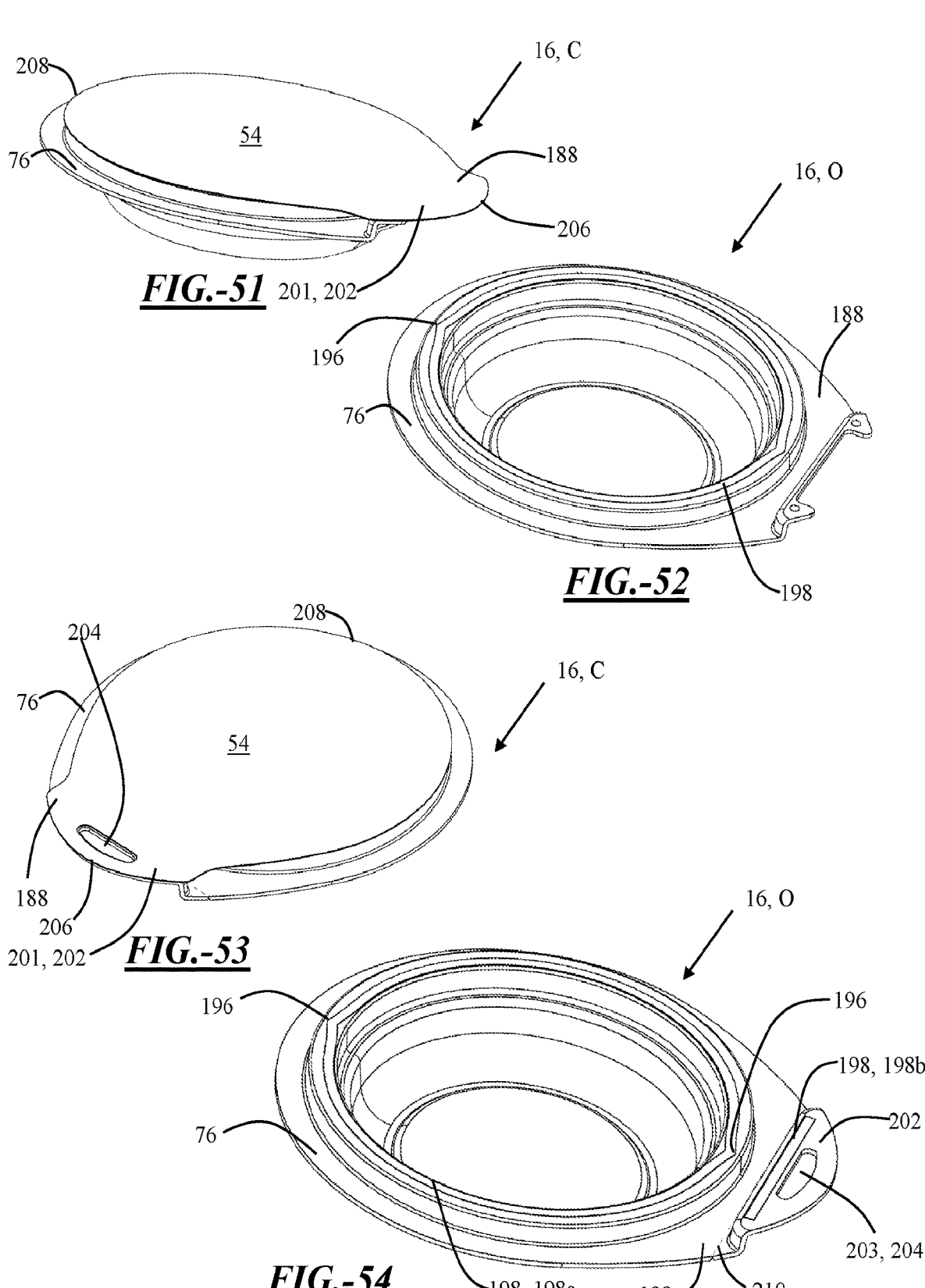
FIG. 51 is a perspective view of a container in a closed configuration.
FIG. 52 is a perspective view of a container in an open configuration.
FIG. 53 is a perspective view of a container in a closed configuration.
FIG. 54 is a perspective view of a container in an open configuration.

FIGS. 49 and 50 illustrate a container 16. The container 16 includes a container base 52. The container base 52 is closed via a lid 54. The lid 54 is removably adhered to the container base 52 via a seal member 198. The seal member 198 includes stress rise features 196. The container base 52 includes a flange 77. The flange 77 includes pockets 180 and alignment features 182. The container 16 includes tensioning features 194. The tensioning features 194 are provided as part of the lid 54. The container base 52 includes a planar surface 200.

FIGS. 51-54 illustrate containers 16 in a closed configuration C and an open configuration O. In the closed configuration, a lid 54 covers a container base 52. In the open configuration O, a lid 54 is removed from the container base 52. The lid 54 and the container base 52 each include keying features 188. The keying features 188 may be defined as the overall peripheral shape (e.g., 2-dimensional plan shape and/or cross-section) of a rim 76 and the lid 54. The lid 54 includes a handling portion 201. The lid 54 includes an extension tab 202. The extension tab 202 is the handling portion 201. The extension tab 202 may include a hook opening 204. The extension tab 202 may define the leading edge 206 of the lid. Opposite the leading edge 206 may be a trailing edge 208. The container base 52 may also include an extension tab 202. The extension tab 202 may also include a hook opening 204. The extension tab 202 may also be referred to as a lid reinforcing feature 203. The hook openings 204 may be aligned with one another. The container base 52 may include a scoring line 210. The scoring line 210 is located between the extension tab 202 and the remainder of the container base 52. The soring line 210 allows for the extension tab 202 to be broken away from the rest of the rim 76. The container base 52 includes a seal member 198. The seal member 198 includes stress rise features 196. The stress rise features 196 are located near where the leading edge 206 and trailing edge 208 of the lid 54 are adjoined to the container base 52. The seal member 198 includes a first seal member 198a and second seal member 198b. The first seal member 198a is located on the rim 76. The second seal member 198b is located at the lid reinforcing feature 203.

Figures 55, 56, 57:
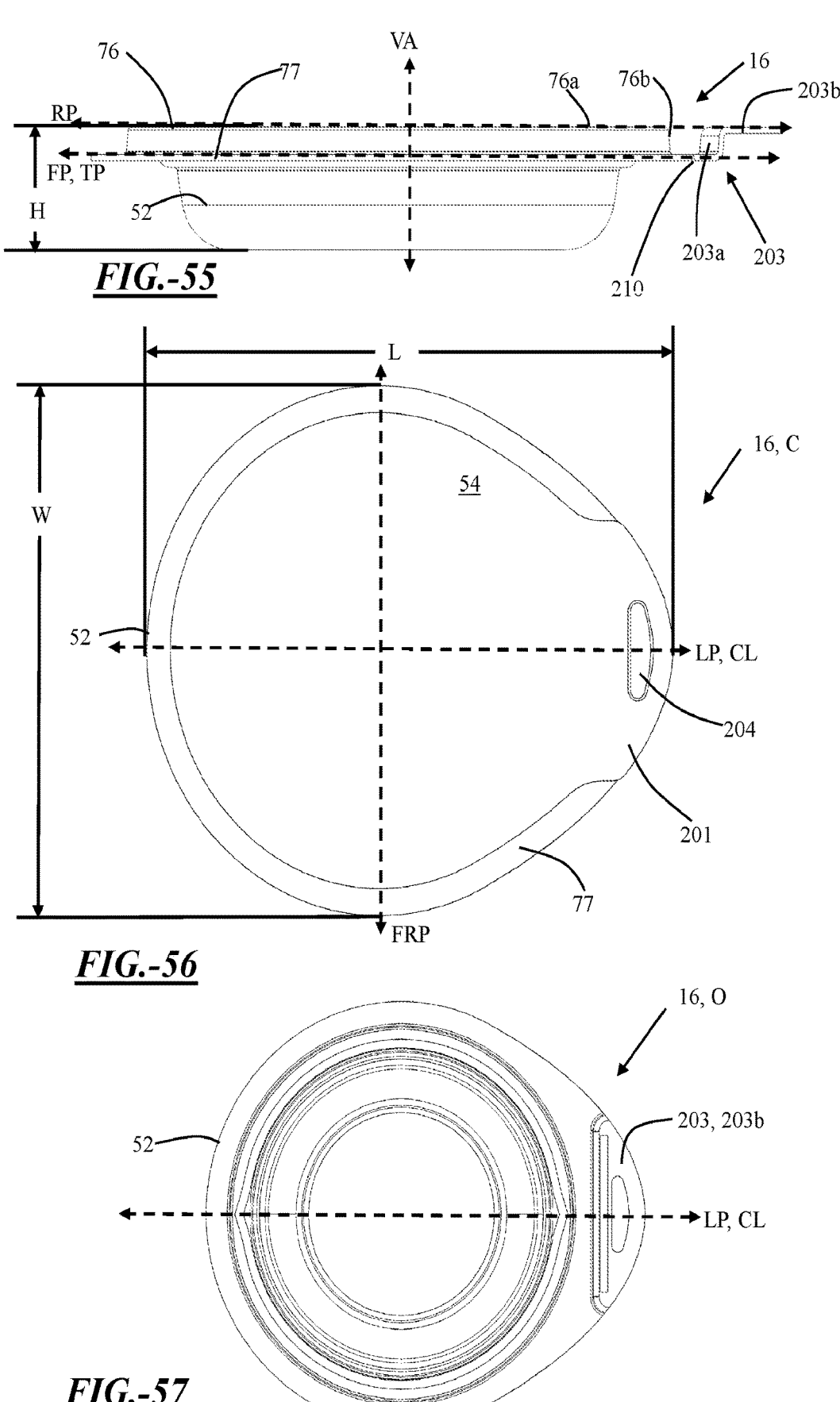
FIG. 55 is a side view of a container.
FIG. 56 is a top view of container in a closed configuration.
FIG. 57 is a top view of a container in an open configuration.

FIGS. 55-57 illustrate differing plan views of a container 16 in both an open O and closed configuration C. The container 16 includes a container base 52. The container 16 includes a container base 52 with a lid 54 removably affixed thereto.

The container 16 includes a vertical axis VA. The vertical axis VA extends through the container base 52 through the opening defined by the rim 76 and/or flanges 77 and/or the lid 54. A transverse plane TP lies substantially perpendicular to the vertical axis VA. The transverse plane is substantially parallel to a flange plane FP and or a rim plane RP. A flange plane FP is defined by an upper surface of the flange 77. A rim plane RP is defined by an upper surface of the rim 76. A longitudinal plane LP extends from the front to the rear of the container 16. A longitudinal plane LP may define a center line CL of the container 16. A frontal plane FRP extends from side to side of the container 16. The frontal plane FRP divides the container 16 from front and rear.

The container includes a height H, length L, and width W. The height H is measured parallel to a vertical axis VA. The height H is measured from a top to the bottom of the container 16. The length L is measured from front to rear. The length L is measured parallel to a longitudinal plane LP. The width W is measured side to side. The width W is measured parallel to a frontal plane FRP.

The lid 54 contains a handling portion 201. The handling portion 201 may include or be free of a hook opening 204. The handling portion 201 maybe located toward and or at the front of the container 16.

The handling portion 201 may be affixed to a lid reinforcing feature 203. A lid reinforcing feature 203 may include a vertically extending portion 203a and a lid contact portion 203b.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A feeding assembly configured to automatically present a food to an animal for consumption, the feeding assembly including:

a) a container storage subassembly configured to store a plurality of containers of the food therein;

b) a container handling subassembly configured to retrieve and/or receive a container from the container storage subassembly;

c) a container transport subassembly configured to move the container handling subassembly in one or more linear directions from a loading position at the container storage subassembly to a feeding position at a feeding area;

d) a container opening subassembly configured to open the container while being transferred to the feeding area from the container storage subassembly, wherein the container opening subassembly is configured to engage with a lid and apply a peeling force to remove the lid from the container, wherein the container opening subassembly includes a pair of jaws configured to grasp and pinch a portion of the lid at a leading edge;

e) a waste collection subassembly configured to receive the one or more containers after being presented at the feeding area;

wherein the container opening subassembly is located above the container handling subassembly and above the waste collection subassembly; and wherein the container opening subassembly together with the container handling subassembly and/or the container transport subassembly are configured to apply the peeling force to the lid of the container to remove the lid and open the container by moving the container handling subassembly relative to the container opening subassembly, moving the container opening subassembly relative to the container handling subassembly, or moving both relative to one another.

2. The feeding assembly of claim 1, wherein the container opening subassembly together with the container handling subassembly and/or the container transport subassembly, are configured to apply the peeling force to the lid of the container to remove the lid and open the container by moving the container handling subassembly relative to the container opening subassembly.

3. The feeding assembly of claim 1, wherein the container storage subassembly includes:

i) a hopper configured to store the plurality of containers of the food therein; and ii) a restraint mechanism configured to retain the plurality of containers in the hopper and selectively release the container from the plurality of containers.

4. The feeding assembly of claim 1, wherein the container handling subassembly is configured to present a container base of the container at the feeding area, such that the food is presented to the animal for consumption in the same container in which the food is stored.

5. The feeding assembly of claim 1, wherein the container opening subassembly is located between the container storage subassembly and the feeding area, near an opening position of the container handling subassembly, between the loading position and the feeding position of the container handling subassembly, or any combination thereof.

6. The feeding assembly of claim 1, wherein the pair of jaws includes one or more moveable jaws, static jaws, or both.

7. The feeding assembly of claim 6, wherein one jaw or both jaws of the pair of jaws are moveable via one or more drive units.

8. The feeding assembly of claim 1, wherein the container storage subassembly is configured to retain the plurality of containers and the container handling subassembly is configured to selectively retrieve the container.

9. The feeding assembly of claim 1, wherein the container storage subassembly includes a hopper configured to directly receive one or more stacks of the plurality of containers therein or removably receive one or more container magazines having the plurality of containers stored therein.

10. The feeding assembly of claim 9, wherein the hopper includes an inlet and an outlet; and wherein the hopper is configured to dispose of the plurality of containers via the outlet.

11. The feeding assembly of claim 1, wherein the container storage subassembly is located adjacent to, in proximity to, below, and/or above the container handling subassembly, the container opening subassembly, and/or the waste collection subassembly.

12. The feeding assembly of claim 11, wherein the container storage subassembly is located above the container handling subassembly.

13. The feeding assembly of claim 1, wherein the container handling subassembly is configured to releasably engage one or more containers.

14. The feeding assembly of claim 1, wherein the container handling subassembly is configured to be moved between a plurality of positions within the feeding assembly by the container transport subassembly; and wherein the plurality of positions include the loading position, an opening position, the feeding position, a disposing position, a resting position, or a combination thereof.

15. The feeding assembly of claim 14, wherein in the loading position, the container handling subassembly is located below an outlet of the container storage subassembly.

16. The feeding assembly of claim 14, wherein in the opening position, the container handling subassembly is configured to be positioned such as to allow opening of the container via the container opening subassembly.

17. The feeding assembly of claim 16, wherein in the opening position, the container handling subassembly is located below the container opening subassembly.

18. The feeding assembly of claim 14, wherein in the feeding position, the container handling subassembly is configured to be positioned such as to present and/or dispose the container into the feeding area; and wherein in the feeding position, the container handling subassembly is located below the feeding area, toward a front of the feeding assembly, or both.

19. The feeding assembly of claim 14, wherein in the disposing position, the container handling subassembly is configured to be positioned such as to dispose or release a container into the waste collection subassembly; and wherein in the disposing position, the container handling subassembly is above the waste collection subassembly.

20. The feeding assembly of claim 1, wherein the container handling subassembly includes a shuttle assembly, a gripper assembly, or both configured to receive and/or retrieve a container, retain the container while being moved within the feeding assembly, release the container, or combination thereof.

21. The feeding assembly of claim 20, wherein the shuttle assembly includes a cradle, holding support, bearings, through holes, biasing devices, or a combination thereof.

22. The feeding assembly of claim 1, wherein the container transport subassembly is configured to translate the container handling subassembly along only a single axis.

23. The feeding assembly of claim 1, wherein the container transport subassembly includes one or more drive shafts and one or more support shafts;

wherein the one or more drive shafts are rotationally engaged with one or more bearings of the container handling subassembly; and wherein the one or more drive shafts and the one or more bearings are configured to convert rotation into linear movement to cause linear translation of the container handling subassembly.

24. The feeding assembly of claim 23, wherein the one or more support shafts are engaged with one or more bearings of the container handling subassembly to provide a support surface for the one or more bearings to slide along when being driven via the one or more drive shafts.

25. The feeding assembly of claim 1, wherein the feeding assembly includes one or more container disposal subassemblies which are configured to cooperate with the container handling subassembly to urge the container into the waste collection subassembly; and wherein the one or more container disposal subassemblies are mounted along a path of the container handling subassembly from the feeding position to a disposal position, a resting position, and/or the loading position.

26. The feeding assembly of claim 1, wherein the waste collection subassembly includes one or more waste receptacles; and wherein the one or more waste receptacles are located in a base of a housing of the feeding assembly.

27. The feeding assembly of claim 1, wherein the feeding assembly includes one or more sensing devices; and wherein the one or more sensing devices include one or more identification sensors, one or more presence sensors, one or more position sensors, one or more weight sensors, or any combination thereof.

28. The feeding assembly of claim 27, wherein the one or more identification sensors are configured to receive information from one or more identifiers of the container, the plurality of containers, or both; and wherein the one or more identification sensors are located proximate to the container storage subassembly, the container handling subassembly, or both such as to have a view of, form a connection with, or both one or more identifiers of one or more containers.

29. The feeding assembly of claim 27, wherein the one or more position sensors are configured to detect a position of the container handling subassembly, the container transport subassembly, or both within the feeding assembly.

30. The feeding assembly of claim 27, wherein the one or more weight sensors are configured to measure a weight of the container before placement in the feeding area and after removal from the feeding area; and wherein the one or more weight sensors are affixed to or part of a housing, the container handling subassembly, the container transport subassembly, or a combination thereof.

* * * * *